United States Patent
Tateishi et al.

(10) Patent No.: US 8,609,747 B2
(45) Date of Patent: *Dec. 17, 2013

(54) AQUEOUS PIGMENT DISPERSION AND AQUEOUS INK FOR INK JET RECORDING

(75) Inventors: Keiichi Tateishi, Kanagawa (JP); Hiroshi Yamamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/394,186

(22) PCT Filed: Sep. 2, 2010

(86) PCT No.: PCT/JP2010/065073
§ 371 (c)(1),
(2), (4) Date: Mar. 5, 2012

(87) PCT Pub. No.: WO2011/027841
PCT Pub. Date: Mar. 10, 2011

(65) Prior Publication Data
US 2012/0165438 A1 Jun. 28, 2012

(30) Foreign Application Priority Data

Sep. 4, 2009 (JP) ................. 2009-205353
Sep. 2, 2010 (JP) ................. 2010-197188

(51) Int. Cl.
*C09D 11/00* (2006.01)
*C08K 5/34* (2006.01)
*C08L 33/06* (2006.01)

(52) U.S. Cl.
USPC ............................ 523/160; 524/106; 524/560

(58) Field of Classification Search
USPC .................. 523/160; 524/106, 560
See application file for complete search history.

(56) References Cited

U.S. PATENT DOCUMENTS

| 2,936,306 | A | 5/1960 | Schmid et al. |
| 7,125,446 | B2 | 10/2006 | Potenza et al. |
| 8,062,383 | B2 * | 11/2011 | Tateishi ................. 8/637.1 |
| 8,080,067 | B2 * | 12/2011 | Tateishi et al. ............ 8/637.1 |
| 8,101,011 | B2 * | 1/2012 | Tateishi et al. .......... 106/31.46 |
| 8,172,910 | B2 * | 5/2012 | Tateishi et al. ............ 8/637.1 |
| 8,236,065 | B2 * | 8/2012 | Tateishi et al. ............ 8/637.1 |
| 8,328,344 | B2 * | 12/2012 | Yamamoto et al. ........... 347/100 |
| 2008/0058531 | A1 | 3/2008 | Schmidt et al. |
| 2009/0203823 | A1 * | 8/2009 | Sasada et al. ............ 524/377 |
| 2009/0203833 | A1 * | 8/2009 | Sasada et al. ............ 524/558 |
| 2009/0221742 | A1 * | 9/2009 | Hosokawa et al. .......... 524/558 |
| 2010/0221506 | A1 * | 9/2010 | Morimoto ............... 428/195.1 |
| 2010/0240812 | A1 * | 9/2010 | Yamamoto ............... 524/105 |
| 2010/0302305 | A1 * | 12/2010 | Tateishi et al. ............ 347/20 |
| 2011/0001777 | A1 * | 1/2011 | Hayashi et al. ............ 347/20 |
| 2011/0017099 | A1 * | 1/2011 | Tateishi et al. ............ 106/494 |
| 2011/0023753 | A1 * | 2/2011 | Tateishi ................. 106/494 |
| 2011/0050789 | A1 * | 3/2011 | Irita .................... 347/21 |
| 2011/0050790 | A1 * | 3/2011 | Irita .................... 347/21 |
| 2011/0166267 | A1 * | 7/2011 | Tateishi et al. ............ 524/100 |
| 2011/0179974 | A1 * | 7/2011 | Tateishi et al. ............ 106/496 |
| 2011/0245475 | A1 * | 10/2011 | Tateishi et al. ............ 534/579 |
| 2011/0300344 | A1 * | 12/2011 | Tateishi ................. 428/195.1 |
| 2012/0156449 | A1 * | 6/2012 | Tateishi et al. ............ 428/195.1 |
| 2012/0165437 | A1 * | 6/2012 | Tateishi et al. ............ 524/100 |

FOREIGN PATENT DOCUMENTS

| EP | 2096150 | A2 | 9/2009 |
| EP | 2474576 | A1 | 7/2012 |
| EP | 2474581 | A1 | 7/2012 |
| JP | 5638354 | A | 4/1981 |
| JP | 58210084 | A | 12/1983 |
| JP | 6136362 | A | 2/1986 |
| JP | 5222314 | A | 8/1993 |
| JP | 848908 | A | 2/1996 |
| JP | 11100519 | A | 4/1999 |
| JP | 200334767 | A | 2/2003 |
| JP | 2003277662 | A | 10/2003 |
| JP | 2005535738 | A | 11/2005 |
| JP | 2007063520 | A | 3/2007 |
| JP | 4073453 | B2 | 2/2008 |
| JP | 2009191133 | A | 8/2009 |
| JP | 2009227957 | A | 10/2009 |
| JP | 2010-168577 | A | 8/2010 |
| WO | 2009/005137 | A2 | 1/2009 |

Pig.-1

$2\theta [°]$

| WO | WO 2009057712 | * | 5/2009 | ............. | C09D 11/00 |
| WO | WO 2010024317 A1 | | 3/2010 | | |
| WO | WO 2010074350 | * | 7/2010 | ............. | C09D 11/00 |

OTHER PUBLICATIONS

International Search Report (PCT/ISA/210) issued on Feb. 11, 2010 in the International Patent Application No. PCT/JP2010/065073.
Written Opinion (PCT/ISA/237) issued on Feb. 11, 2010 in the International Patent Application No. PCT/JP2010/065073.
Extended European Search Report, dated for Oct. 9, 2013, issued by the European Patent Office in counterpart European Application No. 10813789.4.

* cited by examiner

*Primary Examiner* — Alexander Kollias
(74) *Attorney, Agent, or Firm* — Sughrue Mion, PLLC

(57) ABSTRACT

[Problem] To provide an aqueous ink for inkjet recording, which realizes excellent ink ejection properties, tinctorial strength, and image fastness.

[Means for Resolution] An ink containing a pigment dispersion containing A and B, and an aqueous medium:
A: an azo pigment represented by the following formula (1) and having at least one characteristic peak at Bragg angles (2θ) of 5 to 15° and 20 to 30° in X-ray diffraction with characteristic Cu Kα line; and
B: a vinyl polymer containing a hydrophobic structural unit (a) and a hydrophilic structural unit (c).

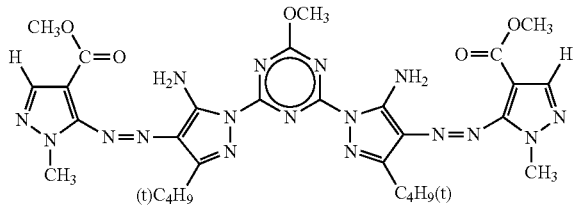

15 Claims, 10 Drawing Sheets

Pig.-1

Pig.-18

Pig.-2

Pig.-3

Pig.-6

Pig.-10

Pig.-16

Pig.-19

Pig.-21

Pig.-24

Pig.-25

Pig.-26

Pig.-30

Pig.-31

Pig.-32

Pig.-33

Pig.-34

AQUEOUS PIGMENT DISPERSION AND AQUEOUS INK FOR INK JET RECORDING

TECHNICAL FIELD

The present invention relates to an aqueous pigment dispersion having excellent dispersion stability and storage stability, which contains an azo pigment showing excellent ink ejection properties and realizing good hue and high print density (high tinctorial strength), and high image fastness of printed products (for example, light fastness, gas fastness, heat fastness, and water fastness), a vinyl polymer, and an aqueous medium, and to an aqueous ink for inkjet recording.

BACKGROUND ART

In recent years, as image-recording materials, materials for forming color images have been predominant and, specifically, recording materials for an ink jet system, recording materials for a thermal transfer system, recording materials for an electrophotographic system, transfer type silver halide light-sensitive materials, printing inks, and recording pens have found widespread use. Also, in photographing devices such as CCDs for photographing equipment, and in LCDs and PDPs for display, color filters are used for recording or reproducing a color image. In these color image recording materials and color filters, colorants (dyes or pigments) of three primary colors of a so-called additive color mixing process or subtractive color mixing process have been used in order to display or record full-color images. In actuality, however, there is no fast colorant having the absorption characteristics capable of realizing a preferred color reproduction region and resisting various use conditions and environmental conditions. Thus, the improvement thereof has strongly been desired.

In particular, use of recording materials has extended from domestic use to industrial use and, as a result, they are required to have performance at a higher level (regarding hue, tinctorial strength, and image fastness to light, gas, heat, moisture, and chemicals).

With respect to coloring materials to be used (for example, an ink for inkjet recording), dye inks are required to be changed from water-soluble inks to oil-soluble inks and, in the case where a much higher level of performance is required (from indoor use to outdoor use), the inks are required to be changed from dye inks to pigment inks.

With respect to outdoor uses, not only preserving properties of each single color but well-balanced preserving properties between respective colors and well-balanced preserving properties with each color in low density regions to high density regions are required to be provided at higher levels than in indoor uses.

Difference between dyes and pigments in using manner is that, while dyes are used in a state of being dissolved (a state of molecular dispersion) in a medium such as fibers or solvents, pigments are used in a state of solid particles (molecular aggregate) finely dispersed in a medium without being dissolved.

The dyes or pigments to be used for the above-mentioned uses are required to have in common the following properties. That is, they are required to have absorption characteristics favorable in view of color reproduction and have good fastness under the conditions of the environment wherein they are used, for example, fastness against light, heat, and an oxidative gas such as ozone.

In addition, in the case where the colorant is a pigment, the pigment is further required to be substantially insoluble in water or in an organic solvent, to have a good fastness to chemicals, and not to lose the preferred absorption characteristics it shows in a molecularly dispersed state even when used as pigment particles. Although the required properties described above can be controlled by adjusting the intensity of intramolecular and intermolecular mutual action, both of them are in a trade-off relation with each other, thus being difficult to allow them to be compatible with each other.

Besides, in the case of using a pigment as the colorant, the pigment is additionally required to have a particle size and a particle shape necessary for realizing desired transparency, to have good fastness under the conditions of the environment wherein they are used, for example, fastness against light, heat, and an oxidative gas such as ozone, to have good fastness to an organic solvent and chemicals such as a sulfurous acid gas, and to be capable of being dispersed in a used medium to a level of fine particles, with the dispersed state being stable. In particular, there is a strong demand for a pigment which has a good yellow hue and a high tinctorial strength and is fast to light, heat, moisture, and active gases in the environment.

That is, in comparison with a dye which is required to have properties as colorant molecules, the pigment is required to have more properties, i.e., it is required to satisfy all of the above-mentioned requirements as a solid of an aggregate of a colorant (dispersion of fine particles) as well as the properties as molecules of a colorant molecule. As a result, a group of compounds which can be used as pigments are extremely limited in comparison with dyes. Even when high-performance dyes are converted to pigments, few of them can satisfy requirement for the properties as a dispersion of fine particles. Thus, such pigments are difficult to develop. This can be confirmed from the fact that the number of pigments registered in Color Index is no more than $1/10$ of the number of dyes.

Azo pigments are excellent in hue and tinctorial strength which are characteristics of coloring, and hence they have widely been used in printing inks, inks for an inkjet system, and electrophotographic materials. Of the pigments, diarylide pigments are the most typically used yellow azo pigments. Examples of such diarylide pigments include C.I. pigment yellow 12, C.I. pigment yellow 13, and C.I. pigment yellow 17. However, the diarylide pigments are inferior in fastness, particularly light fastness, and hence they are inappropriate for prints which are to be stored for a long time.

In order to remove such defects, there have been disclosed azo pigments having a fastness improved by increasing molecular weight or by introducing a group having a strong intermolecular mutual action (see, for example, patent documents 1 to 3). However, even the improved pigments, for example, the pigments described in patent document 1 have the defect that they have still insufficient light fastness though improved to some extent, and pigments described in, for example, patent documents 2 and 3 have a greenish hue and a low tinctorial strength, thus being inferior in coloring characteristics.

Also, patent document 4 discloses colorants which have absorption characteristics of excellent color reproducibility and has a sufficient fastness. However, all of the specific compounds described in the patent document are soluble in water or in an organic solvent, thus being insufficient in resistance to chemicals.

Incidentally, patent document 5 describes an example of using a dye as a colorant and dissolving it in a water medium to use as a water-soluble ink for inkjet recording. Also, patent document 6 describes an anion-type monoazo compound characterized by light fastness. However, the level of image fastness of these is not satisfying at a high level, and they fail to provide a using manner as a pigment.

In the case of expressing a full-color image based on the subtractive color mixing process using three colors of yellow, magenta, and cyan or using four colors further including black, use of a pigment having an inferior fastness as a yellow pigment would change gray balance of the prints with the lapse of time, and use of a pigment having inferior coloring characteristics would reduce color reproducibility upon printing. Thus, in order to obtain prints which can maintain high color reproducibility for a long time, there have been desired a yellow pigment and a pigment dispersion which have both good coloring characteristics and good fastness.

Also, patent document 7 discloses colorants, as dyes, having absorption characteristics excellent in color reproducibility with an extremely high-level fastness.

On the other hand, with many of typical organic pigments, there exist polymorphic forms, and it has been known that such pigments take two or more crystal forms in spite of having the same chemical composition.

With some organic pigments, fine and size distribution-controlled particles can be obtained by selecting appropriate reaction conditions upon synthesis. There are pigments such as copper phthalocyanine green which are formed into pigments by allowing extremely fine and aggregated particles produced upon synthesis to grow in a subsequent step with size distribution being controlled, and pigments such as copper phthalocyanine blue pigment which are formed into pigments by pulverizing coarse and uneven particles produced upon synthesis in a subsequent step and controlling the size distribution. For example, a diketopyrrolopyrrole pigment is generally synthesized by reacting a succinic diester with an aromatic nitrile in an organic solvent (see, for example, patent document 8). The crude diketopyrrolopyrrole pigment is heat-treated in water or in an organic solvent, and then subjected to pulverization such as wet milling into a form appropriate for use (see, for example, patent document 9). For example, with a diketopyrrolopyrrole pigment of C.I. Pigment Red 254, an α-type crystal form and a β-type crystal form are known (see, for example, patent document 10). Also, with an azo pigment of C.I. Pigment Yellow 181, several crystal forms are known (see, for example, patent document 11).

RELATED ART DOCUMENTS

Patent Document

Patent document 1: JP-A-56-38354
Patent document 2: U.S. Pat. No. 2,936,306
Patent document 3: JP-A-11-100519
Patent document 4: JP-A-2003-277662
Patent document 5: U.S. Pat. No. 7,125,446
Patent document 6: JP-A-61-36362
Patent document 7: Japanese Patent No. 4,073,453
Patent document 8: JP-A-58-210084
Patent document 9: JP-A-5-222314
Patent document 10: JP-A-8-48908
Patent document 11: US Patent Application Publication No. 2008/058531

DISCLOSURE OF THE INVENTION

Problems that the Invention is to Solve

However, all of the specific compounds described in patent document 7 have such a high solubility for an organic solvent that, in case of using as pigments, an intended fine particle dispersion of the pigment cannot be obtained, with a solution wherein the colorant is dissolved or an emulsion being obtained. As a result, it has been difficult to use as a coloring material containing a pigment dispersed therein for the purpose of providing various required performances at high levels.

An object of the present invention is to provide an aqueous ink for inkjet recording, which contains an azo pigment showing excellent ink ejection properties and realizing good hue and high print density (high tinctorial strength), and high image fastness of printed products (for example, light fastness, gas fastness, heat fastness, and water fastness (particularly, light fastness for outdoor use)), a vinyl polymer, and an aqueous medium, and to an aqueous pigment dispersion having excellent dispersion stability and storage stability.

Means for Solving the Problem

As a result of intensive investigations in consideration of the above-mentioned circumstances, the inventors have found that the inventors have found that azo pigments wherein the carbon atom adjacent to an azo group is substituted by a carbonyl group capable of forming an intramolecular hydrogen bond have excellent coloring properties, form dispersed particles of a small particle diameter, and have both tinctorial strength and light fastness, and have further found that these problems can be solved by combining the azo pigment with both a vinyl polymer having a specific structure and an aqueous medium, thus having achieved the present invention.

Thus, the objectives of the present invention are achieved by the following means.

(1) An aqueous pigment dispersion having A and B, wherein A represents an azo pigment represented by the following general formula (1) and having at least one characteristic peak at Bragg angles (2θ) of 5 to 15° and 20 to 30° in X-ray diffraction with characteristic Cu Kα line, a tautomer thereof, or a salt or hydrate thereof, B is a vinyl polymer containing a hydrophobic structural unit (a) represented by the following general formula (AI) and a hydrophilic structural unit (c).

(1):

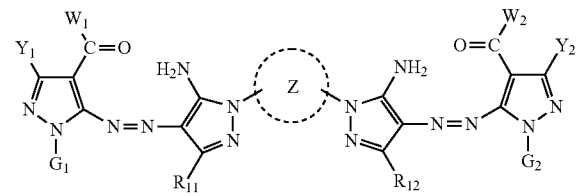

In the general formula (1), Z represents a 5- to 6-membered heterocyclic ring, $Y_1$, $Y_2$, $R_{11}$, and $R_{12}$ each independently represents a hydrogen atom or a substituent, $G_1$ and $G_2$ each independently represents a hydrogen atom, an alkyl group, an aralkyl group, an alkenyl group, an alkynyl group, an aryl group, or a heterocyclic group, and $W_1$ and $W_2$ each independently represents an alkoxy group, an amino group, an alkyl group, or an aryl group.

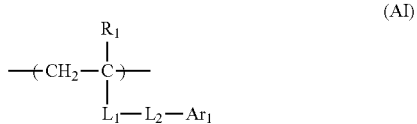

(AI)

In the general formula (AI), $R_1$ represents a hydrogen atom, a methyl group, or a halogen atom, $L_1$ represents —COO—, —COO—, —CONR$_2$—, —O—, or a substituted or unsubstituted phenylene group, $R_2$ represents a hydrogen atom or an alkyl group, $L_2$ represents a single bond or a divalent linking group, and $Ar_1$ represents a monovalent group derived from an aromatic hydrocarbon ring.

(2) The aqueous pigment dispersion according to claim (1), wherein $W_1$ and $W_2$ in the azo pigment represented by the general formula (1), a tautomer thereof, or a salt or hydrate thereof each independently represents an alkoxy group containing a total carbon atoms of 5 or less, an amino group, or an alkylamino group containing a total carbon atoms of 5 or less.

(3) The aqueous pigment dispersion according to (1) or (2), wherein $G_1$ and $G_2$ in the azo pigment represented by the general formula (1), a tautomer thereof, or a salt or hydrate thereof each independently represents an alkyl group containing a total carbon atoms of 3 or less.

(4) The aqueous pigment dispersion for inkjet recording according to any one of (1) to (3), wherein Z in the azo pigment represented by the general formula (1), a tautomer thereof, or a salt or hydrate thereof represents a 6-membered nitrogen-containing heterocyclic ring.

(5) The aqueous pigment dispersion according to (1), wherein the azo pigment represented by the general formula (1) is represented by the following general formula (10).

(10):

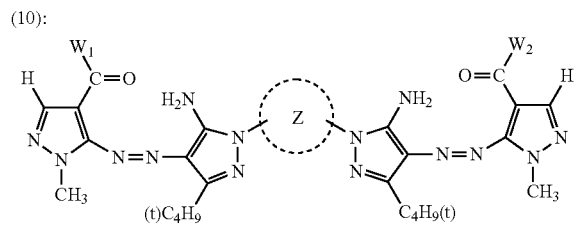

In the general formula (10), Z represents a 5- to 6-membered nitrogen-containing heterocyclic ring, and $W_1$ and $W_2$ each independently represents an alkoxy group, an amino group, an alkyl group, or an aryl group.

(6) The aqueous pigment dispersion according to (5), wherein the azo pigment represented by the general formula (10) is represented by the following general formula (11).

(11):

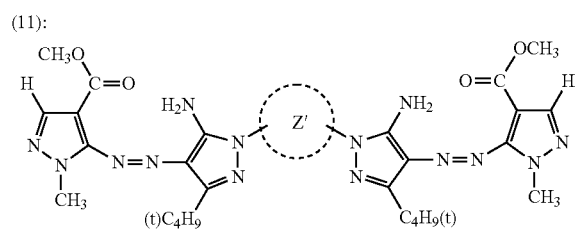

In the general formula (11), Z' represents a 6-membered nitrogen-containing heterocyclic ring.

(7) The aqueous pigment dispersion according to any one of (1) to (6), wherein the azo pigment represented by the general formula (1), a tautomer thereof, or a salt or hydrate thereof contains at least one azo pigment represented by the following general formula (1a) and having characteristic X-ray peaks at Bragg angles) (2θ±0.2° in X-ray diffraction with characteristic Cu Kα line of 7.2° and 25.9 or a tautomer thereof.

(1a):

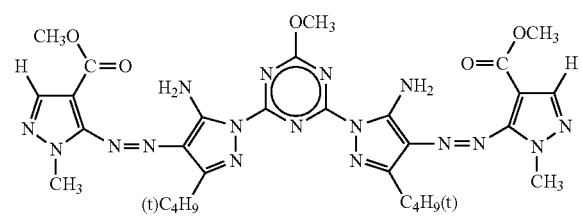

(8) The aqueous pigment dispersion according to any one of (1) to (6), wherein the azo pigment represented by the general formula (1), a tautomer thereof, or a salt or hydrate thereof contains at least one azo pigment represented by the following general formula (2a) and having characteristic X-ray peaks at Bragg angles) (2θ±0.2° in X-ray diffraction with characteristic Cu Kα line of 7.6°, 25.6°, and 27.7 or a tautomer thereof.

(2a):

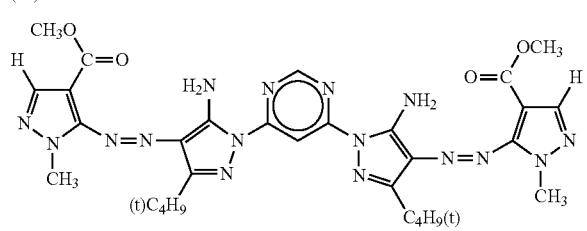

(9) The aqueous pigment dispersion according to any one of (1) to (6), wherein the azo pigment represented by the general formula (1), a tautomer thereof, or a salt or hydrate thereof contains at least one azo pigment represented by the following general formula (3a) and having characteristic X-ray peaks at Bragg angles) (2θ±0.2° in X-ray diffraction with characteristic Cu Kα line of 7.5°, 11.2°, 18.6°, 21.2°, and 23.9 or a tautomer thereof.

(3a):

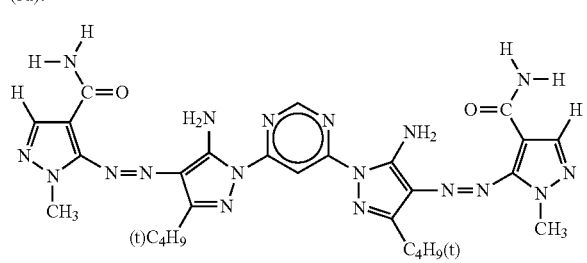

(10) The aqueous pigment dispersion according to any one of (1) to (9), wherein the vinyl polymer represented by B further contains a hydrophobic structural unit (b) derived from an alkyl ester of acrylic acid or methacrylic acid.

(11) The aqueous pigment dispersion according to any one of (1) to (10), wherein the hydrophobic structural unit (a) contains at least one member selected from a structural unit derived from phenoxyethyl(meth)acrylate and a structural unit derived from benzyl (meth)acrylate in a total ratio of 20% by weight or more based on the weight of entire vinyl polymer, and the hydrophilic structural unit (c) contains at least one member selected from a structural unit derived from acrylic acid and a structural unit derived from methacrylic acid in a ratio of 30% by weight or less based on the weight of entire vinyl polymer.

(12) The aqueous pigment dispersion according to any one of (1) to (11), wherein the hydrophobic structural unit (a) contains a structural unit derived from phenoxyethyl (meth)acrylate in a total ratio of 20% by weight or more based on the weight of entire vinyl polymer.

(13) The aqueous pigment dispersion according to any one of (1) to (12), wherein the vinyl polymer represented by B is a polymer represented by the following general formula (AII).

(AII):

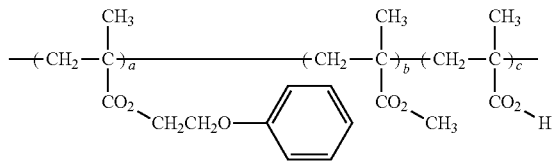

In the general formula (AII), a represents a ratio of from 10% by weight to less than 75% by weight, based on the weight of the entire vinyl polymer, b represents a ratio of from 5% by weight to less than 50% by weight, based on the weight of the entire vinyl polymer, c represents a ratio of from 4% by weight to less than 50% by weight, based on the weight of the entire vinyl polymer, and a+b+c=100.

(14) The aqueous pigment dispersion according to any one of (1) to (13), which further contains an aqueous medium.

(15) An aqueous ink for inkjet recording, having an aqueous pigment dispersion according to any one of (1) to (14).

Advantages of the Invention

According to the present invention, there are provided, by combining a specific azo pigment, a specific vinyl polymer, and an aqueous medium, (1) an aqueous pigment dispersion having excellent storage stability, which contains an azo pigmen, a vinyl polymer, and an aqueous medium and (2) an aqueous ink for inkjet recording which contains an azo pigment showing excellent ink ejection properties and realizing good hue and high print density (high tinctorial strength), and high image fastness of printed products (for example, light fastness, gas fastness, heat fastness, and moisture fastness), a vinyl polymer, and an aqueous medium.

The aqueous pigment dispersion of the invention can be used for an ink for printing such as inkjet printing, a color toner for electrophotography, a display such as LCD or PDP, a color filter to be used in photographing equipment such as CCD, a paint, and a colored plastic.

MODE FOR CARRYING OUT THE INVENTION

<Aqueous Pigment Dispersion>

Figure 1:
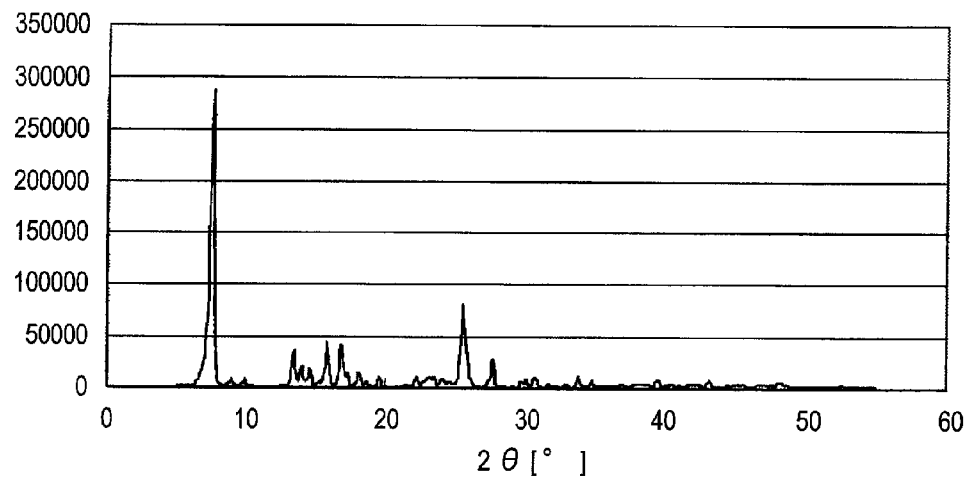
FIG. 1 is a Cu Kα X-ray diffraction pattern of an azo pigment obtained in Synthesis Example 1.

The aqueous pigment dispersion of the present invention contains A and B:

A: an azo pigment represented by the following formula (1) and in a crystal form having at least one characteristic peak at Bragg angles (2θ) of 5 to 15° and 20 to 30° in X-ray diffraction with characteristic Cu Kα line, a tautomer thereof, or a salt or hydrate thereof; and B: a vinyl polymer containing a hydrophobic structural unit (a) represented by the following general formula (AI) and a hydrophilic structural unit (c):

(1):

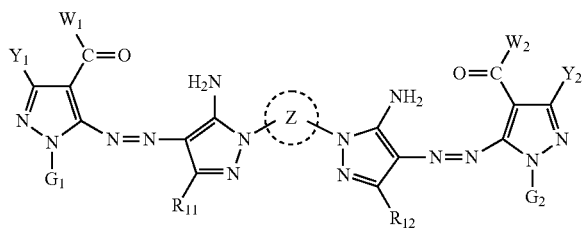

(in the general formula (1), Z represents a 5- to 6-membered heterocyclic ring, $Y_1$, $Y_2$, $R_{11}$, and $R_{12}$ each independently represents a hydrogen atom or a substituent, $G_1$ and $G_2$ each independently represents a hydrogen atom, an alkyl group, an aralkyl group, an alkenyl group, an alkynyl group, an aryl group, or a heterocyclic group, and $W_1$ and $W_2$ each independently represents an alkoxy group, an amino group, an alkyl group, or an aryl group.)

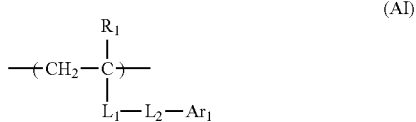

(AI)

(in the general formula (AI), $R_1$ represents a hydrogen atom, a methyl group, or a halogen atom, $L_1$ represents —COO—, —COO—, —CONR$_2$—, —O—, or a substituted or unsubstituted phenylene group, $R_2$ represents a hydrogen atom or an alkyl group, $L_2$ represents a single bond or a divalent linking group, and $Ar_1$ represents a monovalent group derived from an aromatic hydrocarbon ring).

The pigment dispersion of the invention realizes, by containing A and B described above, 1: an aqueous pigment dispersion having excellent storage stability, which contains an azo pigmen, a vinyl polymer, and an aqueous medium, and 2: excellent ink ejection properties, good hue and high print density (high tinctorial strength), and high image fastness of printed products (light fastness, ozone gas fastness, heat fastness, and moisture fastness).

[Azo Pigments Represented by the General Formula (1)]

The compounds represented by the general formula (1) are liable to produce intramolecular and intermolecular action of the colorant molecules due to the specific structure thereof, and show low solubility in water or an organic solvent, thus being able to be formed into preferred form azo pigments.

Pigments are used by finely dispersing in a medium as particles of aggregates molecules as is different from dyes which are used by dissolving in water or an organic solvent in a molecular dispersion state.

(1):

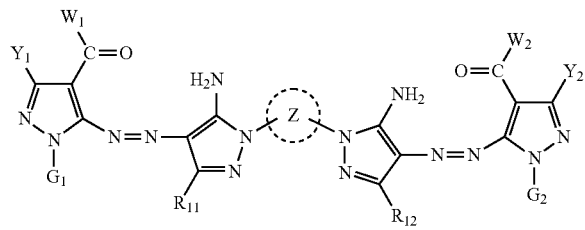

(In the general formula (1), Z represents a 5- to 6-membered heterocyclic ring, $Y_1$, $Y_2$, $R_{11}$, and $R_{12}$ each independently represents a hydrogen atom or a substituent, $G_1$ and $G_2$ each independently represents a hydrogen atom, an alkyl group, an aralkyl group, an alkenyl group, an alkynyl group, an aryl group, or a heterocyclic group, and $W_1$ and $W_2$ each independently represents an alkoxy group, an amino group, an alkyl group, or an aryl group.)

The alkoxy group represented by $W_1$ or $W_2$ is preferably a substituted or unsubstituted alkoxy group containing from 1 to 30 carbon atoms, more preferably a substituted or unsubstituted alkoxy group containing from 1 to 8 carbon atoms, still more preferably a substituted or unsubstituted alkoxy group containing from 1 to 4 carbon atoms, and examples thereof include a methoxy group, an ethoxy group, a n-propoxy group, an i-propoxy group, a n-butoxy group, an i-butoxy group, a s-butoxy group, a t-butoxy group, a n-octyloxy group, and a 2-methoxyethoxy group, with a methoxy group being particularly preferred.

The amino group represented by $W_1$ or $W_2$ includes an alkylamino group, an arylamino group, and a heterocyclic amino group, and is preferably an amino group, a substituted or unsubstituted alkylamino group containing from 1 to 30 carbon atoms, or a substituted or unsubstituted anilino group containing from 6 to 30 carbon atoms. Of these, an amino group, a substituted or unsubstituted alkylamino group containing from 1 to 8 carbon atoms, or a substituted or unsubstituted anilino group containing from 6 to 18 carbon atoms are preferred, and an amino group, a substituted or unsubstituted alkylamino group containing from 1 to 4 carbon atoms, or a substituted or unsubstituted anilino group containing from 6 to 12 carbon atoms are more preferred. Examples thereof include an amino group (—NH$_2$), a methylamino group (—NHCH$_3$), a dimethylamino group {—N(CH$_3$)$_2$}, an anilino group (NHPh), an N-methyl-anilino group {—N(CH$_3$)Ph}, and a diphenylamino group {—N(Ph)$_2$}. Of these, an amino group is particularly preferred.

The alkyl group represented by $W_1$ or $W_2$ includes straight, branched, or cyclic, substituted or unsubstituted alkyl groups, with a cycloalkyl group, a bicycloalkyl group and, further, a tricyclic group having more cyclic structures being also included. An alkyl group in the substituents to be described hereinafter (for example, an alkyl group in an alkoxy group or an alkylthio group) also represents the alkyl group of the above-described concept. More specifically, the alkyl group is preferably an alkyl group containing from 1 to 30 carbon atoms, and examples thereof include a methyl group, an ethyl group, a n-propyl group, an i-propyl group, a n-butyl group, an i-butyl group, a s-butyl group, a t-butyl group, a n-octyl group, an eicosyl group, a 2-chloroethyl group, a 2-cyanoethyl group, and a 2-ethylhexyl group. The cycloalkyl group is preferably a substituted or unsubstituted cycloalkyl group containing from 3 to 30 carbon atoms, and examples thereof include a cyclohexyl group, a cyclopentyl group, and a 4-n-dodecylcyclohexyl group. The bicycloalkyl group is preferably a substituted or unsubstituted bicycloalkyl group containing from 5 to 30 carbon atoms, i.e., a monovalent group formed by removing one hydrogen atom from a bicycloalkane containing from 5 to 30 carbon atoms, and examples thereof include a bicyclo[1,2,2]heptan-2-yl group and a bicyclo[2,2,2]octan-3-yl group.

The aryl group represented by $W_1$ or $W_2$ is preferably a substituted or unsubstituted aryl group containing from 6 to 30 carbon atoms. Of these, a substituted or unsubstituted aryl group containing from 6 to 18 carbon atoms are preferred, and a substituted or unsubstituted aryl group containing from 6 to 12 carbon atoms are more preferred, and examples thereof include a phenyl group, a p-tolyl group, a naphthyl group, a m-chlorophenyl group, and an o-hexadecanoylaminophenyl group.

$W_1$ and $W_2$ each preferably represents independently an alkoxy group, an amino group, or an alkyl group, more preferably represents an alkoxy group or an amino group, still more preferably represents an alkoxy group containing a total of 5 or less carbon atoms, an amino group (—NH$_2$ group), or an alkylamino group containing a total of 5 or less carbon atoms, particularly preferably represents an alkoxy group containing a total of 3 or less carbon atoms or an alkylamino group containing a total of 3 or less carbon atoms, with a methoxy group being most preferred. In the case where $W_1$ and $W_2$ represent an alkoxy group containing a total of 5 or less carbon atoms, an amino group, or an alkylamino group containing a total of 5 or less carbon atoms, the colorant molecules are liable to produce strong intramolecular and intermolecular mutual action (hydrogen bonding or π-π stacking), and hence they can easily constitute a pigment having a more stable molecular alignment (for example, 3-dimensional network), thus being preferred in the points of good hue and high fastness (to light, gas, heat, water, and chemicals).

In the general formula (1), $R_{11}$ and $R_{12}$ each independently represents a hydrogen atom or a substituent. Examples of the substituent when $R_{11}$ and $R_{12}$ each independently represents a substituent include a straight or branched alkyl group containing from 1 to 12 carbon atoms, a straight or branched aralkyl group containing from 7 to 18 carbon atoms, a straight or branched alkenyl group containing from 2 to 12 carbon atoms, a straight or branched alkynyl group containing from 2 to 12 carbon atoms, a straight or branched cycloalkyl group containing from 3 to 12 carbon atoms, a straight or branched cycloalkenyl group containing from 3 to 12 carbon atoms (for example, methyl, ethyl, n-propyl, i-propyl, n-butyl, i-butyl, sec-butyl, t-butyl, 2-ethylhexyl, 2-methylsulfonylethyl, 3-phenoxypropyl, trifluoromethyl or cyclopentyl), a halogen atom (for example, a chlorine atom or a bromine atom), an aryl group (for example, phenyl, 4-t-butylphenyl or 2,4-di-t-amylphenyl), a heterocyclic group (for example, imidazolyl, pyrazolyl, triazolyl, 2-furyl, 2-thienyl, 2-pyrimidinyl or 2-benzothiazolyl), a cyano group, a hydroxyl group, a nitro group, a carboxy group, an amino group, an alkyloxy group (for example, methoxy, ethoxy, 2-methoxyethoxy or 2-methylsulfonylethoxy), an aryloxy group (for example, phenoxy, 2-methylphenoxy, 4-t-butylphenoxy, 3-nitrophenoxy, 3-t-butyloxycarbonylphenoxy, or 3-methoxycarbonylphenyloxy), an acylamino group (for example, acetamido, benzamido or 4-(3-t-butyl-4-hydroxyphenoxy)butanamido), an alkylamino group (for example, methylamino, butylamino, diethylamino or methylbutylamino), an arylamino group (for example, phenylamino or 2-chloroanilino), an ureido group (for example, phenylureido, methylureido or N,N-dibutylureido), a sulfamoylamino group (for example, N,N-dipropylsulfamoylamino), an alkylthio group (for example, methylthio, octylthio or 2-phenoxyethylthio), an arylthio group (for example, phenylthio, 2-butoxy-5-t-octylphenylthio or 2-carboxyphenylthio), an alkyloxycarbonylamino group (for example, methoxycarbonylamino), an alkylsulfonylamino group and an arylsulfonylamino group (for example, methylsulfonylamino, phenylsulfonylamino or p-toluenesulfonylamino), a carbamoyl group (for example, N-ethylcarbamoyl or N,N-dibutylcarbamoyl), a sulfamoyl group (for example, N-ethylsulfamoyl, N,N-dipropylsulfamoyl or N-phenylsulfamoyl), a sulfonyl group (for example, methylsulfonyl, octylsulfonyl, phenylsulfonyl or p-toluenesulfonyl), an alkyloxycarbonyl group (for example, methoxycarbonyl or butyloxycarbonyl), a heterocyclic oxy group (for example, 1-phenyltetrazol-5-oxy or 2-tetrahydropyranyloxy), an azo group (for example, phenylazo, 4-methoxyphenylazo, 4-pivaloylaminophenylazo or 2-hydroxy-4-propanoylphenylazo), an acyloxy group (for example, acetoxy), a carbamoyloxy group (for example, N-methylcarbamoyloxy or N-phenylcarbamoyloxy), a silyloxy group (for example, trimethylsilyloxy or dibutylmethylsilyloxy), an aryloxycarbonylamino group (for example, phenoxycarbonylamino), an imido group (for example, N-succinimido or N-phthalimido), a heterocyclic thio group (for example, 2-benzothiazolylthio, 2,4-di-phenoxy-1,3,5-triazol-6-thio or 2-pyridylthio), a sulfinyl group (for example, 3-phenoxypropylsulfinyl), a phosphonyl group (for example, phenoxyphosphonyl, octyloxyphosphonyl, or phenylsulfonyl), an aryloxycarbonyl group (for example, phenoxycarbonyl), an acyl group (for example, acetyl, 3-phenylpropanoyl, or benzoyl), and an ionic hydrophilic group (for example, a carboxyl group, a sulfo group, a phosphono group, or a quaternary ammonium group).

In the general formula (1), $R_{11}$ and $R_{12}$ each preferably represents independently a substituted or unsubstituted acylamino group containing a total of from 1 to 8 carbon atoms, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms, more preferably represents a straight or branched alkyl group containing a total of from 1 to 8 carbon atoms, or an aryl group containing a total of from 6 to 18 carbon atoms. Of these, a straight or branched alkyl group containing a total of from 1 to 8 carbon atom is preferred and, more specifically, a methyl group, an i-propyl group, or a t-butyl group is preferred, an i-propyl group or a t-butyl group is particularly preferred, with a t-butyl group being most preferred.

When $R_{11}$ and $R_{12}$ represent a straight or branched alkyl group containing a total of a small number (from 1 to 4) of carbon atoms, the steric alignment of the colorant molecules can be controlled with ease (aligned with a definite distance and a definite angle). As a result, pigment particles having a stable intramolecular and intermolecular mutual action (hydrogen bonding or π-π stacking) are easily formed, which serves to easily constitute a more stable molecular alignment (for example, 3-dimensional network) and is therefore preferred in view of improving hue, tinctorial strength, and high image fastness (light fastness, gas fastness, heat fastness, water fastness and chemical fastness).

In the general formula (1), Z represents a heterocyclic group which may further be condensed with other ring(s). Z preferably represents a 5- to 6-membered heterocyclic ring, more preferably represents a substituted or unsubstituted 5- or 6-membered heterocyclic group, particularly preferably a 6-membered, nitrogen-containing heterocyclic group containing from 3 to 10 carbon atoms.

To illustrate the heterocyclic group represented by W without restricting the substitution position, there can be illustrated pyridyl, pyrazinyl, pyridazinyl, pyrimidinyl, triazinyl, quinolinyl, isoquinolinyl, quinazolinyl, cinnolinyl, phthalazinyl, quinoxalinyl, pyrrolyl, indolyl, furyl, benzofuryl, thienyl, benzothienyl, pyrazolyl, imidazolyl, benzimidazolyl, triazolyl, oxazolyl, benzoxazolyl, thiazolyl, benzothiazolyl, isothiazolyl, benzisothiazolyl, thiadiazolyl, isoxazolyl, benzisoxazolyl, pyrrolidinyl, piperidinyl, piperazinyl, imidazolidinyl, thiazolinyl, and sulfolanyl.

Preferred examples of the heterocyclic group include pyridyl, pyrimidinyl, S-triazinyl, pyridazinyl, pyrazinyl, 1,2,4-thiadiazolyl, 1,3,4-thiadiazolyl, and imidazolyl, and more preferred examples thereof include pyridyl, pyrimidinyl, S-triazinyl, pyridazinyl, and pyrazinyl. In view of hue, tinctorial strength, and image fastness, pyrimidinyl and S-triazinyl are particularly preferred. In view of hue and image fastness, pyrimidinyl having substituents at 4- and 6-positions and S-triazinyl having an alkoxy group containing from 1 to 4 carbon atoms at 2-position are still more preferred. Of them, pyrimidinyl having substituents at 4- and 6-positions is most preferred in the point of well improved light fastness of image.

When Z represents a pyrimidinyl group or an S-triazinyl group, the bis-type azo colorant easily forms intramolecular hydrogen bond between the amino group and the nitrogen-containing 6-membered heterocyclic ring, and the steric alignment of the colorant molecules can be controlled with ease (aligned with a definite distance and a definite angle). As a result, pigment particles having a stable intramolecular and intermolecular mutual action (hydrogen bonding or π-π stacking) are easily formed, which serves to easily constitute a more stable molecular alignment (for example, 3-dimensional network) and is therefore preferred in view of improving hue, tinctorial strength, and high image fastness (light fastness, gas fastness, heat fastness, water fastness, and chemical fastness).

$G_1$ and $G_2$ each independently represents a hydrogen atom, an alkyl group, an aralkyl group, an alkenyl group, an alkynyl group, an aryl group, or a heterocyclic group, particularly preferably represents a hydrogen atom, a methyl group, an ethyl group, a n-propyl group, an i-propyl group, a n-butyl group, an i-butyl group, a sec-butyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, or a pyrazinyl group, more preferably represents a hydrogen atom, a methyl group, a phenyl group, a pyridyl group, a pyrimidinyl group, or a pyrazinyl group. Of these, a straight or branched alkyl group containing a total of from 1 to 8 carbon atoms, a 2-pyridyl group, a 2,6-pyrimidinyl group, and a 2,5-pyrazinyl group are preferred, and an alkyl group containing a total of 3 or less carbon atoms is more preferred. Further, in view of hue and image fastness, a hydrogen atom or a methyl group is preferred, with a methyl group being particularly preferred in view of hue and light fastness.

Examples of the substituent when $Y_1$ and $Y_2$ each independently represents a substituent include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-xulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl- or heterocyclic azo group, an imido group, a phosphino group, a phosphinyl group, a phosphinyloxy group, a phosphinylamino group, and a silyl group. Particularly preferred examples of Y include a hydrogen atom, an alkyl group (for example, a methyl group), an aryl group (for example, a phenyl group), a heterocyclic group (for example, a 2-pyridyl group), and an alkylthio group (for example, a methylthio group), and more preferred are a hydrogen atom, a straight or branched alkyl group containing a total of from 1 to 4 carbon atoms, a phenyl group, and a methylthio group. Further, in view of hue and image fastness, a hydrogen atom and a methyl group are preferred, with a hydrogen atom being particularly preferred in view of hue and light fastness.

As substituents in the case where $G_1$, $G_2$, $Y_1$, $Y_2$, $W_1$, $W_2$, $R_{11}$, $R_{12}$, and Z further have a substituent, there can be illustrated the following substituents (hereinafter also referred to "substituent J" in some cases).

Examples of the substituents include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl- or heterocyclic azo group, an imido group, a phosphino group, a phosphinyl group, a phosphinyloxy group, a phosphinylamino group, and a silyl group.

More specifically, examples of the halogen atom include a fluorine atom, a chlorine atom, a bromine atom, and an iodine atom.

Examples of the alkyl group include straight, branched, or cyclic, substituted or unsubstituted alkyl groups, with a cycloalkyl group, a bicycloalkyl group and, further, a tricyclic structure having more cyclic structures being also included. An alkyl group in the substituents to be described hereinafter (for example, an alkyl group in an alkoxy group or an alkylthio group) also represents the alkyl group of the above-described concept. More specifically, the alkyl group is preferably an alkyl group containing from 1 to 30 carbon atoms, and examples thereof include a methyl group, an ethyl group, a n-propyl group, an isopropyl group, a t-butyl group, a n-octyl group, an eicosyl group, a 2-chloroethyl group, a 2-cyanoethyl group, and a 2-ethylhexyl group. The cycloalkyl group is preferably a substituted or unsubstituted cycloalkyl group continuing from 3 to 30 carbon atoms, and examples thereof include a cyclohexyl group, a cyclopentyl group, and a 4-n-dodecylcyclohexyl group. The bicycloalkyl group is preferably a substituted or unsubstituted bicycloalkyl group containing from 5 to 30 carbon atoms, i.e., a monovalent group formed by removing one hydrogen atom from a bicycloalkane containing from 5 to 30 carbon atoms, and examples thereof include a bicyclo[1,2,2]heptan-2-yl group and a bicyclo[2,2,2]octan-3-yl group.

Examples of the aralkyl group include substituted or unsubstituted aralkyl groups. Preferred examples of the substituted or unsubstituted aralkyl groups include aralkyl groups containing from 7 to 30 carbon atoms, such as a benzyl group and a 2-phenethyl group.

Examples of the alkenyl group include straight, branched, or cyclic, substituted or unsubstituted alkenyl groups, with a cycloalkenyl group and a bicycloalkenyl group being also included. More specifically, the alkenyl group is preferably a substituted or unsubstituted alkenyl group containing from 2 to 30 carbon atoms, and examples thereof include a vinyl group, an allyl group, a prenyl group, a geranyl group, or an oleyl group. The cycloalkenyl group is preferably a substituted or unsubstituted cycloalkyl group containing from 3 to 30 carbon atoms, i.e., a monovalent group formed by removing one hydrogen atom from a cycloalkene containing from 3 to 30 carbon atoms, and examples thereof include a 2-cyclopentenn-1-yl group and a 2-cyclohexen-1-yl group. The bicycloalenkyl group is a substituted or unsubstituted bicycloalkenyl group, preferably a substituted or unsubstituted bicycloalkenyl group containing from 5 to 30 carbon atoms, i.e., a monovalent group formed by removing one hydrogen atom from a bicycloalkene containing one double bond, and examples thereof include a bicyclo[2,2,1]hept-2-en-1-yl group and a bicyclo[2,2,2]oct-2-en-4-yl group.

The alkynyl group is preferably a substituted or unsubstituted alkynyl group containing from 2 to 30 carbon atoms, such as an ethynyl group, a propargyl group, or a trimethylsilylethynyl group.

The aryl group is preferably a substituted or unsubstituted aryl group containing from 6 to 30 carbon atoms, such as a phenyl group, a p-tolyl group, a naphthyl group, a m-chlorophenyl group, or an o-hexadecanoylaminophenyl group.

The heterocyclic group is preferably a monovalent group formed by removing one hydrogen atom from a 5- or 6-membered, substituted or unsubstituted, aromatic or non-aromatic, heterocyclic compound, more preferably a 5- or 6-membered aromatic heterocyclic group containing from 3 to 30 carbon atoms, such as a 2-furyl group, a 2-thienyl group, a 2-pyrimidinyl group, or a 2-benzothiazolyl group.

The alkoxy group is preferably a substituted or unsubstituted alkoxy group containing from 1 to 30 carbon atoms, and examples thereof include a methoxy group, an ethoxy group, an isopropoxy group, a t-butoxy group, a n-octyloxy group, and a 2-methoxyethoxy group.

The aryloxy group is preferably a substituted or unsubstituted aryloxy group containing from 6 to 30 carbon atoms, and examples thereof include a phenoxy group, a 2-methylphenoxy group, a 4-t-butylphenoxy group, a 3-nitrophenoxy group, and a 2-tetradecanoylaminophenoxy group.

The silyloxy group is preferably a substituted or unsubstituted silyloxy group containing from 0 to 20 carbon atoms, and examples thereof include a trimethylsilyloxy group and a diphenylmethylsilyloxy group.

The heterocyclic oxy group is preferably a substituted or unsubstituted heterocyclic oxy group containing from 2 to 30 carbon atoms, and examples thereof include a 1-phenyltetrazol-5-oxy group and a 2-tetrahydropyranyloxy group.

The acyloxy group is preferably a formyloxy group, a substituted or unsubstituted alkylcarbonyloxy group containing from 2 to 30 carbon atoms, a substituted or unsubstituted arylcarbonyloxy group containing from 6 to 30 carbon atoms, and examples thereof include an acetyloxy group, a pivaloyloxy group, a stearoyloxy group, a benzoyloxy group, and a p-methoxyphenylcarbonyloxy group.

The carbamoyloxy group is preferably a substituted or unsubstituted carbamoyloxy group containing from 1 to 30 carbon atoms, and the examples thereof include an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group.

The alkoxycarbonyloxy group is preferably a substituted or unsubstituted alkoxycarbonyloxy group containing from 2 to 30 carbon atoms, and the examples thereof include a methoxycarbonyloxy group, an ethoxycarbonyloxy group, a t-butoxycarbonyloxy group, and a n-octylcarbonyloxy group.

The aryloxycarbonyloxy group is preferably a substituted or unsubstituted aryloxycarbonyloxy group containing from 7 to 30 carbon atoms, and the examples thereof include a phenoxycabonyloxy group, a p-methoxyphenoxycarbonyloxy group, and a p-n-hexadecyloxyphenoxycarbonyloxy group.

The amino group includes an alkylamino group, an arylamino group, and a heterocyclic amino group, and is preferably an amino group, a substituted or unsubstituted alkylamino group containing from 1 to 30 carbon atoms, or a substituted or unsubstituted anilino group containing from 6 to 30 carbon atoms. Examples thereof include a methylamino group, a dimethylamino group, an anilino group, an N-methyl-anilino group, and a diphenylamino group.

The acylamino group is preferably a formylamino group, a substituted or unsubstituted alkylcarbonylamino group containing from 1 to 30 carbon atoms, or a substituted or unsubstituted arylcarbonylamino group containing from 6 to 30 carbon atoms. Examples thereof include an acetylamino group, a pivaloylamino group, a lauroylamino group, a benzoylamino group, and a 3,4,5-tri-n-octyloxyphenylcarbonylamino group.

The aminocarbonylamino group is preferably a substituted or unsubstituted aminocarbonylamino group containing from 1 to 30 carbon atoms, and the examples thereof include a carbamoylamino group, an N,N-dimethylaminocarbonylamino group, an N,N-diethylaminocarbonylamino group, and a morpholinocarbonylamino group.

The alkoxycarbonylamino group is preferably a substituted or unsubstituted alkoxycarbonylamino group containing from 2 to 30 carbon atoms, and the examples thereof include a methoxycarbonylamino group, an ethoxycarbonylamino group, a t-butoxycarbonylamino group, a n-octadecyloxycarbonylamino group, and an N-methyl-methoxycarbonylamino group.

The aryloxycarbonylamino group is preferably a substituted or unsubstituted aryloxycarbonylamino group containing from 7 to 30 carbon atoms, and the examples thereof include a phenoxycarbonylamino group, a p-chlorophenoxycarbonylamino group, and a m-n-octyloxyphenoxycarbonylamino group.

The sulfamoylamino group is preferably a substituted or unsubstituted sulfamoylamino group containing from 0 to 30 carbon atoms, and the examples thereof include a sulfamoylamino group, an N,N-dimethylaminosulfonylamino group, and an N-n-octylaminosulfonylamino group.

The alkyl- or aryl-sulfonylamino group is preferably a substituted or unsubstituted alkylsulfonylamino group containing from 1 to 30 carbon atoms, or a substituted or unsubstituted arylsulfonylamino group containing from 6 to 30 carbon atoms, and the examples thereof include a methylsulfonylamino group, a butylsulfonylamino group, a phenylsulfonylamino group, a 2,3,5-trichlorophenylsulfonylamino group, and a p-methylphenylsulfonylamino group.

The alkylthio group is preferably a substituted or unsubstituted alkylthio group containing from 1 to 30 carbon atoms, and the examples thereof include a methylthio group, an ethylthio group, and a n-hexadecylthio group.

The arylthio group is preferably a substituted or unsubstituted arylthio group containing from 6 to 30 carbon atoms, and the examples thereof include a phenylthio group, a p-chlorophenylthio group, and a m-methoxyphenylthio group.

The heterocyclic thio group is preferably a substituted or unsubstituted heterocyclic thio group containing from 2 to 30 carbon atoms, and the examples thereof include a 2-benzothiazolylthio group and a 1-phenyltetrazol-5-ylthio group.

The sulfamoyl group is preferably a substituted or unsubstituted sulfamoyl group containing from 0 to 30 carbon atoms, and the examples thereof include an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N—(N'-phenylcarbamoyl)sulfamoyl group.

The alkyl- or aryl-sulfinyl group is preferably a substituted or unsubstituted alkylsulfinyl group containing from 1 to 30 carbon atoms, or a substituted or unsubstituted arylsulfinyl group containing from 6 to 30 carbon atoms, and the examples thereof include a methylsulfinyl group, an ethylsulfinyl group, a phenylsulfinyl group, and a p-methylphenylsulfinyl group.

The alkyl- or aryl-sulfonyl group is preferably a substituted or unsubstituted alkylsulfonyl group containing from 1 to 30 carbon atoms, or a substituted or unsubstituted arylsulfonyl group containing from 6 to 30 carbon atoms, and the examples thereof include a methylsulfonyl group, an ethylsulfonyl group, a phenylsulfonyl group, and a p-methylphenylsulfonyl group.

The acyl group is preferably a formyl group, a substituted or unsubstituted alkylcarbonyl group containing from 2 to 30 carbon atoms, a substituted or unsubstituted arylcarbonyl group containing from 7 to 30 carbon atoms, or a substituted or unsubstituted heterocyclic carbonyl group containing from 2 to 30 carbon atoms wherein the heterocyclic ring is connected to the carbonyl group via a carbon atom. Examples thereof include an acetyl group, a pivaloyl group, a 2-chloroacetyl group, a stearoyl group, a benzoylamino group, a p-n-octyloxyphenylcarbonyl group, a 2-pyridylcarbonyl group, and a 2-furylcarbonyl group.

The aryloxycarbonyl group is preferably a substituted or unsubstituted aryloxycarbony group containing from 7 to 30 carbon atoms, and the examples thereof include a phenoxycarbonyl group, an o-chlorophenoxycarbonyl group, a m-nitrophenoxycarbonyl group, and a p-t-butylphenoxycarbonyl group.

The alkoxycarbonyl group is preferably a substituted or unsubstituted alkoxycarbony group containing from 2 to 30 carbon atoms, and the examples thereof include a methoxycarbonyl group, an ethoxycarbonyl group, a t-butoxycarbonyl group, and a n-octadecyloxycarbonyl group.

The carbamoyl group is preferably a substituted or unsubstituted carbamoyl group containing from 1 to 30 carbon atoms, and the examples thereof include a carbamoyl group, an N-methylcarbamoyl group, an N,N-dimethylcarbamoyl group, an N,N-di-n-octylcarbamoyl group, and an N-(methylsulfonyl)carbamoyl group.

The aryl or heterocyclic azo group is preferably a substituted or unsubstituted aryl azo group containing from 6 to 30 carbon atoms, or a substituted or unsubstituted heterocyclic azo group containing from 3 to 30 carbon atoms, and the examples thereof include phenylazo, p-chlorophenylazo, and 5-ethylthio-1,3,4-thiadiazol-2-ylazo.

The imido group is preferably an N-succinimido group or an N-phthalimido group.

The phosphino group is preferably a substituted or unsubstituted phosphino group containing from 0 to 30 carbon atoms, and the examples thereof include a dimethylphosphino group, a diphenylphosphino group, and a methylphenoxyphosphino group.

The phosphinyl group is preferably a substituted or unsubstituted phosphinyl group containing from 0 to 30 carbon atoms, and the examples thereof include a phosphinyl group, a dioctyloxyphosphinyl group, and a diethoxyphosphinyl group.

The phosphinyloxy group is preferably a substituted or unsubstituted phosphinyloxy group containing from 0 to 30 carbon atoms, and the examples thereof include a diphenoxyphosphinyloxy group and a dioctyloxyphosphinyloxy group.

The phosphinylamino group is preferably a substituted or unsubstituted phosphinylamino group containing from 0 to 30 carbon atoms, and the examples thereof include a dimethoxyphosphinylamino group and a dimethylaminophosphinylamino group.

The silyl group is preferably a substituted or unsubstituted silyl group containing from 0 to 30 carbon atoms, and the examples thereof include a trimethylsilyl group, a t-butyldimethylsilyl group, and a phenyldimethylsilyl group.

Of the above-described substituents, with those which have a hydrogen atom, the hydrogen atom may be substituted by the above-described substituent. Examples of such substituents include an alkylcarbonylaminosulfonyl group, an arylcarbonylaminosulfonyl group, an alkylsulfonylaminocarbonyl group, and an arylsulfonylaminocarbonyl group. Examples thereof include a methylsulfonylaminocarbonyl group, a p-methylphenylsulfonylaminocarbonyl group, an acetylaminosulfonyl group, and a benzoylaminosulfonyl group.

Additionally, with respect to a preferred combination of the substituents in the compound represented by the foregoing general formula (1), those compounds are preferred wherein at least one of the various substituents is the preferred group having been described hereinbefore, those compounds are more preferred wherein more of the various substituents are the preferred groups having been described hereinbefore, and those compounds are most preferred wherein all of the substituents are the preferred groups having been described hereinbefore.

Particularly preferred combinations of the groups in the azo pigments of the invention represented by the general formula (1) contain the following (a) to (e).

(a) $W_1$ and $W_2$ each independently represents an alkoxy group (e.g., a methoxy group, an ethoxy group, an i-propoxy group, or a t-butoxy group), an amino group (e.g., a —$NH_2$ group, a methylamino group, a dimethylamino group, or an aniline group), an alkyl group (e.g., a methyl group, an ethyl group, a n-propyl group, an i-propyl group, a t-butyl group, or a cyclopropoyl group), or an aryl group (e.g., a phenyl group, a p-tolyl group, or a naphthyl group), more preferably represents an alkoxy group, an amino group, or an alkyl group, still more preferably an alkoxy group or an amino group, yet more preferably an alkoxy group containing a total of 5 or less carbon atoms, an amino group (—$NH_2$ group), or an alkylamino group containing a total of 5 or less carbon atoms, particularly preferably an alkoxy group containing a total of 3 or less carbon atoms, an amino group (—$NH_2$ group), or an alkylamino group containing a total of 3 or less carbon atoms, with a methoxy group (—$OCH_3$ group), an ethoxy group (—$OC_2H_5$ group), or an amino group (—$NH_2$ group) being further preferred, and a methoxy group (—$OCH_3$ group) being most preferred.

(b) $R_{11}$ and $R_{12}$ each independently represents a hydrogen atom or a substituent (for example, a substituted or unsubstituted acylamino group containing a total of from 1 to 8 carbon atoms, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms), more preferably a straight or branched alkyl group containing from 1 to 8 carbon atoms, still more preferably a methyl group, an i-propyl group, or a tert-butyl group, particularly preferably an i-propyl group or a t-butyl group, with a t-butyl group being most preferred.

(c) Z represents a divalent heterocyclic group which may further be condensed with other ring. Z preferably represents a 5- to 8-membered heterocyclic group, more preferably represents a 5- or 6-membered, substituted or unsubstituted heterocyclic group, still more preferably represents a 6-membered nitrogen-containing heterocyclic ring. Examples of preferred heterocyclic ring include a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, a pyridazine ring, and a pyrazine ring, with a 6-membered nitrogen-containing heterocyclic group, specifically a 6-membered nitrogen-containing heterocyclic group containing from 3 to 10 carbon atoms, being particularly preferred. More preferred examples of the heterocyclic ring include a pyridine ring, a pyrimidine ring, an S-triazine ring, a pyridazine ring, and a pyrazine ring, still more preferred examples thereof include a pyridine ring, a pyrimidine ring, an S-triazine ring, a pyridazine ring, and a pyrazine ring, yet more preferred examples thereof include a pyrimidine ring and an S-triazine ring, particularly preferred examples thereof include a pyrimidine ring and an S-triazine ring, further more preferred examples thereof include a pyrimidine ring having a substituent at 4- and 6-positions and an S-triazine ring having an alkoxy group containing from 1 to 4 carbon atoms at 2-position, with a pyrimidine ring having a substituent at 4- and 6-positions being most preferred.

(d) $G_1$ and $G_2$ each independently represents a hydrogen atom, an alkyl group, a cycloalkyl group, an aralkyl group, an alkenyl group, an alkynyl group, an aryl group, or a heterocyclic group, particularly preferably a hydrogen atom, a methyl group, an ethyl group, a n-propyl group, an isopropyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, or a pyrazinyl group, more preferably represents a hydrogen atom, a methyl group, a phenyl group, a pyridyl group, a pyrimidinyl group, or a pyrazinyl group. Of these, a methyl group, a 2-pyridyl group, a 2,6-pyrimidinyl group, and a 2,5-pyrazinyl group are preferred, with a methyl group being most preferred.

(e) $Y_1$ and $Y_2$ each independently represents a hydrogen atom, an alkyl group (e.g., a methyl group), an aryl group (e.g., a phenyl group), a heterocyclic group (e.g., a 2-pyridyl group), or an alkylthio group (e.g., a methylthio group), more preferably represents a hydrogen atom, a methyl group, a phenyl group, or a methylthio group, with a hydrogen atom being most preferred.

The invention also includes in its scope tautomers of the azo pigments represented by the general formula (1).

Although the general formula (1) is shown in the form of limiting structure among several tautomer forms which are possible in view of chemical structure, the azo pigments may be tautomers of other structure than the shown one, and may be used as a mixture containing plural tautomers.

For example, with the pigment represented by the general formula (1), azo-hydrazone tautomers represented by the following general formula (1') can be considered. The invention also includes in its scope tautomers of the azo pigments represented by the general formula (1') which are tautomers of the azo pigment represented by the general formula (1).

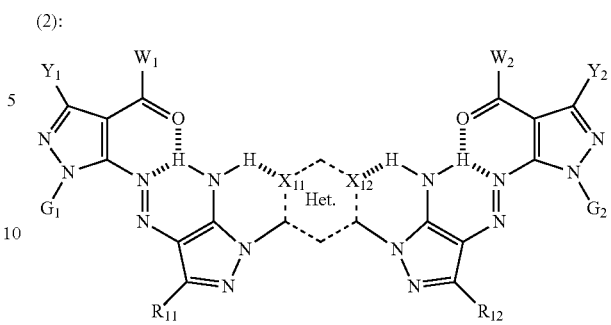

$G_1, G_2, R_{11}, R_{12}, W_1, W_2, Y_1, Y_2$ are the same as defined for $G_1, G_2, R_{11}, R_{12}, W_1, W_2, Y_1, Y_2$ in the general formula (1).

Het. represents a heterocyclic ring which Z in the above general formula 1 constitutes, and $X_{11}$ and $X_{12}$ each independently represents a hetero atom in the heterocyclic ring which Het. constitutes.

Also, in the invention, the azo pigments represented by the general formula (1) preferably have a substituent capable of forming an intramolecular hydrogen bond or an intramolecular cross hydrogen bond. The pigments preferably have at least one substituent capable of forming intramolecular cross hydrogen bond, more preferably have at least 3 substituents capable of forming intramolecular hydrogen bonds, and particularly preferably have at least three substituents capable of forming intramolecular hydrogen bonds, with at least two of the hydrogen bonds forming an intramolecular cross hydrogen bond.

Of the azo pigments represented by the general formula (1), azo pigments represented by the above general formulae (2) can be illustrated as particularly preferred azo pigments as has been said hereinbefore.

The reason that the structure is preferred is that, as is shown by the general formula (2), the nitrogen atom(s), hydrogen atom(s), and hetero atom(s) (nitrogen atoms of the azo group or its tautomer of the hydrazone group, and the oxygen atom of the carbonyl group, or the nitrogen atom of the amino group) constituting the heterocyclic ring contained in the azo pigment structure readily form at least one intramolecular cross hydrogen bond (intramolecular hydrogen bond).

More preferably, as is shown by the general formula (2), the nitrogen atom(s), hydrogen atom(s) of the amino group,

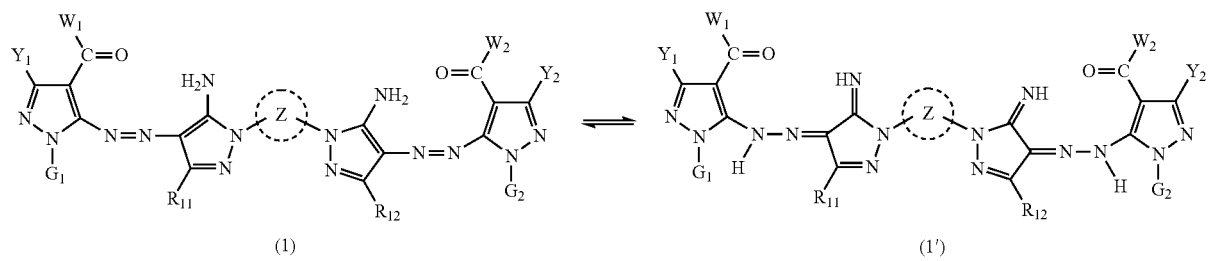

(In the general formula (1'), $R_{11}, R_{12}, W_1, W_2, Y_1, Y_2, G_1, G_2$, and Z are the same as defined for $R_{11}, R_{12}, W_1, W_2, Y_1, Y_2, G_1, G_2$, and Z in the general formula (1).

Of the azo pigments of the invention represented by the general formula (1), azo pigments which are represented by the following general formula (2) are preferred.

and hetero atom(s) (nitrogen atoms of the azo group or its tautomer of the hydrazone group, and the oxygen atom of the carbonyl group, or the nitrogen atom of the amino group) constituting the heterocyclic ring contained in the azo pigment structure readily form at least four intramolecular hydrogen bonds, with at least two of them being intramolecular cross hydrogen bonds.

As a result, flatness of the molecule is enhanced, the intramolecular and intermolecular mutual action (hydrogen bonding or π-π stacking) is improved, crystallinity of the azo pigment represented by, for example, the general formula (2) is enhanced (higher structure of the pigment becoming liable to be formed), and hence performances required as pigments, i.e., light fastness, heat stability, moist heat stability, water fastness, gas fastness, and/or solvent resistance, can markedly be improved, thus such pigments being most preferred.

In the invention, as to crystal forms of the azo pigment represented by the above general formula (1), there exist in some cases polymorphic crystal forms such as α-type, β-type, and γ-type. In such cases, the crystal form can be identified with ease from the results of X-ray diffraction measurement of a particular azo pigment based on the specific positions or number and intensity ratio of peaks in characteristic Cu Kα X-ray diffraction in terms of Bragg angles) (2θ±0.2°. In the invention, the measurement of X-ray diffraction can be conducted according to Japanese Industrial Standards JISK0131 (General Rule of X-ray diffractiometry) using a powder X-ray diffractometer, RINT 2500 (manufactured by Rigaku Industrial Corp.).

In the invention, the azo pigment represented by the above-described formula (1) having at least one characteristic peak at Bragg angles (2θ) of 5 to 15° and 20 to 30° in X-ray diffraction with characteristic Cu Kα line can realize, when combined with a specific vinyl polymer and an aqueous medium to be described hereinafter, excellent ink ejection properties, good hue and high print density (high tinctorial strength), and high image fastness of printed products (for example, light fastness, gas fastness, heat fastness, and water fastness). Additionally, in the invention, it is necessary for the azo pigment to satisfy the above-described requirements, whereby above-described better effects than those of other crystal form of corresponding pigment particles having the same chemical composition and the same colorant molecular structural formula can be obtained.

Additionally, "characteristic X-ray diffraction peak" as used in the invention means a powder X-ray diffraction peak which shows a particularly preferred crystal form among the crystal forms that the azo colorant represented by the same chemical structural formula can take depending upon 3-dimensional molecular alignment thereof.

Also, in the invention, the compounds represented by the general formulae (1) and (2) containing isotopes (e.g., 2H, 3H, 13C, and 15N) can also be employed.

In the invention, in view of the effects, an azo pigment represented by the following general formula (10) is more preferred, and an azo pigment represented by the general formula (11) is particularly preferred.

(10):

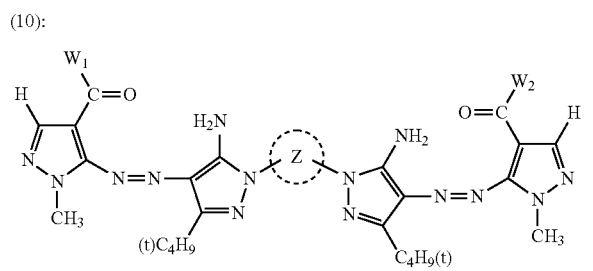

(In the general formula (10), Z represents a 5- or 6-membered, nitrogen-containing heterocyclic ring, and $W_1$ and $W_2$ each independently represents an alkoxy group, an amino group, an alkyl group, or an aryl group.

(11):

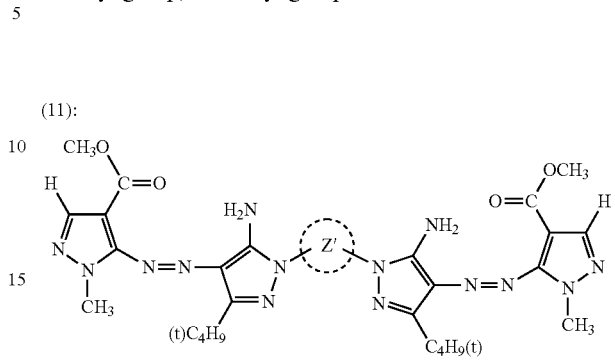

(In the general formula (11), Z' represents a 6-membered nitrogen-containing heterocyclic ring.)

As the 6-membered nitrogen-containing heterocyclic ring represented by Z' in the general formula (11), there are illustrated the same ones as the 6-membered nitrogen-containing heterocyclic ring represented by Z in the general formula (1), and preferred examples are also the same as described there.

Specific examples of the azo pigments represented by the foregoing general formulae (1) and (2) will be shown below which, however, do not limit azo pigments to be used in the invention. Also, each of the following structures of the specific examples is shown in the limiting structural formula selected from among several tautomers possible in view of chemical structure. However, needless to say, the pigments may be in other tautomer structures than the descried ones.

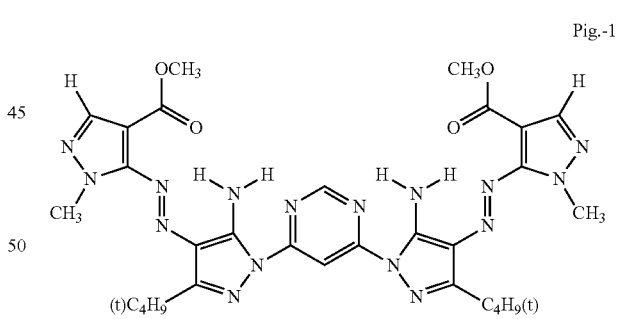

Pig.-1

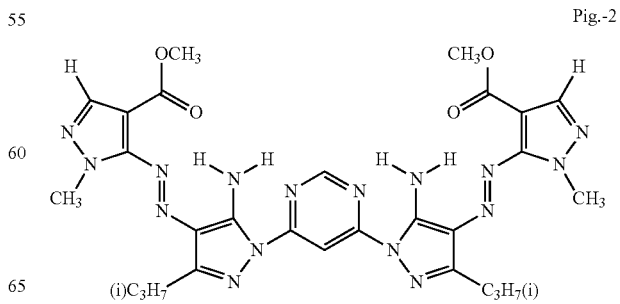

Pig.-2

-continued
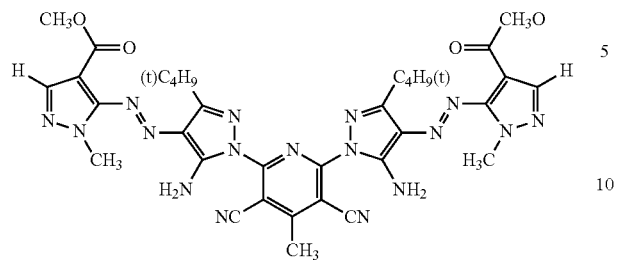
Pig.-13
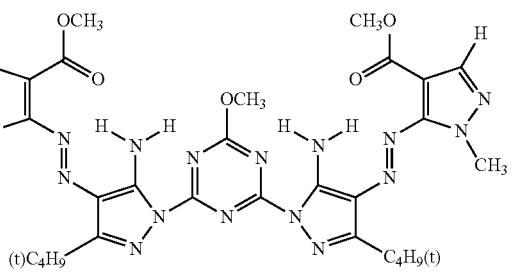
Pig.-18
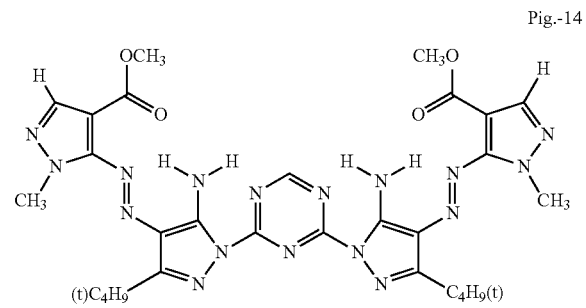
Pig.-14
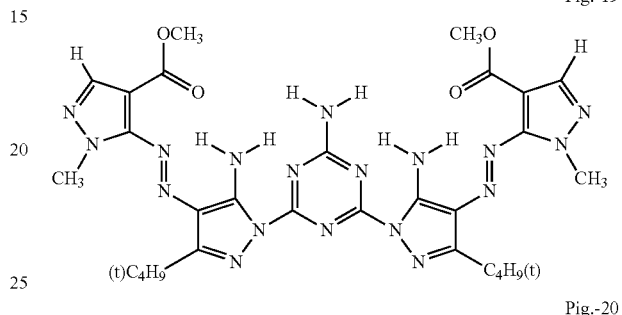
Pig.-19
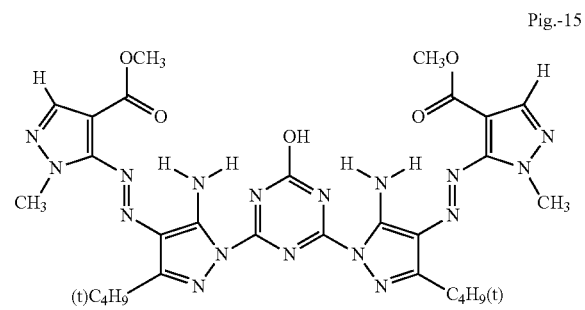
Pig.-15
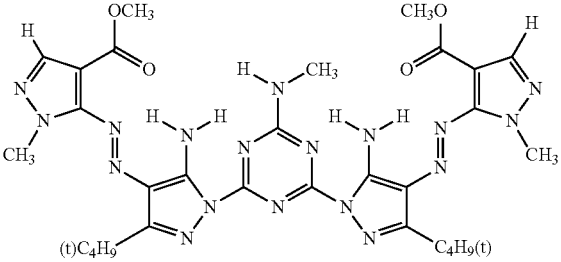
Pig.-20
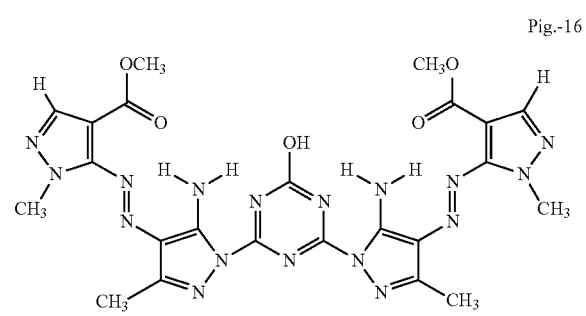
Pig.-16
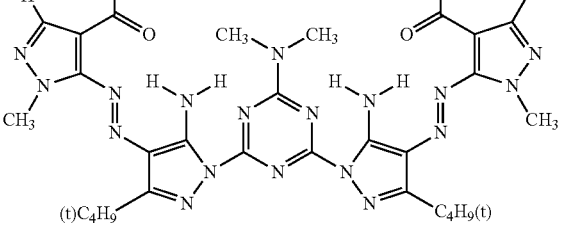
Pig.-21
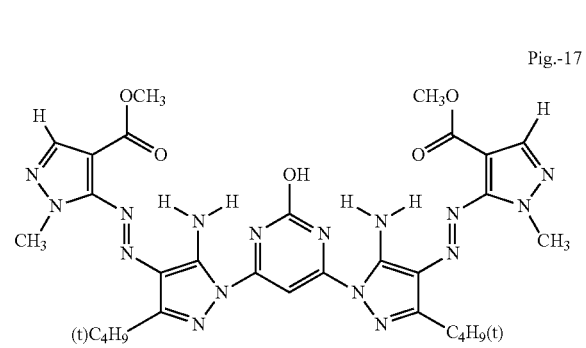
Pig.-17
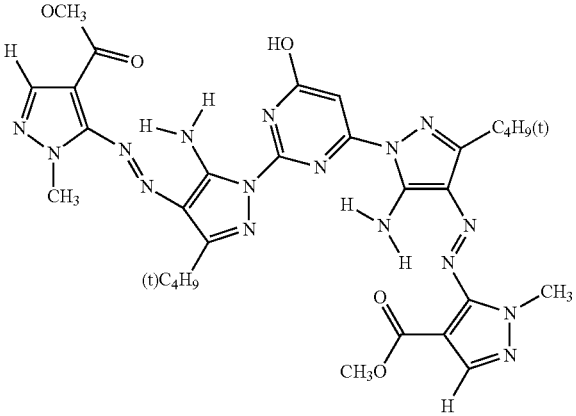
Pig.-22

Pig.-33
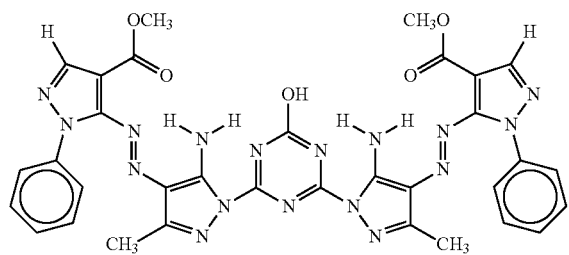
Pig.-34
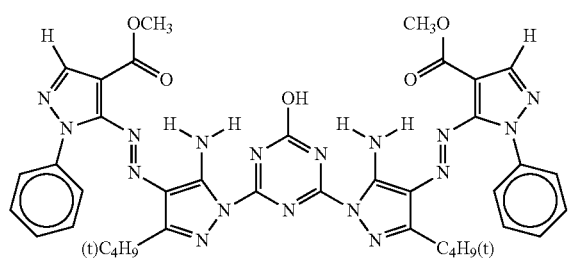
Pig.-35
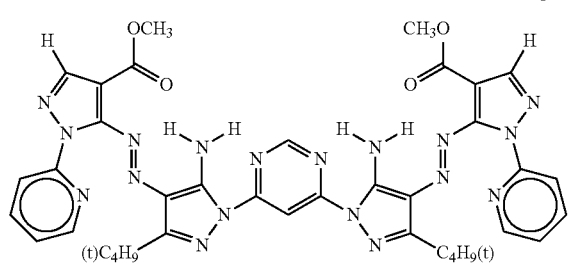
Pig.-36
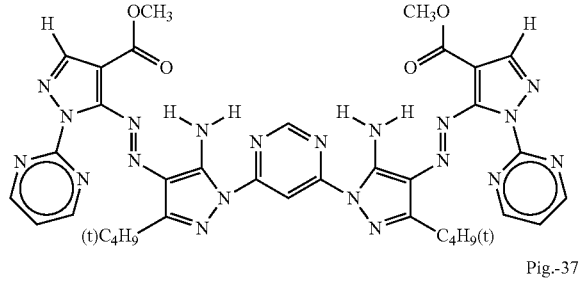
Pig.-37
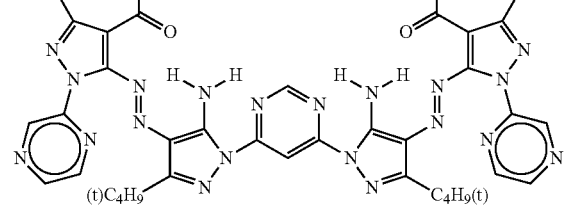
Pig.-38
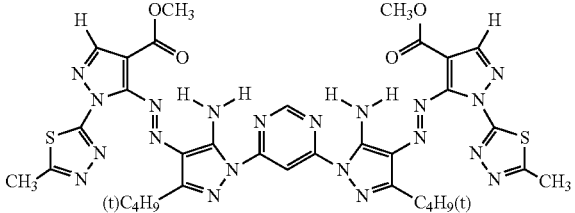
Pig.-39
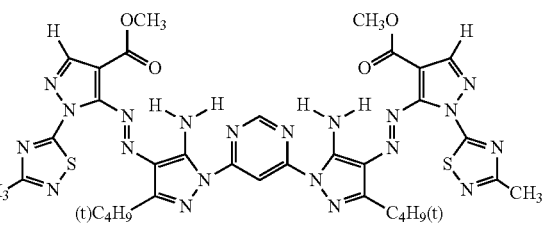
Pig.-40
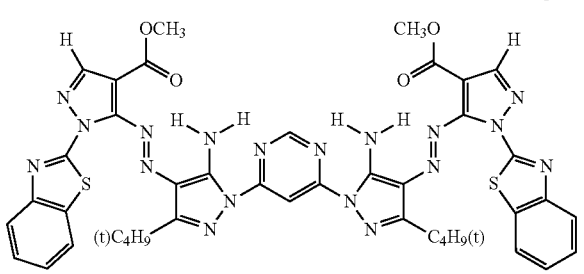
Pig.-41
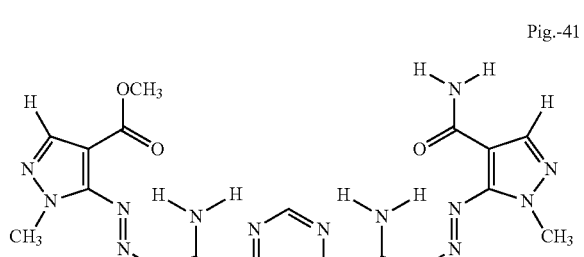
Pig.-42
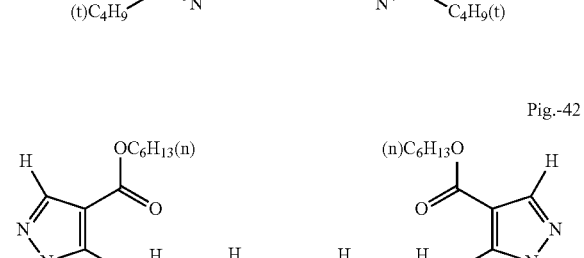
Pig.-43
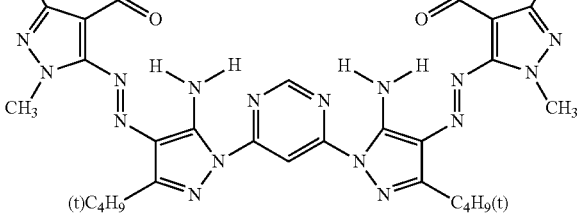

-continued

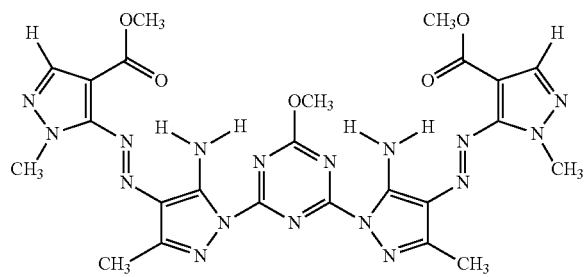

Pig.-44

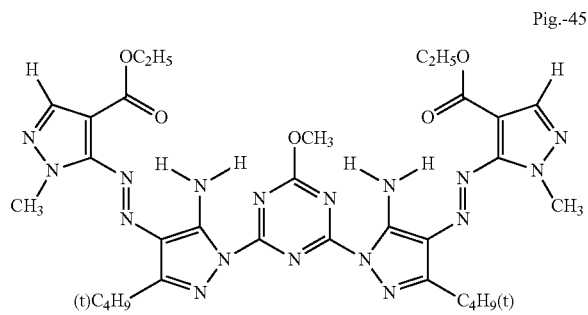

Pig.-45

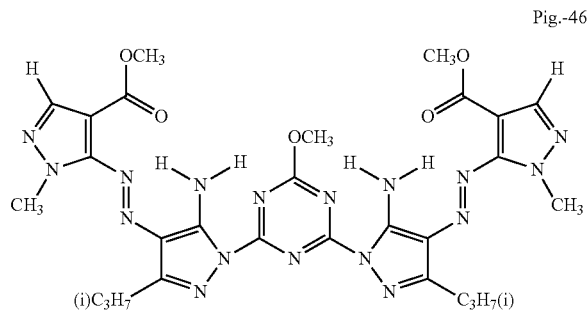

Pig.-46

Of the above-described pigments, Pig.-1, Pig.-18, and Pig.-25 are preferred in view of the effects of the invention. As Pig.-1, a crystal form having characteristic X-ray diffraction peaks at Bragg angles) (2θ±0.2° of 7.6, 25.6, and 27.7° in X-ray diffraction with characteristic Cu Kα line is preferred. As Pig.-18, a crystal form having characteristic X-ray diffraction peaks at Bragg angles) (2θ±0.2° of 7.2 and 25.9° in X-ray diffraction with characteristic Cu Kα line is preferred. As Pig.-25, a crystal form having characteristic X-ray diffraction peaks at Bragg angles) (2θ±0.2° of 7.5°, 11.2°, 18.6°, 21.2°, and 23.9° in X-ray diffraction with characteristic Cu Kα line is preferred.

In the invention, even when tautomers exist due to the structures of the compounds, they are described in one typical form thereof. However, tautomers of different structures than those described in the invention are also included in the azo pigments of the invention. Further, salts and hydrates of the azo pigments of the invention are also included in the azo pigments of the invention.

The pigments of the invention represented by the general formula (1) may have a chemical structure represented by the general formula (1) or may be the tautomers thereof, and may be the pigments of any crystal form called polymorphic form.

Polymorphism means that crystals having the same chemical composition can be different from each other in the conformation of building block (molecules or ions) in the crystal. Chemical and physical properties of the pigments are decided by the crystal structure, and polymorphic forms of the same pigment can be discriminated from each other by rheology, color, and other color characteristics. Also, different polymorphic forms can be confirmed by X-Ray Diffraction (results of powder X-ray diffractometry) or by X-Ray Analysis (results of X-ray analysis of crystal structure).

In the case where the pigments of the invention represented by the general formulae (1) and (2) exhibit polymorphism, they may be in any polymorphic forms and may be a mixture of two or more polymorphic forms. However, pigments wherein a single crystal form is predominant are preferred. That is, pigments not contaminated with polymorphic form crystals are preferred. The content of the azo pigment having a single crystal form is from 70% to 100%, preferably from 80% to 100%, more preferably from 90% to 100%, still more preferably from 95% to 100%, particularly preferably 100%, based on the entire azo pigment. When the azo pigment contains a single crystal form azo pigment as a major component, regularity of alignment of the pigment molecules is improved, and the intramolecular and intermolecular mutual action is enhanced, thus a high-level three-dimensional network being easily formed. As a result, performances required for pigments, such as hue, light fastness, humidity fastness, fastness to an oxidative gas, and solvent resistance, are improved, thus the above-described content being preferred.

The mixing ratio of polymorphic forms in the azo pigment can be confirmed from values obtained by physicochemical measurement such as X-ray crystal structure analysis of single crystal, powder X-ray diffractometry (XRD), microscopic photography of the crystals (TEM), or IR (KBr method).

With those which have acid groups among the azo pigments of the invention represented by the general formula (1), part or all of the acid groups may be in a salt form, or the pigment may be a mixture of a salt type pigment and a free acid type pigment. Examples of the salt type include salts of an alkali metal such as Na, Li, or K, salts of an alkaline earth metal such as Mg, Ca, or Ba, salts of ammonium optionally substituted by an alkyl group or a hydroxyalkyl group, and salts of an organic amine. Examples of the organic amine include a lower alkyl amine, a hydroxyl-substituted lower alkyl amine, a carboxy-substituted lower alkyl amine, and a polyamine having from 2 to 10 alkyleneimine units containing from 2 to 4 carbon atoms. With these salt type pigments, they are not necessarily limited to one as to kind, but may be in a mixture of two or more thereof.

Further, as to the structure of the pigment to be used in the invention, in the case where plural acid groups exist in one molecule, the plural acid groups may be of a salt type or an acid type, and may be different from each other.

The azo pigments represented by the general formula (1) may be hydrates which contain water molecules within the crystal.

Next, one example of a process for producing the azo pigment represented by the above general formula (1) will be described below. For example, a heterocyclic amine represented by the following general formula (A) is diazotized under acidic condition, then subjected to a coupling reaction with a compound represented by the following general formula (B), and subjected to an after-treatment in a conventional manner to thereby produce the azo pigment represented by the general formula (1).

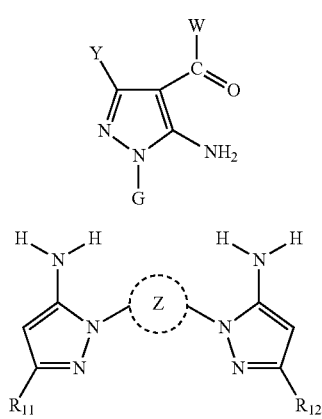

(A)

(B)

In the general formulae (A) and (B), G, Y, W, $R_{11}$, $R_{12}$, and Z are the same as corresponding $G_1$, $G_2$, $Y_1$, $Y_2$, $W_1$, $W_2$, $R_{11}$, $R_{12}$, and Z in the general formula (1).

The heterocyclic amines represented by the general formula (A) can generally be produced by a known conventional process, for example, a process described in *Helv. Chim. Acta.* 41, 1958, 1052-1056 or in *Helv. Chim. Acta.* 42, 1959, 349-352, or a similar process.

The compounds represented by the general formula (B) can generally be produced by a process described in WO 06/082669 or in JP-A-2006-57076, or a similar process.

The diazotization reaction of the heterocyclic amine represented by the general formula (A) can be conducted, for example, by reacting it with a reagent such as sodium nitrite, nitrosylsulfonic acid, or isoamyl nitrite in an acidic solvent such as sulfuric acid, phosphoric acid, acetic acid, hydrochloric acid, or methanesulfonic acid at a temperature of 15° C. or less for about 10 minutes to about 6 hours.

The coupling reaction is preferably conducted by reacting the diazonium salt obtained by the above-mentioned process with the compound represented by the general formula (B) at 40° C. or less, preferably 25° C. or less, for about 10 minutes to about 12 hours.

The product obtained by the reaction may form precipitated crystals but, in general, water or an alcoholic solvent is added to the reaction solution to thereby precipitate crystals, and the precipitated crystals can be collected by filtration. Also, an alcoholic solvent or water may be added to the reaction solution to thereby precipitate crystals, and the precipitated crystals can be collected by filtration. The crystals thus collected by filtration are washed and dried, as needed, to obtain the azo pigment represented by the general formula (1).

The compounds represented by the general formula (1) are obtained as a crude azo pigment (crude) by the above-described production process. In the case of using them as the pigments of the invention, they are preferably subjected to after-treatment. As methods of the after-treatment, there are illustrated, for example, a pigment particle-controlling step such as milling treatment (e.g., solvent-salt milling, salt milling, dry milling, solvent milling or acid pasting) or solvent heating treatment; and a surface-treating step using, for example, a resin, a surfactant or a dispersing agent.

As has been described hereinbefore, Pig.-18 is preferably in a crystal form having characteristic X-ray diffraction peaks at Bragg angles) (2θ±0.2° of 7.2° and 25.9° in X-ray diffraction with characteristic Cu Kα line, more preferably in a crystal form having characteristic X-ray diffraction peaks at Bragg angles) (2θ±0.2° of 7.2°, 15.0°, 19.8°, and 25.9° in X-ray diffraction with characteristic Cu Kα line. Among them, a crystal form having characteristic X-ray diffraction peaks at Bragg angles (2θ±0.2) of 7.2°, 8.2°, 10.0°, 13.4°, 15.0°, 19.8°, and 25.9° X-ray diffraction with characteristic Cu Kα line is most preferred.

Further, Pig.-1 is preferably in a crystal form having characteristic X-ray diffraction peaks at Bragg angles) (2θ±0.2° of 7.6°, 25.6°, and 27.7° in X-ray diffraction with characteristic Cu Kα line, more preferably in a crystal form having characteristic X-ray diffraction peaks at Bragg angles) (2θ±0.2° of 7.6°, 13.5°, 25.6°, and 27.7° in X-ray diffraction with characteristic Cu Kα line. Among them, a crystal form having characteristic X-ray diffraction peaks at Bragg angles) (2θ±0.2° of 7.6°, 13.5°, 15.9°, 16.9°, 25.6°, and 27.7° in X-ray diffraction with characteristic Cu Kα line is most preferred.

Also, the length of the long axis of primary particles of the above-described Pig.-1 and Pig.-18 observed under a transmission microscope is preferably from 0.01 μm to 30 μm, more preferably from 0.02 μm to 30 μm, particularly preferably from 0.03 μm to 2 μm.

In the case where the length of the long axis of the primary particles observed under a transmission microscope is not less than 0.01 μm, good fastness to light or ozone and, when formed into a pigment dispersion, good dispersibility can be realized with more certainty. On the other hand, in the case where the length is not more than 30 μm, there scarcely results an overdispersion state (state where primary particles are destroyed) upon dispersing the particles to attain desired volume-average particle size, thus active surfaces being scarcely laid bare on the pigment particle surface. Hence, aggregation of pigment particles scarcely occurs, which serves to realize good storage stability of the pigment dispersion with more certainty.

When the size of the primary particles is controlled within the above-described range, there results strong intramolecular and intermolecular mutual action, thus pigment particles forming strong, firm, and stable three-dimensional network being obtained. Such pigment particles show high fastness to light, heat, moisture, and an oxidizing gas, and colored materials using the pigment dispersion have excellent storage stability, thus such pigment particles being preferred.

The volume-average particle size of the pigment dispersion containing the pigment composition of the invention can be measured by using a Nanotruck UPA Particle Size Analyzer (UPA-EX 150; manufactured by Nikkiso Co., Ltd.). The measurement can be conducted by, for example, placing 3 ml of a pigment dispersion in a measurement cell and performing operation according to a given measuring manner. Additionally, as parameters to be inputted upon measurement, an ink viscosity is used as the viscosity, and a density of the pigment is used as the density of dispersed particles.

The average particle size of Pig.-18 in a crystal form having characteristic X-ray diffraction peaks at Bragg angles) (2θ±0.2° of 7.2° and 25.9° in X-ray diffraction with characteristic Cu Kα line is preferably from 0.01 μm to 30 μm, more preferably from 0.02 μm to 10 μm, most preferably from 0.03 μm to 1 μm.

The average particle size of Pig.-1 in a crystal form having characteristic X-ray diffraction peaks at Bragg angles) (2θ±0.2° of 7.6° and 25.6° in X-ray diffraction with characteristic Cu Kα line is preferably from 0.01 μm to 30 μm, more preferably from 0.02 μm to 30 μm, most preferably from 0.03 μm to 20 μm.

When the particle size is within the above-described range, there result prints with high image density, an increased stability of a dispersion thereof, an improved color reproducibility in a mixed area of red or green, and a high transparency and, upon printing through inkjet printing or the like, clogging of a nozzle scarcely occurs, thus such particle size being preferred. In addition, such particle size is preferred also from the points that aggregation scarcely occurs in the pigment dispersion, and that stability with time of the dispersion is high.

Adjustment of the volume-average particle size of the pigment dispersion containing the pigment composition of the invention to the above-described range can be conducted with ease by appropriately combining the pigment-dispersing conditions to be described hereinafter.

A process for producing an azo pigment composition containing at least one of Pig.-18 having characteristic peaks at Bragg angles) (2θ±0.2° of 7.2° and 25.9 in X-ray diffraction with characteristic Cu Kα line, or a tautomer thereof will be described in detail below.

The process for producing Pig.-18 involves a step of conducting azo coupling reaction between a diazonium salt derived from a heterocyclic amine represented by the following formula (3) (diazo component) and a compound represented by the following formula (4) (coupling component).

Formula (3):

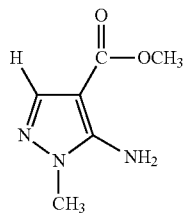

Formula (4):

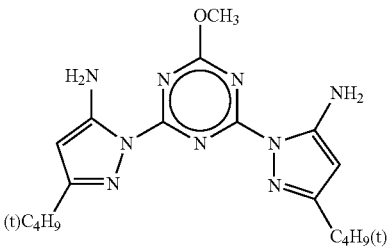

Pig.-18:

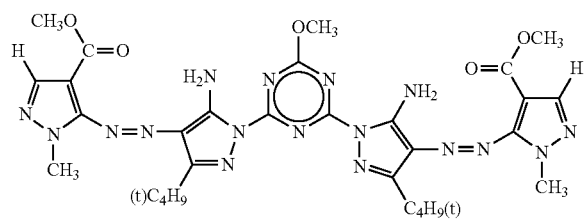

Next, a process for producing an azo pigment composition containing at least one of Pig.-1 having characteristic peaks at Bragg angles) (2θ±0.2° of 7.6° and 25.6 in X-ray diffraction with characteristic Cu Kα line, or a tautomer thereof will be described in detail below.

The process for producing Pig.-1 involves a step of conducting azo coupling reaction between a diazonium salt derived from a heterocyclic amine represented by the following formula (3) (diazo component) and a compound represented by the following formula (5) (coupling component).

(3):

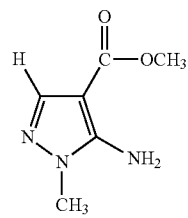

(5):

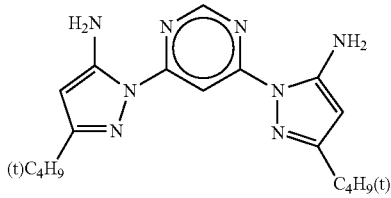

Pig.-1

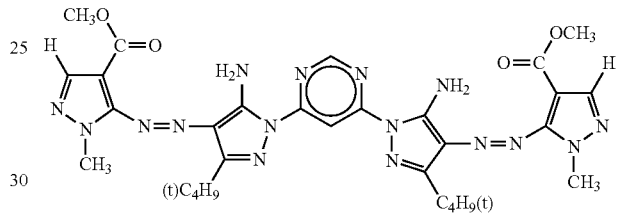

[Step of Preparing the Diazonium Salt of a Hetrocyclic Amine]

Preparation of the diazonium salt from the heterocyclic amine (diazo component) represented by the above-described formula (3) and coupling reaction between the diazonium salt and the compound represented by the above-described formulae (4) and (5) (coupling component) can be conducted in a conventional manner.

For preparation of the diazonium salt of the heterocyclic amine represented by the above-described formula (3), there may be applied, for example, a conventional process for preparing a diazonium salt using a nitrosonium ion source such as nitrous acid, nitrite or nitrosylsulfuric acid in a reaction medium containing an acid (for example, hydrochloric acid, sulfuric acid, phosphoric acid, acetic acid, propionic acid, methanesulfonic acid, or trifluoromethanesulfonic acid).

As examples of more preferred acids, there are illustrated acetic acid, propionic acid, methanesulfonic acid, phosphoric acid, and sulfuric acid, which may be used alone or in combination thereof. Of these, phosphoric acid, a combination of acetic acid and sulfuric acid, a combination of acetic acid and propionic acid, and a combination of acetic acid and sulfuric acid are more preferred, with a combination of acetic acid and propionic acid and a combination of acetic acid, propionic acid, and sulfuric acid being particularly preferred.

As preferred examples of the reaction medium (solvent), organic acids and inorganic acids are preferred for use and, in particular, phosphoric acid, sulfuric acid, acetic acid, propionic acid, and methanesulfonic acid are preferred, with acetic acid and/or propionic acid being particularly preferred.

As a preferred example of the nitrosonium ion source, there are illustrated esters of nitrous acid, nitrous acid salts, nitrosylsulfuric acid, etc. Of these, sodium nitrite, potassium nitrite, isoamyl nitrite, nitrosylsulfuric acid (e.g., a solution of ONHSO$_4$ in sulfuric acid) are preferred. In particular, isoamyl nitrite and nitrosylsulfuric acid (e.g., a 40% by weight to 50% by weight solution of ONHSO$_4$ in sulfuric acid) are preferred. Among them, use of nitrosylsulfuric acid in a reaction medium containing the above-described preferred acid enables preparation of a diazonium salt with stability and efficiency.

The amount of the solvent to be used is preferably from 0.5- to 50-fold amount by weight, more preferably from 1- to 20-fold amount by weight, particularly preferably from 3- to 15-fold amount by weight, based on the amount of a diazo component of formula (3).

In the present invention, the diazo component of formula (3) may be in a state of being dispersed in the solvent or, with some kinds of the diazo components, in a state of a solution.

The amount of the nitrosonium ion source to be used is preferably from 0.95 to 5.0 equivalent weight, more preferably from 1.00 to 3.00 equivalent weight, particularly preferably from 1.00 to 1.10 equivalent weight, in terms of the diazo component.

The reaction temperature is preferably from −15° C. to 40° C., more preferably from −5° C. to 35° C., still more preferably from −0° C. to 30° C. In case when the reaction temperature is lower than −15° C., the reaction rate becomes so small that the time required for the synthesis becomes seriously prolonged, thus such temperature not being preferred in view of production cost whereas, in case when the synthesis is conducted at a temperature higher than 40° C., the amount of produced by-products is increased, thus such temperature not being preferred.

The reaction time is preferably from 30 minutes to 300 minutes, more preferably from 30 minutes to 200 minutes, still more preferably from 30 minutes to 150 minutes.

[Coupling Reaction Step]

The coupling reaction step can be conducted in an acidic reaction medium to a basic reaction medium. Preferably, however, for the azo pigment of the invention, the coupling reaction step is conducted in an acidic to neutral reaction medium. In particular, when conducted in an acidic reaction medium, the coupling reaction gives an azo pigment with good efficiency with suppressing decomposition of the diazonium salt.

As preferred examples of the reaction medium (solvent), organic acids, inorganic acids, and organic solvents may be used, with organic solvents being particularly preferred. As such solvents, those solvents are preferred which, upon reaction, do not cause liquid separation phenomenon but form a uniform solution. Examples thereof include alcoholic organic solvents such as methanol, ethanol, propanol, isopropanol, butanol, t-butyl alcohol, and amyl alcohol; ketone series organic solvents such as acetone and methyl ethyl ketone; diol series organic solvents such as ethylene glycol, diethylene glycol, triethylene glycol, propylene glycol, dipropylene glycol, and 1,3-propanediol; ether series organic solvents such as ethylene glycol monomethyl ether, ethylene glycol monoethyl ether, and ethylene glycol diethyl ether; tetrahydrofuran; dioxane; and acetonitrile. These solvents may be a mixture of two or more thereof.

Organic solvents having a polarity parameter (ET) of 40 or more are preferred. Of them, glycol series solvents having two or more hydroxyl groups in the molecule thereof, alcoholic solvents containing 3 or less carbon atoms, and ketone series solvents containing a total of 5 or less carbon atoms are more preferred, with alcoholic solvents containing 2 or less carbon atoms (for example, methanol and ethylene glycol) and ketone series solvents containing a total of 4 or less carbon atoms (for example, acetone and methyl ethyl ketone) being still more preferred. Mixed solvents thereof are also included.

The amount of the solvent to be used is preferably from 1- to 100-fold amount by weight, more preferably from 1- to 50-fold amount by weight, still more preferably from 2- to 30-fold amount by weight, based on the coupling component represented by the foregoing formulae (4) and (5).

In the invention, the coupling component represented by formulae (4) and (5) may be in a state of being dispersed in the solvent or, with some kinds of the coupling components, in a state of a solution.

The amount of the coupling component to be used is preferably from 0.95 to 5.0 equivalent weight, more preferably from 1.00 to 3.00 equivalent weight, particularly preferably from 1.00 to 1.50 equivalent weight, in terms of the diazo coupling moiety.

The reaction temperature is preferably from −30° C. to 30° C., more preferably from −15° C. to 10° C., still more preferably from −10° C. to 5° C. In case when the reaction temperature is lower than −30° C., the reaction rate becomes so small that the time required for the synthesis becomes seriously prolonged, thus such temperature not being preferred in view of production cost whereas, in case when the synthesis is conducted at a temperature higher than 30° C., the amount of produced by-products is increased, thus such temperature not being preferred.

The reaction time is preferably from 30 minutes to 300 minutes, more preferably from 30 minutes to 200 minutes, still more preferably from 30 minutes to 150 minutes.

In the process of the invention for producing the azo pigment composition of the invention, the product obtained by these reactions (crude azo pigment) may be used after being treated according to an after-treatment for common organic synthesis reactions and optionally after being purified.

That is, a product isolated from the reaction system may be used without purification or after being subjected to purifying through a single operation of, or a combination of, recrystallization, salt formation, etc.

Also, after completion of the reaction, there may be conducted a single operation that the reaction solvent may or may not be distilled off, that the reaction product may be poured into water or ice-water, that the resulting solution may or may not be neutralized, and that the liberated portion or the extract obtained by extracting with an organic solvent/water solution may or may not be purified through recrystallization, crystallization, salt formation or the like, or a combination of these operations.

The process for producing the azo pigment composition of the invention will be described in more detail below.

A process for producing the azo pigment composition of the invention is characterized by conducting a coupling reaction between a diazonium compound prepared by diazotizing a heterocyclic amine represented by the foregoing formula (3) and compounds represented by the foregoing formulae (4) and (5) after dissolving the compounds of formulae (4) and (5) in an organic solvent.

The reaction of the heterocyclic amine represented by the foregoing formula (3) to prepare the diazonium salt may be conducted by, for example, reacting the amine with a reagent such as sodium nitrite or nitrosylsulfuric acid in an acidic solvent such as sulfuric acid, phosphoric acid, or acetic acid at a temperature of 15° C. or lower than that for a period of from about 10 minutes to about 6 hours. The coupling reaction is conducted preferably by reacting the diazonium salt obtained by the above-described process with the compounds represented by the foregoing formulae (4) and (5) at 40° C. or lower than that, preferably 15° C. or lower than that, for a period of from about 10 minutes to about 12 hours.

The aforesaid control of tautomerization and/or polymorphism can be attained through production conditions upon coupling reaction. As a process for producing a pigment composition of the invention which is a more preferred embodiment and which contains as a major component crystals of Pig.-18 of the invention having characteristic peaks at 7.2° and 25.9 in X-ray diffraction or crystals of Pig.-1 having characteristic peaks at 7.6°, 25.6, and 27.7 in X-ray diffraction, it is preferred to employ, for example, a process of the invention wherein the coupling reaction is conducted after once dissolving the compounds represented by the foregoing formulae (4) and (5) in an organic solvent. As the organic solvent which can be used here, there are illustrated, for example, alcoholic solvents and ketone series solvents. As the alcoholic solvents, methanol, ethanol, isopropanol, ethylene glycol, diethylene glycol, etc. are preferred. Of these, methanol is particularly preferred. As the ketone series solvents, acetone, methyl ethyl ketone, cyclohexanone, etc. are preferred. Of these, acetone is particularly preferred.

Another process for producing the azo pigment composition of the invention is characterized by conducting the coupling reaction between a diazonium compound prepared by diazotizing a heterocyclic amine represented by the foregoing formula (3) and compounds represented by the foregoing formulae (4) and (5) in the presence of a polar aprotic solvent.

A pigment composition containing as a major component crystals of Pig.-18 having characteristic peaks at 7.2° and 25.9 in X-ray diffraction or crystals of Pig.-1 having characteristic peaks at 7.6°, 25.6, and 27.7 in X-ray diffraction can also be produced with good efficiency by conducting the coupling reaction in the presence of a polar aprotic solvent. Examples of the polar aprotic solvent include N,N-dimethylformamide, N,N-dimethylacetamide, N-methyl-2-pyrrolidone, dimethylsulfoxide, tetramethylurea, acetone, methyl ethyl ketone, acetonitrile, and a mixed solvent thereof. Of these solvents, acetone, methyl ethyl ketone, N,N-dimethylacetamide, and acetonitrile are particularly preferred. In the case of using these solvents, the compound of the foregoing formula (3) may or may not be completely dissolved in the solvent.

The compound obtained by the above-described production process may or may not be subjected to adjustment of pH by adding a base as a purifying step according to use. In the case of adjusting pH, the pH is preferably from 4 to 10. Of them, a pH of from 5 to 8 is more preferred, with a pH of 5.5 to 7.5 being particularly preferred.

When the pH is 10 or less than that, the resulting hue does not give an increased reddish tone, with causing no discoloration and no fading, thus such pH being preferred in view of ensuring hue with constant quality. When the pH is 4 or more, there scarcely occurs a problem of, for example, corrosion of a nozzle in the case of being used as an ink for inkjet recording, thus such pH being preferred.

The above-described production process gives the compounds represented by Pig.-18 and Pig.-1 as a crude azo pigment (crude).

The invention also relates to an azo pigment composition produced by the above-described production process.

[After-treating Step]

The production process of the invention preferably includes a step of after-treatment. As the method of the after-treating step, there are illustrated, for example, pigment particle size-controlling step by milling treatment such as solvent-salt milling, salt milling, dry milling, solvent milling or acid pasting, or by treatment of heating in a solvent; and surface-treating step using a resin, a surfactant, a dispersing agent, etc.

The compounds of the invention represented by formula (1) and compounds represented by Pig.-18 and Pig.-1 are preferably subjected to the solvent heating treatment and/or the solvent-salt milling as the after-treating step. For example, azo pigment of intended crystal form can be produced by refluxing in a water-free organic solvent.

As a solvent to be used in the solvent heating treatment, there are illustrated, for example, water; aromatic hydrocarbon series solvents such as toluene and xylene; halogenated hydrocarbon series solvents such as chlorobenzene and o-dichlorobenzene; alcoholic solvents such as isopropanol and isobutanol; polar aprotic organic solvents such as N,N-dimethylformamide, N,N-dimethylacetamide, N-methyl-2-pyrrolidone, acetone, methyl ethyl ketone, and acetonitrile; glacial acetic acid; pyridine; and a mixture thereof. An inorganic or organic acid or base may further be added to the above-described solvents.

The temperature of the solvent heating treatment varies depending upon the desired primary particle size of the pigment, but is preferably from 40 to 150° C., more preferably from 60 to 100° C. Also, the treating time is preferably from 30 minutes to 24 hours.

As the solvent-salt milling, there is illustrated, for example, the procedure wherein a crude azo pigment, an inorganic salt, and an organic solvent which does not dissolve them are placed in a kneader, and knead-milling of the mixture is conducted therein. As the inorganic salt, water-soluble inorganic salts can preferably be used. For example, inorganic salts such as sodium chloride, potassium chloride, and sodium sulfate are preferably used. Also, it is more preferred to use inorganic salts having an average particle size of from 0.5 to 50 μm. The amount of the inorganic salt to be used is preferably a 3- to 20-fold amount by weight, more preferably a 5- to 15-fold amount by weight, based on the crude pigment. As the organic solvent, water-soluble organic solvents can preferably be used and, since the solvent becomes easily vaporizable due to an increase in temperature upon kneading, high-boiling solvents are preferred in view of safety. Examples of such organic solvents include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and a mixture thereof. The amount of the water-soluble organic solvent to be used is preferably a 0.1- to 5-fold amount by weight based on the crude azo pigment. The kneading temperature is preferably from 20 to 130° C., particularly preferably from 40 to 110° C. As a kneader, there can be used, for example, a kneader or a mix muller.

[Vinyl Polymer]

The vinyl polymer to be used in the invention contains (a) a hydrophobic structural unit represented by the following general formula (AI) and (c) a hydrophilic structural unit.

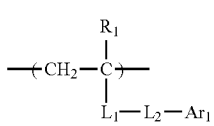

(AI)

(In the general formula (AI), $R_1$ represents a hydrogen atom, a methyl group, or a halogen atom, $L_1$ represents —COO—, —COO—, —CONR$_2$—, or a substituted or unsubstituted phenylene group, and $R_2$ represents a hydrogen atom or an alkyl group. $L_2$ represents a single bond or a divalent linking group. $Ar_1$ represents a monovalent group derived from an aromatic hydrocarbon ring.)

(a) Hydrophobic Structural Unit Represented by the General Formula (AI):

The content of the hydrophobic structural unit (a) represented by the general formula (AI) (hereinafter, sometimes simply referred to as a "hydrophobic structural unit (a)") is, in view of dispersion stability, ejection stability and cleanability of the pigment, preferably from 10% by weight to less than 75% by weight, more preferably from 20% by weight to less than 70% by weight, particularly preferably from 30% by weight to less than 60% by weight, based on the entire weight of the vinyl polymer.

The alkyl group represented by $R_2$ is preferably an alkyl group containing from 1 to 10 carbon atoms, and examples thereof include a methyl group, an ethyl group, an n-propyl group, an i-propyl group, and a t-butyl group.

Here, examples of the foregoing substituent include a halogen atom, an alkyl group, an alkoxy group, a hydroxyl group, and a cyano group, which, however, are not particularly limitative.

In the case where $L_2$ represents a divalent linking group, it is preferably a linking group containing from 1 to 30 carbon atoms, more preferably a linking group containing from 1 to 25 carbon atoms, particularly preferably a linking group containing from 1 to 20 carbon atoms.

Of those represented by the above-described general formula (AI), a combination of structural units wherein $R_1$ is a hydrogen atom or a methyl group, $L_1$ is (main chain side)-COO—, and $L_2$ is a divalent linking group containing from 1 to 25 carbon atoms, selected from an alkyleneoxy group an alkylene group is preferred, and a combination of structural units wherein $R_1$ is a hydrogen atom or a methyl group, $L_1$ is (main chain side)-COO—, and $L_2$ is a (main chain side)-CH$_2$—CH$_2$—O)$_n$— (wherein n represents an average number of repeating units; n=1 to 6) is more preferred.

The aromatic hydrocarbon ring in Ar1 is not particularly limited, and is exemplified by a benzene ring, a condensed aromatic hydrocarbon ring containing 8 or more carbon atoms, an aromatic hydrocarbon ring-condensed heterocyclic ring, and a ring formed by linking two or more benzene rings.

The condensed aromatic hydrocarbon ring containing 8 or more carbon atoms is an aromatic compound containing 8 or more carbon atoms wherein the ring is composed of an aromatic hydrocarbon ring formed by fusing at least two or more benzene rings, and/or at least one or more kinds of aromatic hydrocarbon rings and an alicyclic hydrocarbon fused to the aromatic hydrocarbon ring. Specific examples thereof include naphthalene, anthracene, fluorene, phenanthrene and acenaphthene.

The aromatic hydrocarbon ring-condensed heterocyclic ring is a compound wherein at least a hetero atom-free aromatic compound (preferably a benzene ring) and a hetero atom-containing cyclic compound are fused. Here, the hetero atom-containing cyclic compound is preferably a 5-membered ring or a 6-membered ring. The hetero atom is preferably a nitrogen atom, an oxygen atom, or a sulfur atom. The hetero atom-containing cyclic compound may have a plurality of hetero atoms and, in this case, each heteroatom may be the same as or different from every other hetero atoms. Specific examples of the aromatic hydrocarbon ring-condensed heterocyclic ring include phthalimide, acridone, carbazole, benzoxazole, and benzothiazole.

The hydrophobic structural unit (a) represented by the general formula (AI) is preferably at least one structural unit selected from structural units derived from an acrylate or a (meth)acrylate. When the structural unit is at least one structural unit selected from structural units derived from an acrylate or a (meth)acrylate, an aromatic hydrocarbon ring can be bonded to the main chain through an ester bond, and a steric structure wherein an aromatic hydrocarbon ring expected to undergo interaction such as adsorption with pigment has freedom with respect to the main chain, can be configured.

Also, the hydrophobic structural unit (a) represented by the general formula (AI) preferably contains a monovalent group derived from a benzene ring, a condensed aromatic hydrocarbon ring containing 8 or more carbon atoms, an aromatic hydrocarbon ring-condensed heterocyclic ring, or a ring formed by linking two or more benzene rings. Because, by employing the aromatic hydrocarbon ring above, interaction such as adsorption with pigment can be exerted.

Specific examples of the monomer capable of forming the hydrophobic structural unit (a) represented by the general formula AI) are illustrated below, but the invention is not limited to the following specific examples.

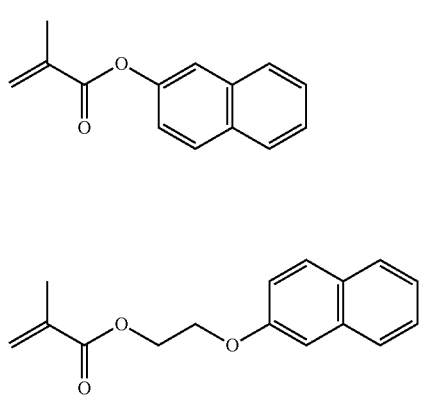

-continued
M-5
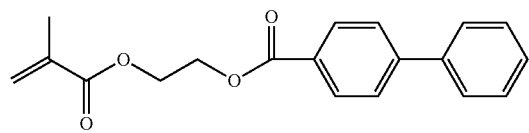
M-6
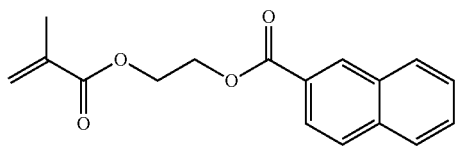
M-7
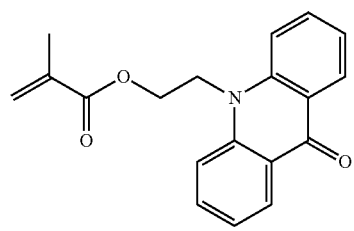
M-8
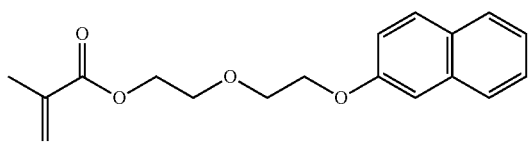
M-9
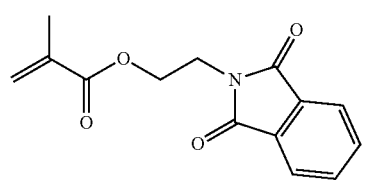
M-10
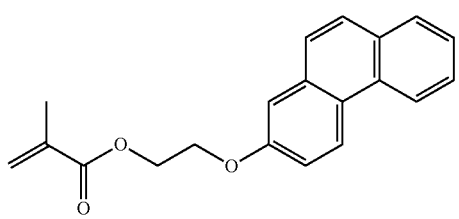
M-11
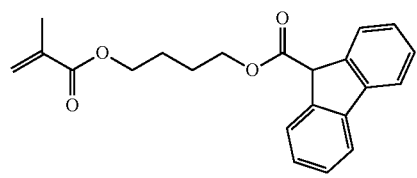
M-12
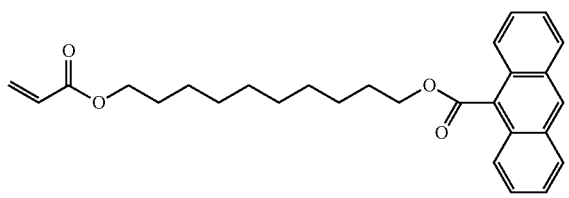
M-13
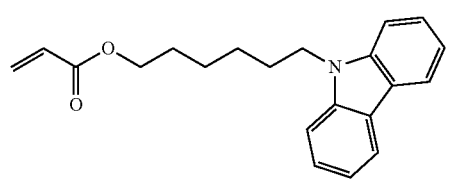
M-14
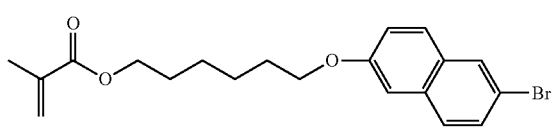
M-15
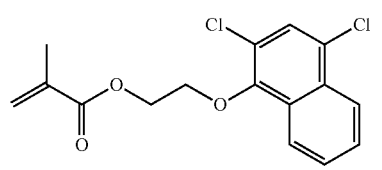
M-16
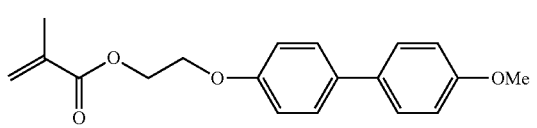
M-17
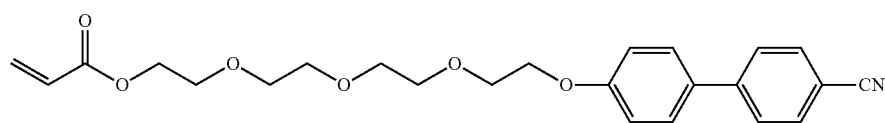
M-18
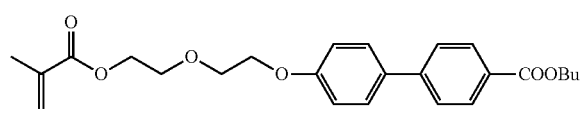
M-19
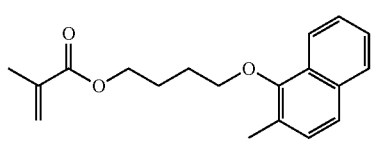

-continued

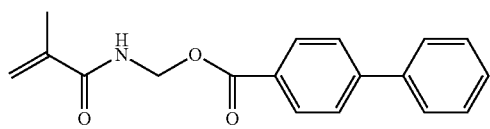
M-20

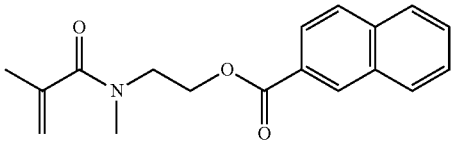
M-21

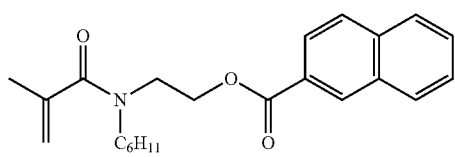
M-22

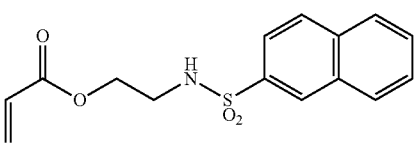
M-23

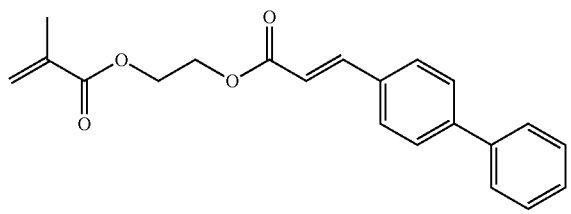
M-24

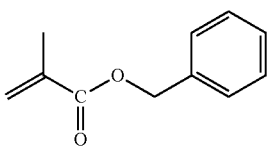
M-25

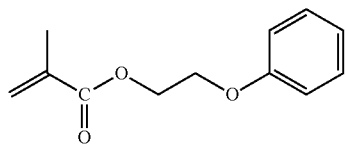
M-26

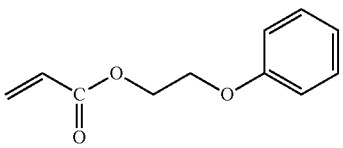
M-27

In the present invention, among the hydrophobic structural units (a) represented by the general formula (AI), in view of dispersion stability, the polymer preferably contains a structural unit derived from at least one member selected from benzyl acrylate, benzyl methacrylate, phenoxyethyl acrylate, and phenoxyethyl methacrylate, more preferably at least one member selected from phenoxyethyl methacrylate and benzyl methacrylate.

In the invention, the hydrophobic structural unit (a) more preferably contains a structural unit derived from a phenoxyethyl(meth)acrylate in a ratio of, in terms of the total amount, 20% by weight or more based on the entire weight of the vinyl polymer.

The hydrophobic structural unit (a) still more preferably contains a structural unit derived from at least one member selected from phenoxyethyl(meth)acrylate, and benzyl (meth)acrylate, more preferably at least one member selected from phenoxyethyl methacrylate and benzyl methacrylat in a ratio of, in terms of the total amount, 20% by weight or more based on the entire weight of the vinyl polymer, and the hydrophilic structural unit (c) contains at least one member selected from those derived from acrylic acid and methacrylic acid in a ratio of 30% by weight or less based on the entire weight of the vinyl polymer.

Among them, the hydrophobic structural unit (a) particularly preferably contains the structural unit derived from phenoxyethyl(meth)acrylate in a ratio of 20% by weight or more based on the entire weight of the vinyl polymer and contains, as the hydrophilic structural unit (c), at least one member selected from the structural units derived from acrylic acid and methacrylic acid in a ratio of 15% by weight or less based on the entire weight of the vinyl polymer.

Hydrophobic Structure (B) Derived from Alkyl Ester of Acrylic or Methacrylic Acid:

The vinyl polymer may contain a hydrophobic structural unit (b) derived from an alkyl ester of acrylic or methacrylic acid.

The carbon number of the alkyl ester is preferably from 1 to 18, more preferably from 1 to 8, still more preferably from 1 to 4, yet still more preferably from 1 to 2.

The content of the hydrophobic structural unit (b) is preferably from 5% by weight to 75% by weight, more preferably from 20% by weight to 60% by weight, based on the vinyl polymer.

Specific examples of the hydrophobic structural unit (b) include (meth)acrylates such as methyl(meth)acrylate, ethyl (meth)acrylate, (iso)propyl(meth)acrylate, (iso or tertiary)-butyl (meth)acrylate, cyclohexyl(meth)acrylate, dodecyl (meth)acrylate, and stearyl(meth)acrylate.

Among these, methyl(meth)acrylate, ethyl(meth)acrylate, and cyclohexyl(meth)acrylate are preferred.

Hydrophilic Structural Unit (c)

The hydrophilic structural unit (c) contained in the vinyl polymer in the invention is described below.

Examples of the hydrophilic structural unit (c) include an acrylic acid and a methacrylic acid, each having a carboxylic acid. A hydrophilic structural unit containing a nonionic hydrophilic group may also be illustrated.

Examples of the hydrophilic structural unit (c) include (meth)acrylates, (meth)acrylamides and vinyl esters, each having a hydrophilic functional group.

The hydrophilic functional group includes a hydroxyl group, an amino group, an amide group (with the nitrogen atom being unsubstituted), and the later described alkylene oxide polymers such as polyethylene oxide and polypropylene oxide.

Among these, hydroxyethyl(meth)acrylate, hydroxybutyl (meth)acrylate, (meth)acrylamide, aminoethyl acrylate, aminopropyl acrylate, and an alkylene oxide polymer-containing (meth)acrylate are particularly preferred.

The hydrophilic structural unit (c) includes, as an example, a hydrophilic structural unit having an alkylene oxide polymer structure.

The alkylene in the alkylene oxide polymer contains, in view of hydrophilicity, preferably from 1 to 6 carbon atoms, more preferably from 2 to 6 carbon atoms, still more preferably from 2 to 4 carbon atoms.

The polymerization degree of the alkylene oxide polymer is preferably from 1 to 120, more preferably from 1 to 60, still more preferably from 1 to 30.

The hydrophilic structural unit (c) includes, as an example, a hydrophilic structural unit containing a hydroxyl group. The number of hydroxyl groups is not particularly limited and, in view of hydrophilicity of the vinyl polymer and compatibility with the solvent or other monomers at the polymerization, is preferably from 1 to 4, more preferably from 1 to 3, still more preferably from 1 to 2.

Preferred examples of the hydrophilic structural unit (c) include an acrylic acid and a methacrylic acid.

The content of the hydrophilic structural unit (c) is preferably from 4 to 50% by weight, more preferably from 6 to 25% by weight, still more preferably form 8 to 15% by weight, based on the entire weight of the vinyl polymer.

The vinyl polymer in the invention is particularly preferably a polymer represented by the following general formula (AI) in view of the effects of the invention.

(AII):

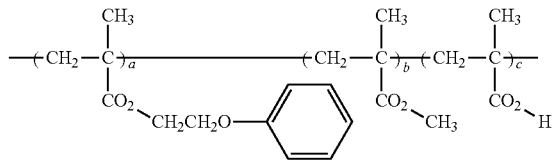

(In the general formula (AII), a represents a ratio of from 10% by weight to less than 75% by weight, based on the weight of the entire vinyl polymer. b represents a ratio of from 5% by weight to less than 50% by weight, based on the weight of the entire vinyl polymer. c represents a ratio of from 4% by weight to less than 50% by weight, based on the weight of the entire vinyl polymer. a+b+c=100.)

In the case where the vinyl polymer is in the form of the general formula (AII), a preferably represents a ratio of from 20% by weight to less than 60% by weight, based on the weight of the entire vinyl polymer, b preferably represents a ratio of from 5% by weight to less than 60% by weight, based on the weight of the entire vinyl polymer, c preferably represents a ratio of from 4% by weight to less than 50% by weight, based on the weight of the entire vinyl polymer; a particularly preferably represents a ratio of from 40% by weight to less than 60% by weight, based on the weight of the entire vinyl polymer, b particularly preferably represents a ratio of from 20% by weight to less than 60% by weight, based on the weight of the entire vinyl polymer, c particularly preferably represents a ratio of from 8% by weight to less than 15% by weight, based on the weight of the entire vinyl polymer. Additionally, a+b+c=100.)

Also, a combination of the vinyl polymer in this form of the general formula (AII) and any one of the azo pigment of the foregoing formulae (1a) to (3a) (corresponding to Pig.-18, Pig.-1, and Pig.-25, respectively) provides more improved advantages of the invention, thus being preferred.

<Structural Unit (d)>

The vinyl polymer in the invention may contain, as described above, a structural unit (d) having a structure different from the hydrophobic structural unit (a), the hydrophobic structural unit (b), and the hydrophilic structural unit (c) (hereinafter, simply referred to as a "structural unit (d)").

The content of the structural unit (d) is preferably from 15 to 80% by weight, more preferably from 25 to 70% by weight, still more preferably form 40 to 60% by weight, based on the entire weight of the vinyl polymer.

The monomer when the structural unit (d) is a hydrophobic structural unit is not particularly limited as long as it has a functional group capable of forming a polymer and a hydrophobic functional group, and any of conventionally known monomers may be used.

The monomer capable of forming the hydrophobic structural unit is preferably vinyl monomers (e.g., (meth)acrylamides, styrenes, and vinyl esters) in view of availability, handleability, and general-purpose use.

Examples of the (meth)acrylamides include (meth)acrylamides such as N-cyclohexyl(meth)acrylamide, N-2-(methoxyethyl)(meth)acrylamide, N,N-diallyl(meth)acrylamide, and N-allyl(meth)acrylamide.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chloro styrene, dichlorostyrene, bromo styrene, chloromethylstyrene, methyl vinylbenzoate, α-methylstyrene, and vinylnaphthalene, with styrene and α-methylstyrene being preferred.

Examples of the vinyl esters include vinyl esters such as vinyl acetate, vinyl chloroacetate, vinyl propionate, vinyl butyrate, vinyl methoxyacetate, and vinyl benzoate, with vinyl acetate being preferred.

These may be used alone, or two or more thereof may be mixed to use.

The vinyl monomer may be composed of only the hydrophobic structural unit (a) and the hydrophilic structural unit (c).

The aqueous ink for inkjet recording is preferably an aqueous ink wherein the hydrophobic structural unit (a) of the vinyl polymer contains at least one structural unit selected from a structural unit derived from a phenoxyethyl(meth)acrylate and a structural unit derived from a benzyl(meth)acrylate in a ratio of, in terms of the total amount, 20% by weight or more based on the entire weight of the vinyl polymer and the hydrophilic structural unit (c) contains at least one structural unit selected from structural units derived from an acrylic acid or a methacrylic acid in a ratio of, in terms of the total amount, 30% by weight or less based on the entire weight of the vinyl polymer.

In view of pigment dispersibility and storage stability, the acid value of the vinyl polymer of the invention is preferably from 30 mgKOH/g to 300 mgKOH/g, more preferably from 40 mgKOH/g to less than 150 mgKOH/g, still more preferably from 50 mgKOH/g to 100 mgKOH/g.

Additionally, the acid value as used herein is defined as the weight (mg) of KOH necessary for completely neutralizing 1 g of the vinyl polymer, and can be measured by the method described in JIS Standards (JIS K0070, 1992).

The vinyl polymer in the invention may be either a random copolymer in which respective structural units are randomly introduced or may be a block copolymer in which respective structural units are regularly introduced. In the case of a block copolymer, the polymer may be synthesized by introducing respective blocks in any order, and the same constituent component may be used for two or more blocks, but the vinyl polymer is preferably a random copolymer in view of general-purpose applicability and productability.

Further, the molecular weight of the vinyl polymer for use in the present invention is, in terms of the weight average molecular weight (Mw), preferably from 30,000 to 150,000, more preferably from 30,000 to 100,000, still more preferably from 30,000 to 80,000.

The weight average molecular weight within the range described above is preferred from the standpoint that the vinyl polymer is liable to provide a good steric repulsion effect as a dispersant and, owing to the steric effect, tends to reduce the time required for the adsorption to pigment.

Also, the molecular weight distribution (represented by weight average molecular weight value/number average molecular weight value) of the vinyl polymer for use in the present invention is preferably from 1 to 6, more preferably from 1 to 4.

The molecular weight distribution within the above-described range is preferred in view of dispersion stability and ejection stability of the ink. The number average molecular weight and weight average molecular weight as used herein are a molecular weight measured by the differential refractometer detection with a solvent of THF in a GPC analyzer using column TSKgel GMHxL, TSKgel G4000HxL or TSKgel G2000HxL (all trade names, produced by Tosoh Corporation) and expressed in terms of polystyrene as the standard material.

The vinyl polymer for use in the present invention may be synthesized by various polymerization methods such as solution polymerization, precipitation polymerization, suspension polymerization, sedimentation polymerization, bulk polymerization, and emulsion polymerization. The polymerization reaction may be performed by a known operation such as batch system, semi-continuous system, and continuous system.

Examples of the method for initiating the polymerization include a method using a radical initiator and a method by the irradiation of light or radiation. The polymerization method and the method for initiating the polymerization are described in, for example, Teiji Tsuruta, *Kobunshi Gosei Houhou* (Polymer Synthesis Method), revised edition, Nikkan Kogyo Shimbun (1971) and Takayuki Otsu and Masayoshi Kinoshita (co-authored), *Kobunshi Gosei no Jikkenn Ho* (Experimental Technique For Polymer Synthesis), pp. 124-154, Kagaku Dojin (1972).

Among the above-described polymerization methods, a solution polymerization method using a radical initiator is particularly preferred. Example of the solvent for use in the solution polymerization method include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. These solvents may be used individually or as a mixture of two or more thereof, or may be used as a mixed solvent with water.

The polymerization temperature needs to be set in connection with the molecular weight of the polymer to be produced and the kind of the initiator, and is usually from about 0 to about 100° C., but the polymerization is preferably performed at a temperature of 50 to 100° C.

The reaction pressure may be appropriately selected and is usually from 1 to 100 kg/cm$^2$, preferably from about 1 to about 30 kg/cm$^2$. The reaction time is approximately from about 5 to about 30 hours. The obtained resin may be subjected to purification such as reprecipitation.

In view of dispersion stability, the ratio of the amount added of the vinyl polymer in the present invention is, on the weight basis, preferably from 10 to 100%, more preferably from 30 to 60%, based on the pigment.

The vinyl polymer pigment dispersion in the present invention can be produced by a conventional physical or chemical method using the specific resin, the pigment, and the like. For example, the resin can be produced by the method described in JP-A-9-151342, JP-A-10-140065, JP-A-11-209672, JP-A-11-172180, JP-A-10-25440 and JP-A-11-43636. Specific examples thereof include a phase inversion method and an acid precipitation method described in JP-A-9-151342 and JP-A-10-140065. Above all, a phase inversion method is preferred in view of dispersion stability.

The specific resin preferably contains (a) a hydrophobic structural unit having an aromatic hydrocarbon ring bonded to the polymer main chain through a linking group and (b) a hydrophilic structural unit (c). It is more preferred for the specific resin to contain an aqueous medium.

a) Phase Inversion Method

The phase inversion method is fundamentally a self-dispersion (phase inversion emulsification) method of dispersing a mixed melt of a self-dispersing or self-dissolving resin and a pigment in water, wherein a pigment-containing vinyl polymer particle can be obtained. The term "mixed melt" as used herein includes a state of the melt being mixed without dissolving, a state of the melt being dissolved and mixed, and a state containing these two states. Specific examples of the production method by the "phase inversion method" include the methods described in JP-A-10-140065.

b) Acid Precipitation Method

The acid precipitation method is a method of preparing a hydrous cake composed of the resin and the pigment and neutralizing a part or all of anionic groups of the resin in the hydrous cake by using a basic compound to obtain a pigment-containing vinyl polymer particle.

The acid precipitation method specifically includes a method comprising (1) a step of dispersing the resin and the pigment in an alkaline aqueous medium and, if desired, performing a heat treatment to gel the resin, (2) a step of adjusting the pH to neutral or acidic to hydrophobe the resin, thereby firmly attaching the resin to the pigment, (3) a step of, if desired, performing filtration and water washing to obtain a hydrous cake, (4) a step of neutralizing a part or all of anionic groups of the resin in the hydrous cake by using a basic compound and then re-dispersing the cake in an aqueous medium, and (5) a step of, if desired, performing a heat treatment to gel the resin.

Specific examples of the production method by the phase inversion method or acid precipitation method include the methods described in JP-A-9-151342 and JP-A-10-140065.

In the aqueous ink of the invention for inkjet recording, the pigment-containing vinyl polymer dispersion can be obtained by providing a step of obtaining the specific resin as an aqueous dispersion, specifically, a preparation step of preparing a dispersion of a pigment-containing vinyl polymer particle by a method comprising the following steps (1) and (2). Also, the production of the aqueous ink of the invention for inkjet recording can be performed suitably by a method of providing the above-described preparation step and using the obtained vinyl polymer pigment dispersion together with water and a water-soluble organic solvent to produce an aqueous ink.

Step (1): A step of dispersing a mixture containing the above-described specific resin in the invention, an organic solvent, a neutralizing agent, a pigment, and water by stirring or the like to obtain a dispersion.

Step (2): A step of removing the organic solvent from the dispersion.

The stirring method is not particularly limited, and a mixing/stirring apparatus in general use and, if desired, a disperser such as ultrasonic disperser, high-pressure homogenizer, and bead mill may be used.

The preferred organic solvent includes an alcohol series solvent, a ketone series solvent, and an ether series solvent.

Examples of the alcohol series solvent include isopropyl alcohol, n-butanol, tert-butanol, and ethanol. Examples of the ketone series solvent include acetone, methyl ethyl ketone, diethyl ketone, and methyl isobutyl ketone. Examples of the ether series solvent include dibutyl ether and dioxane. Among these solvents, a ketone series solvent such as methyl ethyl ketone and an alcohol series solvent such as isopropyl alcohol are preferred, with methyl ethyl ketone being most preferred.

The neutralizing agent is used to neutralize a part or all of dissociative groups and form a stably emulsified or dispersed state of the specific resin in water. In the case where the specific resin has an anionic dissociative group as the dissociative group, the neutralizing agent used here includes a basic compound such as organic amine compound, ammonia, and alkali metal hydroxide. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and triisopropanolamine. Examples of the alkali metal hydroxide include lithium hydroxide, sodium hydroxide, and potassium hydroxide. Among these, in view of dispersion stability in water, sodium hydroxide, potassium hydroxide, triethylamine, and triethanolamine are preferred, with sodium hydroxide and potassium hydroxide being more preferred.

The content of the basic compound is preferably from 5 to 120 mol %, more preferably from 10 to 120 mol %, still more preferably from 80 to 120 mol %, per 100 mol % of the dissociative group. When the content is 5 mol % or more, this is effective in stabilizing dispersion in water and, when it is 120 mol % or less, an effect of reducing water-soluble components is produced.

In the step (2), the organic solvent is distilled off from the dispersion obtained in the step (1) by an ordinary method such as reduced-pressure distillation to effect phase inversion to an aqueous system, whereby a pigment dispersion of a vinyl polymer wherein the particle surface of the pigment is covered by the resin can be obtained. In the obtained dispersion, the organic solvent is substantially removed, and the amount of the organic solvent is preferably 0.2% by weight or less, more preferably 0.1% by weight or less.

More specifically, the aqueous ink for inkjet recording can be produced, for example, by providing (1) a step of mixing a solution that is prepared by dissolving the anionic group-containing specific resin in the invention in an organic solvent, with a basic compound (neutralizing agent) and water, thereby effecting neutralization, (2) a step of mixing the resulting mixed solution and a pigment to form a suspension, and then dispersing the pigment by a disperser or the like to obtain a pigment liquid dispersion, and (3) a step of removing the organic solvent by, for example, distillation to coat the pigment with the anionic group-containing specific resin, and dispersing the coated pigment in an aqueous medium to obtain an aqueous dispersion.

Additionally, for more specific details, JP-A-11-2096722 and JP-A-11-172180 may be referred to.

The volume-average particle diameter of the pigment dispersion means the particle diameter of the pigment itself or, in the case where additives such as a vinyl polymer dispersant are adhered to the pigment, means the particle diameter of the additive-adhered particle.

The volume-average particle diameter (Mv) of the vinyl polymer pigment dispersion contained in the aqueous ink of the invention for inkjet recording is preferably from 10 to 400 nm, more preferably from 10 to 200 nm, still more preferably from 50 to 150 nm, with 50 nm to 100 nm being most preferred. In case when the volume-average particle diameter is less than 20 nm, storage stability might not be obtained in some cases whereas, when more than 250 nm, the optical density might in some cases become low. Additionally, the vinyl polymer pigment dispersion is not particularly limited with respect to its particle diameter distribution and may be either a vinyl polymer pigment dispersion having a broad particle diameter distribution or a vinyl polymer pigment dispersion having a monodisperse particle diameter distribution.

The average particle diameter and particle diameter distribution of the vinyl polymer pigment dispersion are values determined by measuring the volume-average particle diameter according to a dynamic light scattering method using a Nanotrac particle size distribution measuring apparatus, UPA-EX 150 (manufactured by Nikkiso Co., Ltd.). The measurement is conducted according to a predetermined measuring method by placing 3 ml of a pigment dispersion in a measuring cell. Additionally, with respect to parameters to be inputted upon measurement, an ink viscosity is used as a viscosity, and a pigment density is used as a density of the pigment.

In the invention, the dispersing treatment may be performed using, for example, a stirrer, an impeller-stirring system, an in-line stirring system, a mill system (for example, colloid mill, ball mill, sand mill, beads mill, attritor, roll mill, jet mill, paint shaker, or agitator mill), a ultrasonic wave system, a high-pressure emulsion dispersion system (high-pressure homogenizer; specific commercially available apparatuses being Gaulin homogenizer, a microfluidizer, and DeBEE2000).

The content of the pigment contained in the aqueous pigment dispersion of the invention is preferably in the range of from 1 to 35% by weight, more preferably from 2 to 25% by weight, particularly preferably from 10 to 20% by weight. In case when the content is less than 1% by weight, a sufficient image density might in some cases not be obtained when the pigment dispersion is used independently as an ink. In case when the content exceeds 35% by weight, dispersion stability might be lowered in some cases.

The content of the vinyl polymer pigment dispersion, wherein pigment particles are coated with the specific resin, in the aqueous ink for inkjet recording is preferably from 1 to 10% by weight, more preferably from 2 to 8% by weight, still more preferably from 2 to 6% by weight, in view of dispersion stability and concentration of the aqueous ink for inkjet recording.

[Aqueous Ink for Inkjet Recording]

Next, the aqueous ink of the invention for inkjet recording is described below. The aqueous ink of the invention for inkjet recording (hereinafter also referred to as "ink" in some cases) contains the aqueous pigment dispersion of the invention and the aqueous medium. It is preferably prepared by mixing with the aqueous medium, water, or the like.

In consideration of hue, color density, saturation, transparency, and the like, the content of the pigment dispersion in the ink of the invention is preferably in the range of from 1 to 100% by weight, particularly preferably from 3 to 20% by weight, most preferably from 3 to 10% by weight.

The pigment of the invention is contained in an amount of preferably from 0.1 part by weight to 20 parts by weight, more preferably from 0.2 part by weight to 10 parts by weight, still more preferably from 1 to 10 parts by weight, per 100 parts by weight of the ink of the invention. Also, the ink of the invention may contain other pigments together with the pigment of the invention. In the case of using two or more pigments in combination, the sum of the contents of respective pigments is preferably within the aforesaid range.

The ink of the invention can be used for forming not only a mono-color image but a full-color image as well. In order to form a full-color image, a magenta tone ink, a cyan tone ink, and a yellow tone ink may be used and, in order to adjust color tone, a black tone ink may also be used.

Further, in the ink of the invention may be used other pigments in addition to the azo pigment of the invention. As yellow pigments to be applied, there are illustrated, for example, C.I. P.Y.-74, C.I. P.Y.-120, C.I. P.Y.-128, C.I.P.Y.-138, C.I.P.Y.-139, C.I.P.Y.150, C.I. P.Y.-155, C.I.P.Y.-180, C.I.P.Y.-185, and C.I. P.Y.-213. As magenta pigments to be applied, there are illustrated C.I. P.V.-19, and C.I. P.R-122. As cyan pigments to be applied, there are illustrated C.I. P.B-15:3 and C.I. P.B-15:4. Apart from these pigments, any pigment may be used as each pigment. As a black color material, there can be illustrated a dispersion of carbon black (C.I.P.B.-7) as well as disazo, trisazo, and tetrazo pigments.

<Aqueous Medium>

The aqueous ink of the invention for inkjet recording contains an aqueous medium as an essential component. The aqueous medium includes a water-soluble organic solvent. The water-soluble organic solvent is used for the purpose of functioning as an anti-drying agent, a wetting agent, or a penetration accelerator.

The anti-drying agent is used for the purpose of preventing nozzle clogging due to drying of the ink at an ink ejection port. The anti-drying agent and wetting agent are preferably a water-soluble organic solvent having a vapor pressure lower than that of water. Also, for the purpose of allowing more successful penetration of the ink into paper, a water-soluble organic solvent is preferably used as the penetration accelerator.

Examples of the water-soluble organic solvent include alkanediols (polyhydric alcohols) such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, polyoxyethylene glyceryl ether, polyoxypropylene glyceryl ether, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; saccharides such as glucose, mannose, fructose, ribose, xylose, arabinose, galactose, aldonic acid, glucitol, (sorbitol), maltose, cellobiose, lactose, sucrose, trehalose, and maltotriose; sugar alcohols; hyaluronic acids; so-called solid wetting agents such as ureas; alkyl alcohols containing from 1 to 4 carbon atoms, such as ethanol, methanol, butanol, propanol, and isopropanol; glycol ethers such as ethylene glycol monomethyl ether, ethylene glycol monoethyl ether, ethylene glycol monobutyl ether, ethylene glycol monoethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrrolidone, N-methyl-2-pyrrolidone, 1,3-dimethyl-2-imidazolidinone, formamide, acetamide, dimethyl sulfoxide, sorbitol, sorbitan, acetin, diacetin, triacetin, and sulfolane. These organic solvents may be used individually or in combination of two or more thereof.

For use as an anti-drying agent or a wetting agent, a polyol compound is useful, and examples thereof include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, and 1,2,6-hexanetriol. These may be used alone or in combination of two or more thereof.

For use as a penetrant, a polyol compound is preferred, and examples of the aliphatic diol include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, and 2-ethyl-1,3-hexanediol. Among these, 2-ethyl-1,3-hexanediol and 2,2,4-trimethyl-1,3-pentanediol can be illustrated as preferred examples.

As regards the aqueous medium for use in the invention, one kind may be used alone or a mixture of two or more kinds may be used. Preferred examples of the aqueous medium include glycerin, dipropylene glycol, polyoxyethylene glyceryl ether, and polyoxypropylene glyceryl ether.

The content of the aqueous solvent is from 5% by weight to 60% by weight, preferably from 10% by weight to 40% by weight.

The addition amount of water for use in the present invention is not particularly limited but is preferably from 10% by weight to 99% by weight, more preferably from 30% by weight to 80% by weight, still more preferably from 50% by weight to 70% by weight.

<Surfactant>

The ink of the invention preferably contains a surface tension regulating agent. The surface tension regulating agent includes nonionic, cationic, anionic, and betaine surfactants. In order for the ink droplets to successfully hit by an inkjet system, the addition amount of the surface tension regulating agent is preferably an amount capable of adjusting the surface tension of the ink of the invention to from 20 to 60 mN/m, more preferably from 20 to 45 mN/m, still more preferably from 25 to 40 mN/m.

As the surfactant in the invention, a compound having a structure containing both a hydrophilic moiety and a hydrophobic moiety in the molecule may be effectively used, and any of an anionic surfactant, a cationic surfactant, an amphoteric surfactant, and a nonionic surfactant can be used. Furthermore, the above-described polymer substance (polymer dispersant) is also usable as the surfactant.

Specific examples of the anionic surfactant include sodium dodecylbenzenesulfonate, sodium laurylsulfate, sodium alkyldiphenyl ether disulfonate, sodium alkylnaphthalenesulfonate, sodium dialkylsulfosuccinate, sodium stearate, potassium oleate, sodium dioctylsulfosuccinate, sodium polyoxyethylene alkyl ether sulfate, sodium polyoxyethylene allyl ether sulfate, sodium polyoxyethylene alkylphenyl ether sulfate, sodium dialkylsulfosuccinate, sodium stearate, sodium oleate, and sodium t-octylphenoxyethoxypolyethoxyethylsulfate. One of these surfactants or two or more thereof may be selected.

Specific examples of the nonionic surfactant include polyoxyethylene lauryl ether, polyoxyethylene octylphenyl ether, polyoxyethylene oleylphenyl ether, polyoxyethylene nonylphenyl ether, an oxyethylene-oxypropylene block copolymer, t-octylphenoxyethyl polyethoxyethanol, and nonylphenoxyethyl polyethoxyethanol. One of these surfactants or two or more thereof may be selected.

Examples of the cationic surfactant include a tetraalkylammonium salt, an alkylamine salt, a benzalkonium salt, an alkylpyridinium salt, and an imidazolium salt, and specific examples thereof include dihydroxyethyl stearylamine, 2-heptadecenyl-hydroxyethylimidazoline, lauryldimethylbenzylammonium chloride, cetylpyridinium chloride, and stearamidomethylpyridinium chloride.

The amount of the surfactant added to the liquid composition of the present invention for inkjet recording is not particularly limited, but is preferably 1% by weight or more, more preferably from 1 to 10% by weight, still more preferably from 1 to 3% by weight.

<Other Components>

The ink of the invention may contain other additives. Examples of other additives include known additives such as ultraviolet absorber, anti-fading agent, fungicide, pH-adjusting agent, rust preventing agent, antioxidant, emulsion stabilizer, antiseptic, defoaming agent, viscosity adjusting agent, dispersion stabilizer, and chelating agent.

Examples of the ultraviolet absorber include benzophenone series ultraviolet absorber, a benzotriazole series ultraviolet absorber, a salicylate series ultraviolet absorber, a cyanoacrylate series ultraviolet absorber, and a nickel complex salt series ultraviolet absorber.

As for the anti-fading agent, various organic or metal complex series anti-fading agents may be used. Examples of the organic anti-fading agent include hydroquinones, alkoxyphenols, dialkoxyphenols, phenols, anilines, amines, indanes, chromans, alkoxyanilines, and heterocyclic rings, and examples of the metal complex include a nickel complex and a zinc complex.

Examples of the fungicide include sodium dehydroacetate, sodium benzoate, sodium pyridinethione-1-oxide, ethyl p-hydroxybenzoate, 1,2-benzisothiazolin-3-one, sodium sorbate, and pentachlorophenol sodium. The fungicide is preferably used in an amount of 0.02 to 1.00% by weight in the ink.

The pH adjusting agent is not particularly limited as long as it can adjust the pH to a desired value without adversely affecting the recording ink prepared, and an appropriate pH adjusting agent may be selected according to the purpose, but examples thereof include alcohol amines (e.g., diethanolamine, triethanolamine, and 2-amino-2-ethyl-1,3-propanediol), alkali metal hydroxides (e.g., lithium hydroxide, sodium hydroxide, and potassium hydroxide), ammonium hydroxides (e.g., ammonium hydroxide and quaternary ammonium hydroxide), phosphonium hydroxides, and alkali metal carbonates.

Examples of the rust preventing agent include acidic sulfite, sodium thiosulfate, ammonium thiodiglycolate, diisopropylammonium nitrite, pentaerythritol tetranitrate, and dicyclohexylammonium nitrite.

Examples of the antioxidant include a phenol series antioxidant (including a hindered phenol series antioxidant), an amine series antioxidant, a sulfur series antioxidant, and a phosphorous serie antioxidant.

Examples of the chelating agent include sodium ethylenediaminetetraacetate, sodium nitrilotriacetate, sodium hydroxyethylethylenediaminetriacetate, sodium diethylenetriaminepentaacetate, and sodium uramil diacetate.

<Resin Fine Particles>

The ink of the invention may contain resin fine particles or a polymer latex. Examples of the resin fine particles or polymer latex include acrylic resin, vinyl acetate series resin, styrene-butadiene series resin, vinyl chloride series resin, acryl-styrene series resin, butadiene series resin, styrene series resin, crosslinked acrylic resin, crosslinked styrene series resin, benzoguanamine resin, phenol resin, silicone resin, epoxy resin, urethane series resin, paraffin series resin, and fluorine-containing resin. Of these examples, preferred are acrylic resin, acryl-styrene series resin, styrene series resin, crosslinked acrylic resin, and crosslinked styrene series resin.

Preferred examples of the resin fine particles include self-dispersing polymer fine particles. The self-dispersing polymer fine particles are fine particles of a vinyl polymer capable of forming a dispersed state in an aqueous medium in the absence of other surfactants by the action of a functional group (in particular, an acidic group or a salt thereof) possessed by the polymer itself, with the vinyl polymer not containing a free emulsifier. The dispersed state as used herein includes both an emulsified state (emulsion) wherein the vinyl polymer is dispersed in a liquid state in an aqueous medium, and a dispersed state (suspension) wherein the vinyl polymer is dispersed in a solid state in an aqueous medium. In the invention, the vinyl polymer is preferably a vinyl polymer capable of forming a dispersed state wherein the vinyl polymer is dispersed in a solid state.

In view of self-dispersibility, the self-dispersing polymer fine particles to be preferably used in the invention preferably contains a vinyl polymer containing a hydrophilic constituent unit and a constituent unit derived from an aromatic group-containing monomer.

The hydrophilic constituent unit is not particularly limited as long as it is derived from a hydrophilic group-containing monomer, and this unit may be derived from one kind of a hydrophilic group-containing monomer or may be derived from two or more kinds of hydrophilic group-containing monomers. The hydrophilic group is not particularly limited, and may be a dissociative group or a nonionic hydrophilic group. From the standpoint of accelerating self-dispersion and stabilizing the formed emulsion or dispersion state, the hydrophilic group is preferably a dissociative group, more preferably an anionic dissociative group. Examples of the dissociative group include a carboxyl group, a phosphoric acid group, and a sulfonic acid group. Among these, a carboxyl group is preferred in view of fixing property of the ink composition prepared. Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid. Specific examples of the unsaturated sulfonic acid monomer include styrenesulfonic acid, 2-acrylamido-2-methylpropanesulfonic acid, 3-sulfopropyl (meth)acrylate, and bis-(3-sulfopropyl)-itaconic acid ester. Specific examples of the unsaturated phosphoric acid monomer include vinylphosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate. In view of dispersion stability and ejection stability, an unsaturated carboxylic acid monomer is preferred, with an acrylic acid and a methacrylic acid being more preferred.

The aromatic group-containing monomer is not particularly limited as long as it is a compound containing an aromatic group and a polymerizable group. The aromatic group may be a group derived from an aromatic hydrocarbon or a group derived from an aromatic heterocyclic ring. An aromatic group derived from an aromatic hydrocarbon is preferred in view of stability of the particle shape in an aqueous medium. The polymerizable group may be a condensation polymerizable group or an addition polymerizable group. In the invention, in view of the stability of particle shape in an aqueous medium, an addition polymerizable group is preferred, with a group containing an ethylenically unsaturated bond being more preferred.

The aromatic group-containing monomer is preferably a monomer having an aromatic hydrocarbon-derived aromatic group and an ethylenically unsaturated bond, more preferably an aromatic group-containing (meth)acrylate monomer. Examples of the aromatic group-containing monomer include a phenoxyethyl(meth)acrylate, a benzyl(meth)acrylate, a phenyl (meth)acrylate, and a styrene series monomer. Among these, in view of the balance between hydrophilicity and hydrophobicity of the polymer chain and the ink fixing property, at least one selected from a phenoxyethyl(meth)acrylate, a benzyl(meth)acrylate, and a phenyl (meth)acrylate is preferred, a phenoxyethyl(meth)acrylate is more preferred, and phenoxyethyl acrylate is particularly preferred.

Additionally, the term "(meth)acrylate" means an acrylate or a methacrylate. It is preferred that the self-dispersing polymer fine particles contain a constituent unit derived from an aromatic group-containing (meth)acrylate monomer and that the content thereof is from 10% by weight to 95% by weight. When the content of the aromatic group-containing (meth)acrylate monomer is from 10% by weight to 95% by weight, the stability of self-emulsified or self-dispersed state is enhanced, and an increase in the ink viscosity can be suppressed. In view of stability of the self-dispersed state, or from the standpoint of stabilizing the particle shape in an aqueous medium by hydrophobic interaction between aromatic rings or of reducing the amount of water-soluble components by virtue of appropriate hydrophobization of the particles, the content of the constituent unit is more preferably from 15% by weight to 90% by weight, still more preferably from 15% by weight to 80% by weight, particularly preferably from 25% by weight to 70% by weight.

The self-dispersing polymer fine particles may consist of, for example, a constituent unit composed of an aromatic group-containing monomer and a constituent unit composed of a dissociative group-containing monomer, and may further contain other constituent units, if desired. The monomer forming other constituent units is not particularly limited as long as it is a monomer copolymerizable with the aromatic group-containing monomer and the dissociative group-containing monomer. Above all, an alkyl group-containing monomer is preferred in view of flexibility of the polymer structure and easy control of the glass transition temperature (Tg).

Examples of the alkyl group-containing monomer include an alkyl(meth)acrylate such as methyl(meth)acrylate, ethyl (meth)acrylate, isopropyl(meth)acrylate, n-propyl(meth) acrylate, n-butyl (meth)acrylate, isobutyl(meth)acrylate, t-butyl(meth)acrylate, hexyl(meth)acrylate, and ethylhexyl (meth)acrylate; an ethylenically unsaturated monomer having a hydroxyl group, such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth) acrylate, and hydroxyhexyl(meth)acrylate; a dialkylaminoalkyl(meth)acrylate such as dimethylaminoethyl(meth) acrylate; and a (meth)acrylamide including an N-hydroxyalkyl(meth)acrylamide such as N-hydroxymethyl (meth)acrylamide, N-hydroxyethyl(meth)acrylamide, and N-hydroxybutyl(meth)acrylamide, and an N-alkoxyalkyl (meth)acrylamide such as N-methoxymethyl(meth)acrylamide, N-ethoxymethyl(meth)acrylamide, N-(n-iso)butoxymethyl(meth)acrylamide, N-methoxyethyl(meth)acrylamide, N-ethoxyethyl(meth)acrylamide, and N-(n-,iso)butoxyethyl(meth)acrylamide.

The molecular weight of the vinyl polymer constituting the self-dispersing polymer fine particle in the invention is, in terms of the weight average molecular weight, preferably from 3,000 to 200,000, more preferably from 5,000 to 150,000, still more preferably from 10,000 to 100,000. By setting the weight average molecular weight to 3,000 or more, the amount of water-soluble components can be effectively reduced and, by setting the weight average molecular weight to 200,000 or less, the self-dispersion stability can be increased.

Additionally, the weight average molecular weight can be measured by gel permeation chromatograph (GPC).

From the standpoint of controlling the hydrophilicity and hydrophobicity of the polymer, the vinyl polymer constituting the self-dispersing polymer fine particles preferably contains an aromatic group-containing (meth)acrylate monomer in a copolymerization ratio of 15 to 90% by weight, a carboxyl group-containing monomer, and an alkyl group-containing monomer, and has an acid value of 25 to 100 and a weight average molecular weight of 3,000 to 200,000, more preferably contains an aromatic group-containing (meth) acrylate monomer in a copolymerization ratio of 15 to 80% by weight, a carboxyl group-containing monomer, and an alkyl group-containing monomer, and has an acid value of 25 to 95 and a weight average molecular weight of 5,000 to 150,000.

The average particle diameter of the self-dispersing polymer fine particles is preferably from 10 nm to 1 μm, more preferably from 10 to 200 nm, still more preferably from 20 to 100 nm, particularly preferably from 20 to 50 nm.

The addition amount of the self-dispersing fine particles is preferably from 0.5 to 20% by weight, more preferably from 3 to 20% by weight, still more preferably from 5 to 15% by weight, based on the ink.

The glass transition temperature Tg of the self-dispersing polymer fine particles is preferably 30 C.° or more, more preferably 40 C.° or more, still more preferably 50 C.° or more.

Also, the polymer particles are not particularly limited with respect to their particle diameter distribution, and may be either polymer particles having a broad particle diameter distribution or polymer particles having a monodisperse particle diameter distribution. Also, two or more kinds of polymer fine particles each having a monodisperse particle diameter distribution may be mixed and used.

<Liquid Composition for Enhancing Printability>

In the invention, for example, a liquid composition for enhancing the printability is preferably imparted to a printing medium.

One preferred example of the liquid composition for enhancing the printability, which can be used in the invention, is a liquid composition capable of producing an aggregate by changing the pH of the ink. At this time, the pH of the liquid composition is preferably from 1 to 6, more preferably from 2 to 5, still more preferably from 3 to 5. The component of the liquid composition is preferably selected from, for example, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, derivatives of these compounds, and salts thereof. These compounds may be used alone or in combination of two or more thereof.

Also, one preferred example of the liquid composition for enhancing the printability, which can be used in the invention, is a processing solution having added thereto a polyvalent metal salt or a polyallylamine. Examples of the component of the liquid composition include, as the polyvalent metal salt, an alkaline earth metal of Group 2A of the periodic table (e.g., magnesium, calcium); a transition metal of Group 3B of the periodic table (e.g., lanthanum); a cation from Group 3A of the periodic table (e.g., aluminum); lanthanides (e.g., neodymium); and polyallylamine and a polyallylamine derivative. Of these, calcium and magnesium are preferred examples. Examples of the anion that may be preferably employed as a counter salt of calcium or magnesium include a carboxylate salt (e.g., formate, acetate, or benzoate), a nitrate, a chloride, and a thiocyanate. As for the amount added to the processing solution, the salt may be allowed to exist in an amount of from about 1 to about 10% by weight, preferably from about 1.5 to about 7% by weight, more preferably from about 2 to about 6% by weight, in the processing solution.

The aqueous media to be used in the invention may be used independently or as a mixture of two or more thereof. The aqueous medium is used in a content of from 1% by weight to 60% by weight, preferably from 5% by weight to 40% by weight, based on the entire ink. In case when the content of the aqueous medium in the ink is less than 1% by weight, sufficient optical density might not be obtained in some cases whereas, when more than 60% by weight, viscosity of the liquid might in some cases becomes so large that ejection characteristics of the ink liquid becomes unstable.

<Physical Properties of Ink>

The preferred physical properties of the ink of the invention are as follows. The surface tension of the ink is preferably from 20 mN/m to 60 mN/m, more preferably from 20 mN/m to 45 mN/m, still more preferably from 25 mN/m to 35 mN/m. In case when the surface tension is less than 20 mN/m, the liquid might, in some cases, overflow onto the nozzle surface of the recording head, thus normal printing not being performed. On the other hand, in case when the surface tension exceeds 60 mN/m, the ink might, in some cases, slowly penetrate into the recording medium, thus the drying time becoming longer.

Additionally, the surface tension is measured under the environment of 23° C. and 55% RH by using a Wilhelmy surface tension balance as is the same as described above.

The viscosity of the ink is preferably from 1.2 mPa·s to 8.0 mPa·s, more preferably from 1.5 mPa·s to less than 6.0 mPa·s, still more preferably from 1.8 mPa·s to less than 4.5 mPa·s. In case when the viscosity is more than 8.0 mPa·s, ink ejection properties might, in some cases, be deteriorated. On the other hand, in case when the viscosity is less than 1.2 mPa·s, the long-term ejection properties might be deteriorated in some cases.

Additionally, the above-described viscosity (including that to be described hereinafter) is measured by using a rotational viscometer Rheomat 115 (manufactured by Contraves Co.) at 23° C. and a shear rate of 1,400 s$^{-1}$.

In addition to the above-mentioned individual components, water is added to the ink within an amount of providing the preferred surface tension and viscosity described above. The addition amount of water is not particularly limited, but is in the range of preferably from 10% by weight to 99% by weight, more preferably from 30% by weight to 80% by weight, based on the entire ink.

<Inkjet Recording Method>

As for the inkjet recording method preferred in the invention, energy is provided to the ink for inkjet recording to form an image on a known image-receiving material, that is, plain paper, resin-coated paper such as inkjet exclusive paper described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, and JP-A-10-337947, film, electrophotographic common paper, cloth, glass, metal, ceramic or the like. Additionally, those described in paragraphs 0093 to 0105 of JP-A-2003-306623 can be applied as the inkjet recording method preferred in the invention.

In forming an image, a polymer latex compound may be used in combination for the purpose of imparting gloss or water resistance or improving the weather resistance. The timing of imparting the latex compound to an image-receiving material may be before or after imparting a coloring material or simultaneously therewith. Accordingly, the site to which the polymer latex compound is added may be in the image-receiving paper or in the ink, or a liquid material of the polymer latex alone may be used. Specifically, the methods described in JP-A-2002-166638 (Japanese Patent Application No. 2000-363090), JP-A-2002-121440 (Japanese Patent Application No. 2000-315231), JP-A-2002-154201 (Japanese Patent Application No. 2000-354380), JP-A-2002-144696 (Japanese Patent Application No. 2000-343944), and JPA-2002-080759 (Japanese Patent Application No. 2000-268952) may be preferably used.

The image forming system preferred in the invention, as one example, includes a first step: a step of imparting a liquid composition for enhancing printability to a recording medium; a second step: a step of imparting an ink composition to the recording medium imparted with the liquid composition; and other steps: other steps are not particularly limited and may be appropriately selected according to the purpose, and examples thereof include a drying/removing step and a heating/fixing step. The drying/removing step is not particularly limited except for drying and removing the ink solvent in the ink composition imparted to the recording medium and may be appropriately selected according to the purpose. The heating/fixing step is not particularly limited except for melting/fixing latex particles contained in the ink used for the above-described inkjet recording method and may be appropriately selected according to the purpose.

The image forming system preferred in the present invention, as another example, includes a first step: a step of imparting a liquid composition for enhancing printability to an intermediate transfer material; a second step: a step of imparting an ink composition to the intermediate transfer material imparted with the liquid composition; a third step: a step of transferring an ink image formed on the intermediate transfer material, onto a recording medium; and other steps: other steps are not particularly limited and may be appropriately selected according to the purpose, and examples thereof include a drying/removing step and a heating/fixing step.

EXAMPLES

The present invention will be described in detail based on Examples, but the invention is not limited at all by these Examples. Additionally, in Examples, "parts" means by weight.

The azo pigment of the invention can be synthesized according to the synthesis process to be described in the following Synthesis Example 1 illustrated below.

Measurement of the X-ray diffraction of the pigment composition of the invention is conducted according to Japanese Industrial Standards JISK0131 (General Rule of X-ray diffractiometry) under the following conditions using a powder X-ray diffractometer, RINT 2500 (manufactured by Rigaku Industrial Corp.) and Cu Kα line.

Measuring apparatus used: automatic X-ray diffractometer, RENT 2500 (manufactured by Rigaku Industrial Corp.)
X-ray tube: Cu
Tube voltage: 55 KV
Tube current: 280 mA
Scanning method: 2θ/θ scan
Scanning speed: 6 deg/min
Sampling interval: 0.100 deg.
Starting angle (2θ): 5 deg.
Stopping angle (2θ): 55 deg.
Divergence slit: 2 deg.
Scattering slit: 2 deg.
Receiving slit 0.6 mm
An upright goniometer is used.

Synthesis Example 1

Synthesis of an Azo Pigment Composition (1a)

(1) Synthesis of Intermediate (a)

42.4 g (0.4 mol) of trimethyl orthoformate, 20.4 g (0.2 mol) of glacial acetic acid, and 0.5 g of p-toluenesulfonic acid are added to 29.7 g (0.3 mol) of methyl cyanoacetate, and the resulting mixture is heated to 110° C. (external temperature), followed by stirring for 20 hours with distilling off low-boiling components produced from the reaction system. The resulting reaction solution is concentrated under reduced pressure, and is subjected to purification by silica gel column to obtain 14.1 g (yellow powder; yield: 30%) of the intermediate (a). Results of NMR measurement of the thus-obtained intermediate (a) are as follows. $^1$H-NMR (300 MHz, CDCl$_3$): 7.96 (s, 1H), 4.15 (s, 3H), 3.81 (s, 3H)

(2) Synthesis of Intermediate (b)

150 mL of isopropanol is added to 7.4 mL (141 mmol) of methylhydrazine, followed by cooling to 15° C. (internal temperature). After gradually adding 7.0 g (49.6 mmol) of the intermediate (a) to this mixed solution, the resulting mixture is heated to 50° C. and stirred for 1 hour and 40 minutes. This reaction solution is concentrated under reduced pressure, and is then subjected to purification by silica gel column to obtain 10.5 g (white powder; yield: 50%) of the intermediate (b). Results of NMR measurement of the thus-obtained intermediate (b) are as follows. $^1$H-NMR (300 MHz, CDCl$_3$): 7.60 (s, 1H), 4.95 (brs, 2H), 3.80 (s, 3H), 3.60 (s, 3H)

(3) Synthesis of Intermediate (c)

136 mL of water is added to 1.1 L of methanol, and 182 g (2.17 mol) of sodium hydrogencarbonate is added thereto, followed by stirring at room temperature. To the resulting mixture is added 200 g (1.08 mol) of cyanuric chloride by portions at the same temperature. After completion of the addition, the internal temperature is increased to 30° C. After stirring for 30 minutes at the same temperature, 500 mL of water is added thereto, and a precipitated solid product is collected by filtration, spray washed with 500 mL of water and 300 mL of methanol, and dried to obtain 168 g (white

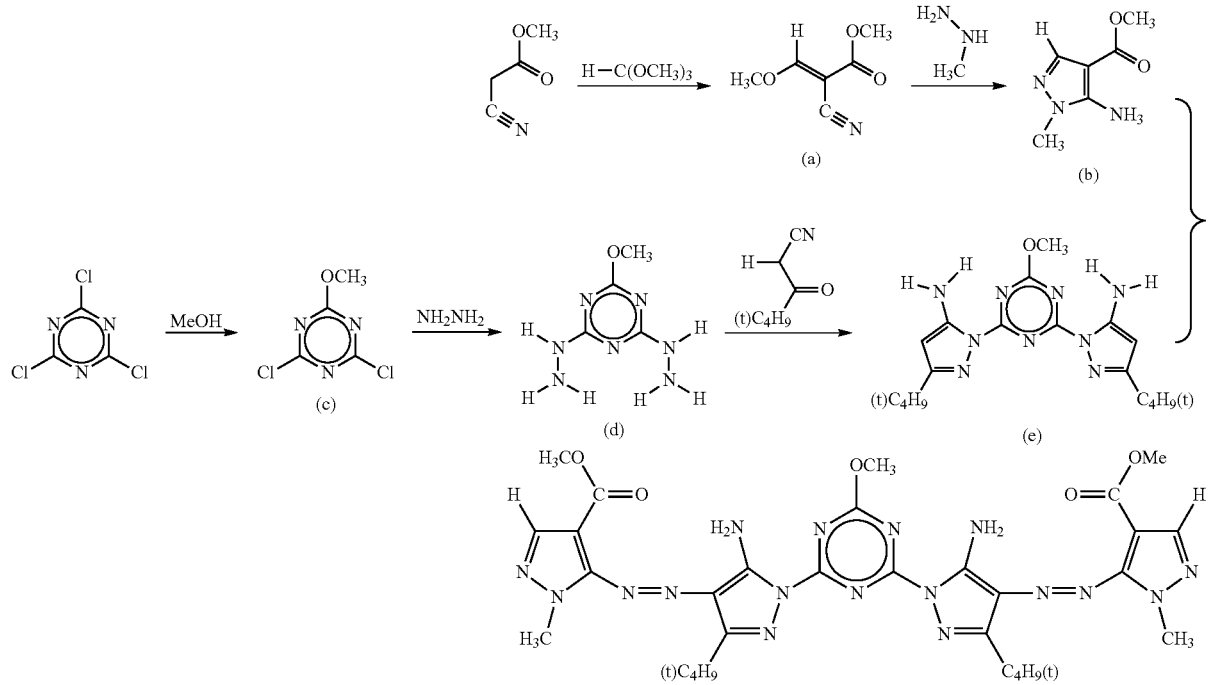

powder; yield: 86.2%) of the intermediate (c). Results of NMR measurement of the thus-obtained intermediate (c) are as follows. $^1$H-NMR (300 MHz, CDCl$_3$): 4.14 (s, 3H)

(4) Synthesis of Intermediate (d)

673 mL of water is added to 363 mL (7.46 mol) of hydrazine monohydrate, and the resulting mixture is cooled to 10° C. (internal temperature) and, after gradually adding to this mixed solution 168 g (934 mmol) of the intermediate (c) (at an internal temperature of 20° C. or lower), the ice bath is removed, and the temperature of the reaction solution is allowed to increase to room temperature, followed by stirring for 30 minutes at the same temperature. Crystals precipitated from the reaction solution are collected by filtration, spray washed with 700 mL of water and 1 L of acetonitrile, and dried to obtain a crudely purified product of the intermediate (d) (white powder).

(5) Synthesis of Intermediate (e)

480 mL of ethylene glycol is added to a crudely purified product of the intermediate (d), and the mixture is stirred at room temperature. To this suspension is added 257 g (2.06 mol) of pivaloylacetonitrile, and the resulting mixture is heated till the internal temperature reaches 80° C. A 12M hydrochloric acid aqueous solution is added thereto to adjust the pH to 3, and the resulting mixture is heated till the internal temperature reaches 80° C., followed by stirring for 3 hours. After completion of the reaction, the reaction solution is cooled with ice to an internal temperature of 8° C., and the precipitated crystals are collected by filtration, spray washed with water, and subjected to purification by silica gel column to obtain 105 g (white powder; yield: 29.2% through two steps). Results of NMR measurement of the thus-obtained intermediate (e) are as follows. $^1$H-NMR (300 MHz, d-DMSO): 7.00 (s, 4H), 5.35 (s, 2H), 4.05 (s, 3H), 5.35 (s, 2H), 1.22 (s, 18H)

(6) Synthesis of Azo Pigment (1a)

A mixed solution of 125 mL of acetic acid and 24 mL of sulfuric acid is cooled with ice to an internal temperature of 3° C. 26.4 g of nitrosylsulfuric acid is added thereto at the same temperature and, subsequently, 11.6 g of the intermediate (b) is added thereto by portions at the same temperature to dissolve. After stirring for 1 hour at the same temperature, 1.2 g of urea is added thereto by portions at the same temperature, followed by stirring for 15 minutes at the same temperature to obtain a diazonium salt solution. Separately, 11.6 g of the intermediate (e) is completely dissolved in 405 mL of methanol, and cooled with ice to an internal temperature of −3° C. The above-described diazonium salt solution is added thereto by portions so that the internal temperature becomes 3° C. or lower and, after completion of the addition, the reaction solution is stirred for 2 hours. The ice bath is removed, and the reaction solution is stirred at room temperature for 10 minutes. Precipitated crystals are collected by filtration, spray washed with 150 mL of methanol, then further spray washed with 100 mL of water. Crystals thus-obtained are suspended in 750 mL of water without drying, and a 8N potassium hydroxide aqueous solution is added thereto to adjust the pH to 5.7. After stirring at room temperature for 20 minutes, resulting crystals are collected by filtration, sufficiently spray washed with water, and then spray washed with 80 mL of methanol. The thus-obtained crystals are dried at room temperature for 12 hours.

The thus-obtained crystals are suspended in a mixed solution of 180 mL of dimethylacetamide and 180 mL of water, and then the internal temperature is raised to an internal temperature of 85° C., followed by stirring at the same temperature for 2 hours. Thereafter, the resulting crystals are collected by hot filtration and suspended in 300 mL of methanol, and the suspension is stirred at room temperature for 30 minutes. The resulting crystals are collected by filtration, and dried at room temperature for 5 hours to obtain 19.5 g of the azo pigment (1a). Yield: 90.3%.

Visual observation of the thus-obtained azo pigment (1a) under a transmission microscope (manufactured by JEOL Ltd.; JEM-10 electron microscope) reveals that the length of the long axis of primary particles is about 150 nm.

When X-ray diffraction of the azo pigment (1a) is measured under the aforesaid conditions, characteristic X-ray peaks are shown at Bragg angles) (2θ±0.2° of 7.2° and 25.9.

Figure 2:
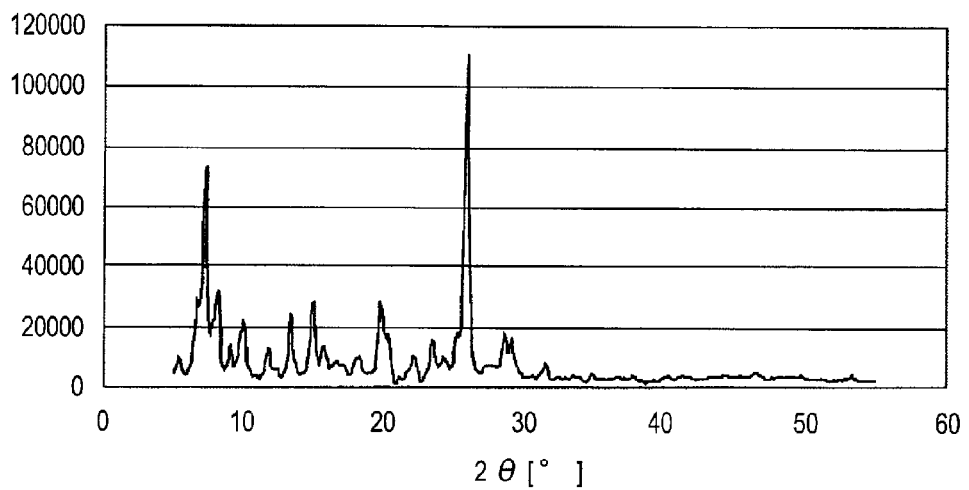
FIG. 2 is a Cu Kα X-ray diffraction pattern of an azo pigment obtained in Synthesis Example 2.

The X-ray diffraction pattern with characteristic Cu Kα line is shown in FIG. 2.

Synthesis Example 2

Synthesis of an Azo Pigment Composition (2a)

Synthesis scheme of azo pigment (2a) is shown below.

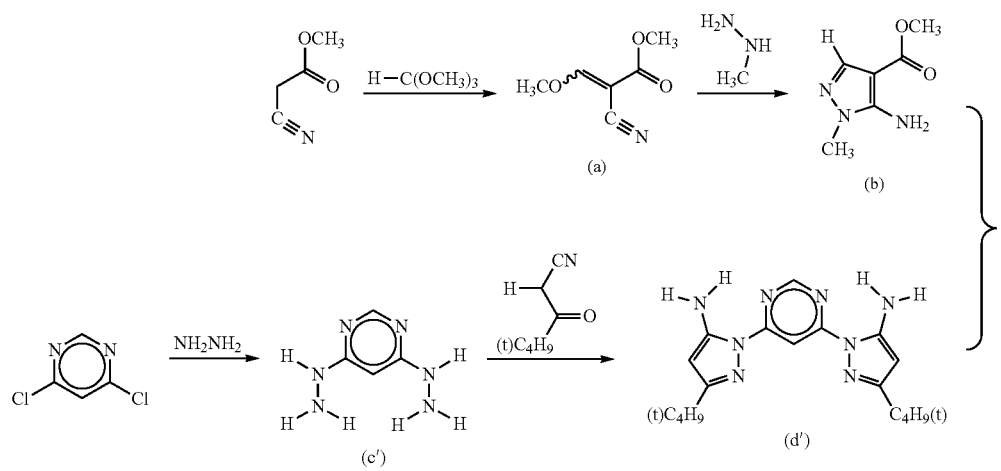

-continued

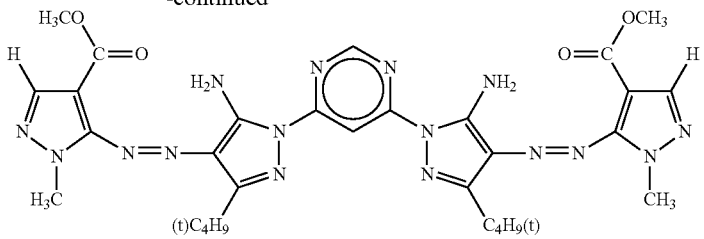

(7) Synthesis of Intermediate (a)

42.4 g (0.4 mol) of trimethyl orthoformate, 20.4 g (0.2 mol) of glacial acetic acid, and 0.5 g of p-toluenesulfonic acid are added to 29.7 g (0.3 mol) of methyl cyanoacetate, and the resulting mixture is heated to 110° C. (external temperature), followed by stirring for 20 hours with distilling off low-boiling components produced from the reaction system. The resulting reaction solution is concentrated under reduced pressure, and is subjected to purification by silica gel column to obtain 14.1 g (yellow powder; yield: 30%) of the intermediate (a). Results of NMR measurement of the thus-obtained intermediate (a) are as follows. $^1$H-NMR (300 MHz, CDCl$_3$): 7.96 (s, 1H), 4.15 (s, 3H), 3.81 (s, 3H)

(8) Synthesis of Intermediate (b)

150 ml of isopropanol is added to 7.4 ml (141 mmol) of methylhydrazine, followed by cooling to 15° C. (internal temperature). After gradually adding 7.0 g (49.6 mmol) of the intermediate (a) to this solution, the resulting mixture is heated to 50° C. and stirred for 1 hour and 40 minutes. This reaction solution is concentrated under reduced pressure, and is then subjected to purification by silica gel column to obtain 10.5 g (white powder; yield: 50%) of the intermediate (b). Results of NMR measurement of the thus-obtained intermediate (b) are as follows. $^1$H-NMR (300 MHz, CDCl$_3$): 7.60 (s, 1H), 4.95 (brs, 2H), 3.80 (s, 3H), 3.60 (s, 3H)

(9) Synthesis of Intermediate (c')

298 mL of methanol is added to 387 mL (7.98 mol) of hydrazine monohydrate, followed by cooling to 10° C. (internal temperature). To the resulting mixture is gradually added 149 g (1.00 mol) of 4,6-dichloropyrimidine (at an internal temperature of 20° C. or lower), and then the ice bath is removed to allow the internal temperature to increase to room temperature, followed by stirring the mixture for 30 minutes at the same temperature. Thereafter, the mixture is further heated to an internal temperature of 60° C., and stirred for 5 hours at the same temperature. After completion of the reaction, 750 mL of water is added thereto, and the reaction solution is cooled with ice to an internal temperature of 8° C. Crystals precipitated are collected by filtration, spray washed with water and with isopropanol, and dried for 36 hours at room temperature to obtain 119 g (white powder; yield: 84.5%) of the intermediate (c'). Results of NMR measurement of the thus-obtained intermediate (c') are as follows. $^1$H-NMR (300 MHz, d-DMSO): 7.80 (s, 1H), 7.52 (s, 2H), 5.98 (s, 1H), 4.13 (s, 4H)

(10) Synthesis of Intermediate (d')

128 mL of water is added to 50 g (357 mmol) of the intermediate (c'), and the mixture is stirred at room temperature. To this suspension is added 98.2 g (785 mmol) of pivaloylacetonitrile and, after dropwise adding thereto a 12M hydrochloric acid aqueous solution to adjust the pH to 3 at the same temperature, the mixture is heated to an internal temperature of 50° C., followed by stirring the mixture for 6 hours at the same temperature. After completion of the reaction, a 8N potassium hydroxide aqueous solution is added thereto to neutralize to a pH of 6.4. The mixture is cooled with ice to an internal temperature of 10° C., and crystals precipitated are collected by filtration, spray washed with water. The thus-obtained crystals are dried at 60° C. under reduced pressure, and 30 mL of toluene is added to the obtained crudely purified product, followed by heating to 60° C. to dissolve. The thus-obtained solution is allowed to stand for 12 hours at room temperature, and crystals precipitated are collected by filtration, spray washed with cooled toluene, and dried at 60° C. under reduced pressure to obtain 87.7 g (white powder; yield: 69.3%) of the intermediate (d'). Results of NMR measurement of the thus-obtained intermediate (d') are as follows. $^1$H-NMR (300 MHz, d-DMSO): 8.74 (s, 1H), 7.99 (s, 1H), 6.87 (s, 4H), 5.35 (s, 2H), 1.24 (s, 18H)

(11) Synthesis of Azo Pigment (2a)

9.2 g of the intermediate (b) is dissolved in a mixed solution of 55 mL of acetic acid and 37 mL of propionic acid at room temperature. The mixture is cooled with ice to an internal temperature of −3° C., and a 40% by weight solution of nitrosylsulfuric acid in sulfuric acid is dropwise added thereto at an internal temperature of from −3° C. to 4° C. in 10 minutes. After stirring for 1 hour at an internal temperature of 4° C., 0.2 g of urea is added thereto, followed by cooling to an internal temperature of −3° C. and further stirring for 10 minutes to obtain a diazonium salt solution. Separately, 10 g of the intermediate (d') is completely dissolved in 150 mL of acetone, and cooled to an internal temperature of 17° C., and then added to the above-described diazonium salt solution in 25 minutes at an internal temperature in the range of from −3° C. to 3° C. After completion of the addition, the reaction solution is stirred for 30 minutes at 3° C., and the ice bath is removed to allow the internal temperature to rise to room temperature. After stirring the reaction solution at room temperature for 30 minutes, precipitated crystals are collected by filtration, spray washed with 150 mL of acetone, then further spray washed with 100 mL of water. Crystals thus-obtained are suspended in 400 mL of water without drying, and an 8N potassium hydroxide aqueous solution is added thereto to adjust the pH to 5.7. After stirring at room temperature for 20 minutes, resulting crystals are collected by filtration, sufficiently spray washed with water, and then spray washed with 80 mL of acetone. The thus-obtained crystals are dried at room temperature for 12 hours.

The thus-obtained crystals are suspended in 580 mL of acetone, and then the mixture is stirred for 30 minutes under reflux. Thereafter, the mixture is cooled to room temperature in 10 minutes, and formed crystals are collected by filtration, and dried at room temperature for 5 hours to obtain 17.1 g of the azo pigment (2a). Yield: 88.5%.

Visual observation of the thus-obtained azo pigment (2a) under a transmission microscope (manufactured by JEOL Ltd.; JEM-1010 electron microscope) reveals that the length of the long axis of primary particles is about 15 μm.

When X-ray diffraction of the azo pigment (2a) is measured under the aforesaid conditions, characteristic X-ray peaks are shown at Bragg angles) (2θ±0.2° of 7.6° and 25.6. The X-ray diffraction pattern with characteristic Cu Kα line is shown in FIG. 1.

Synthesis Examples 3 to 19

Azo pigments of the invention shown in the following Table 1 are synthesized according to the above-described synthesis process of the above-illustrative compounds (Pig.-1) and (Pig.-18) shown in the above-described Synthesis Examples 1 and 2 or by combining the production process of the azo pigments of the present invention.

The X-ray diffraction patterns with characteristic Cu Kα line of the thus-obtained azo pigments are shown in FIGS. 3 to 19.

TABLE 1

Figure 3:
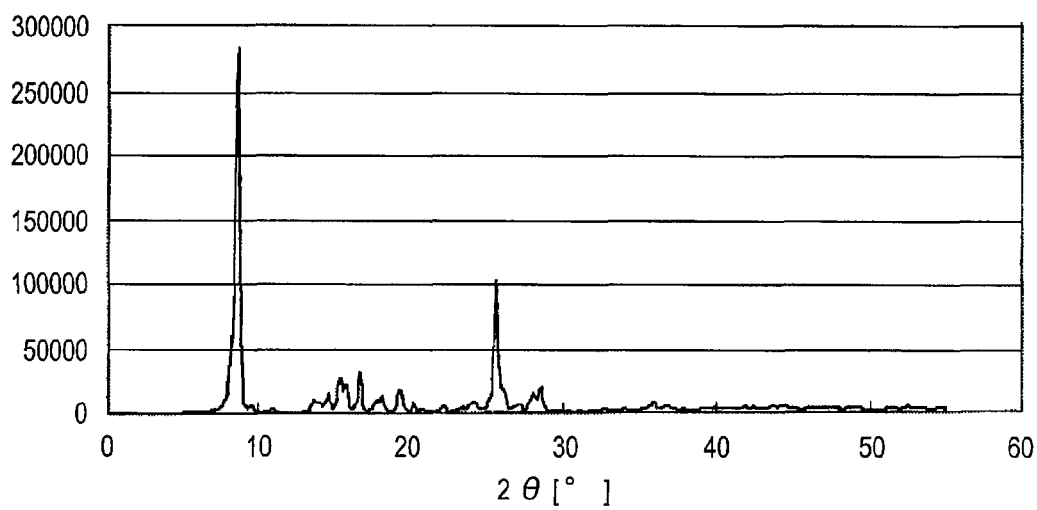
FIG. 3 is a Cu Kα X-ray diffraction pattern of an azo pigment obtained in Synthesis Example 3.
Figure 4:
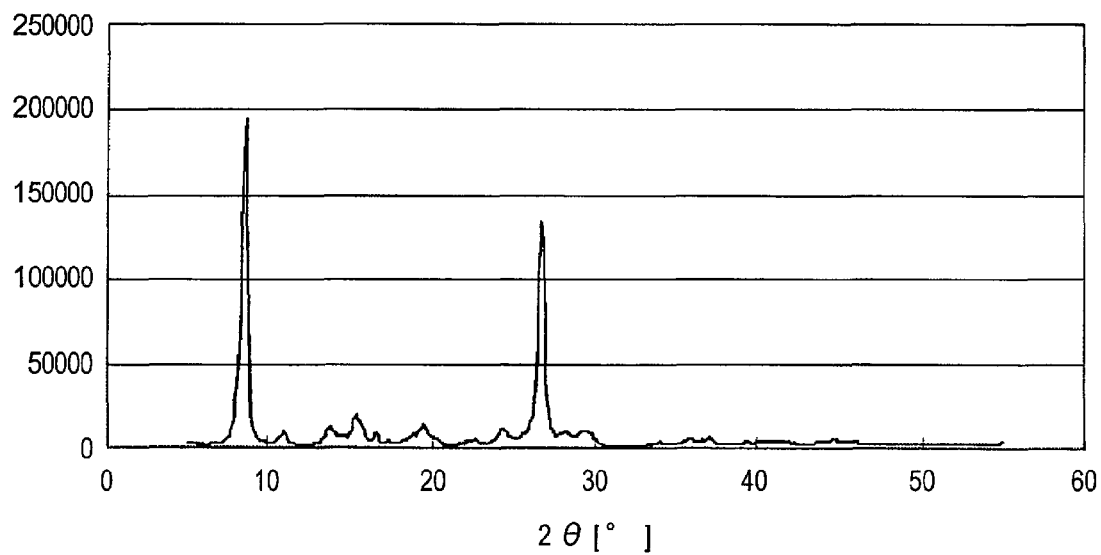
FIG. 4 is a Cu Kα X-ray diffraction pattern of an azo pigment obtained in Synthesis Example 4.
Figure 5:
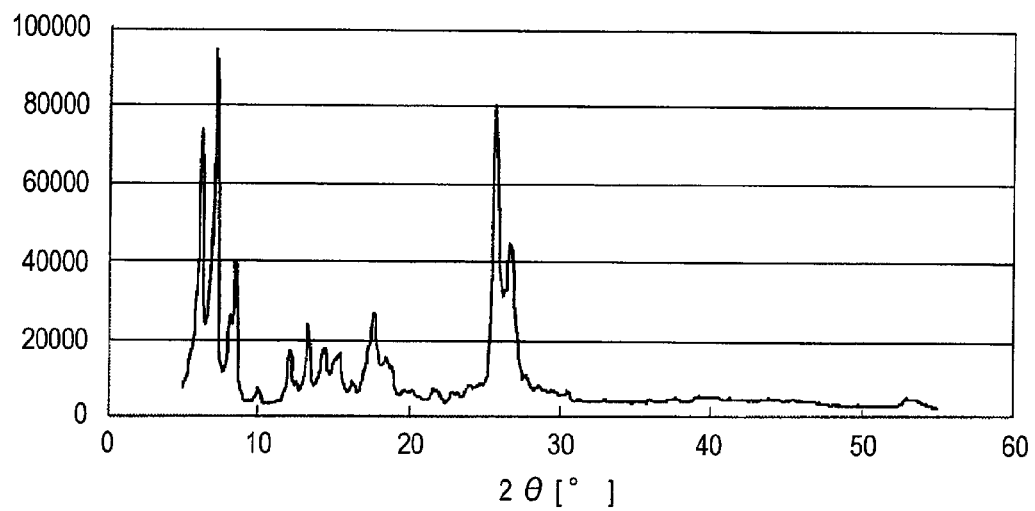
FIG. 5 is a Cu Kα X-ray diffraction pattern of an azo pigment obtained in Synthesis Example 5.
Figure 6:
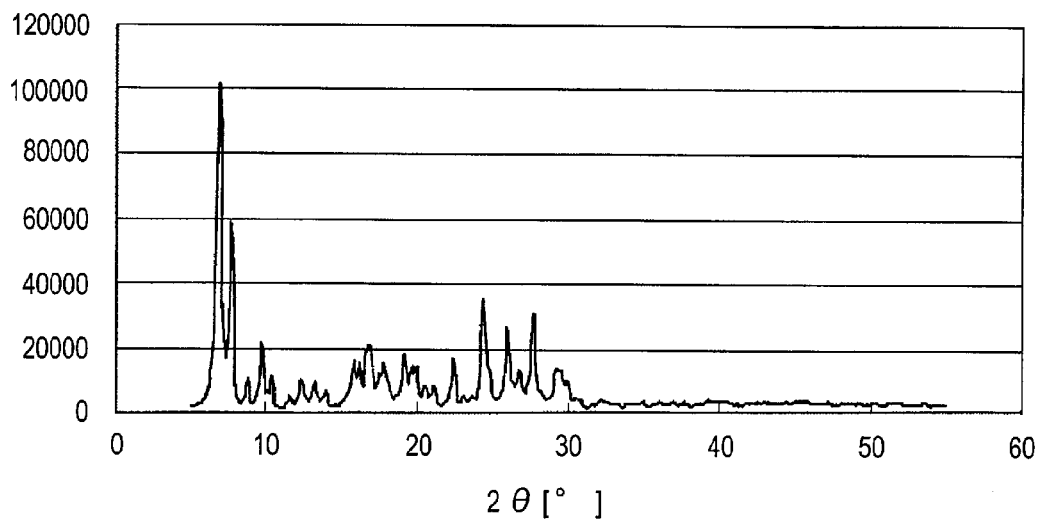
FIG. 6 is a Cu Kα X-ray diffraction pattern of an azo pigment obtained in Synthesis Example 6.
Figure 7:
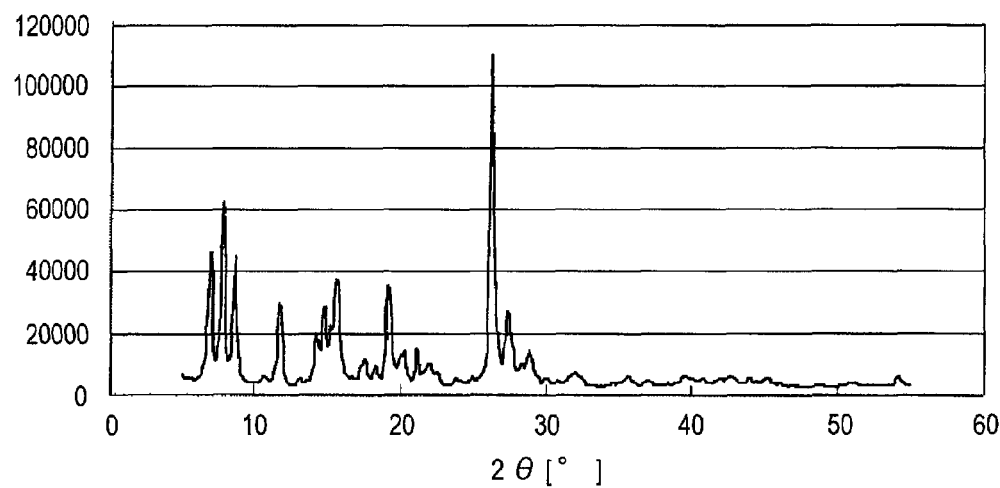
FIG. 7 is a Cu Kα X-ray diffraction pattern of an azo pigment obtained in Synthesis Example 7.
Figure 8:
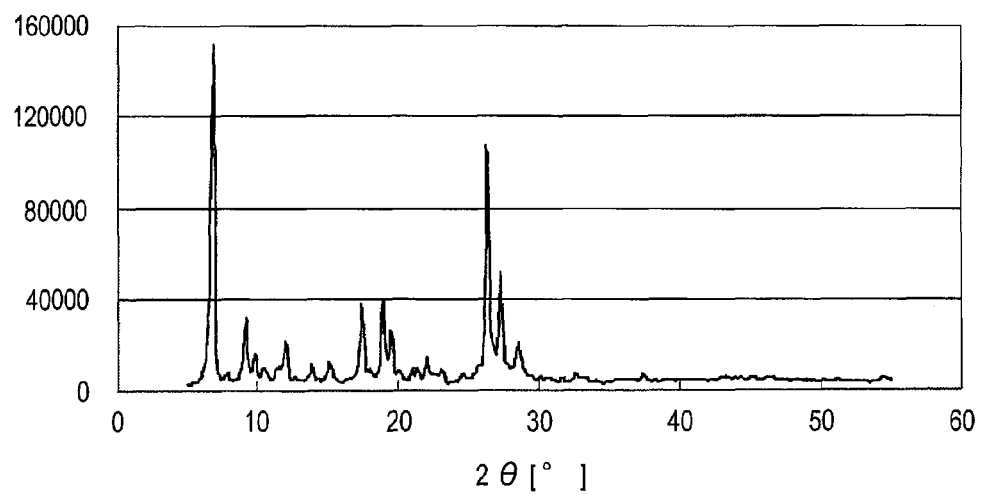
FIG. 8 is a Cu Kα X-ray diffraction pattern of an azo pigment obtained in Synthesis Example 8.
Figure 9:
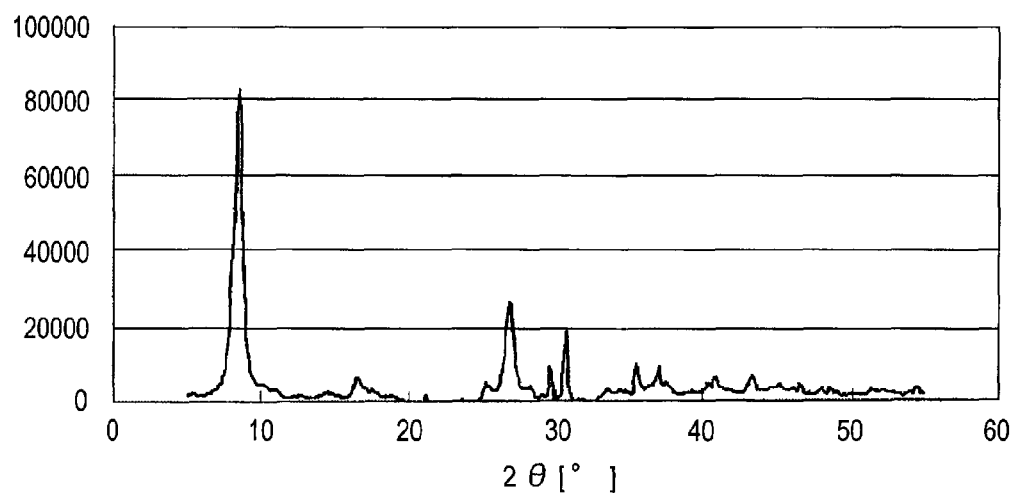
FIG. 9 is a Cu Kα X-ray diffraction pattern of an azo pigment obtained in Synthesis Example 9.
Figure 10:
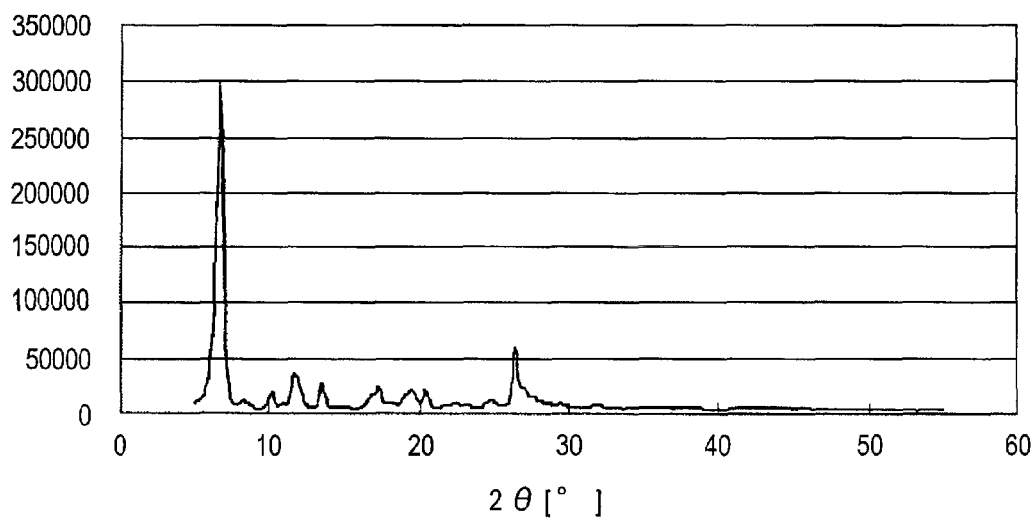
FIG. 10 is a Cu Kα X-ray diffraction pattern of an azo pigment obtained in Synthesis Example 10.
Figure 11:
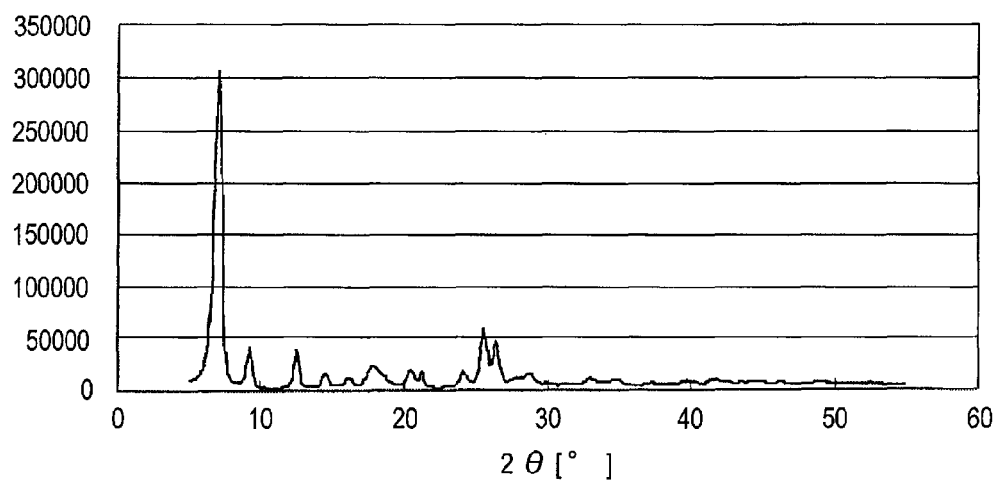
FIG. 11 is a Cu Kα X-ray diffraction pattern of an azo pigment obtained in Synthesis Example 11.
Figure 12:
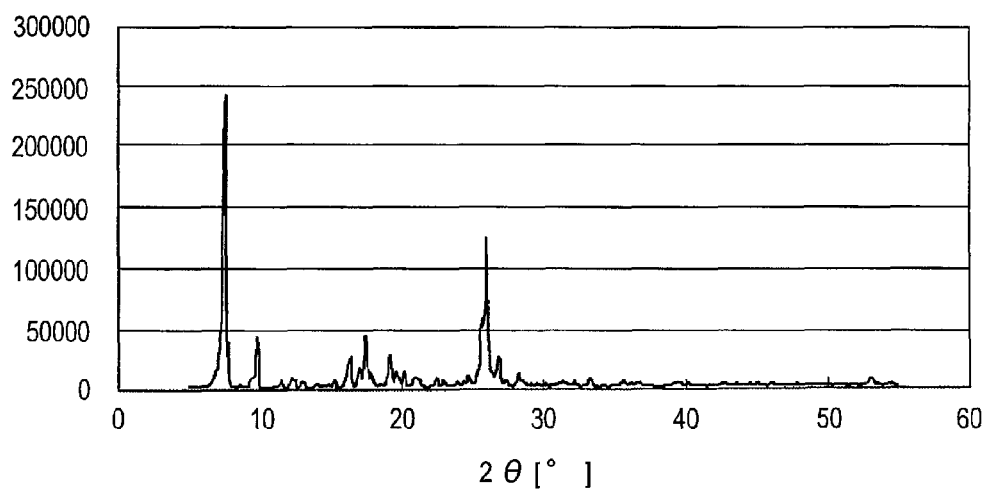
FIG. 12 is a Cu Kα X-ray diffraction pattern of an azo pigment obtained in Synthesis Example 12.
Figure 13:
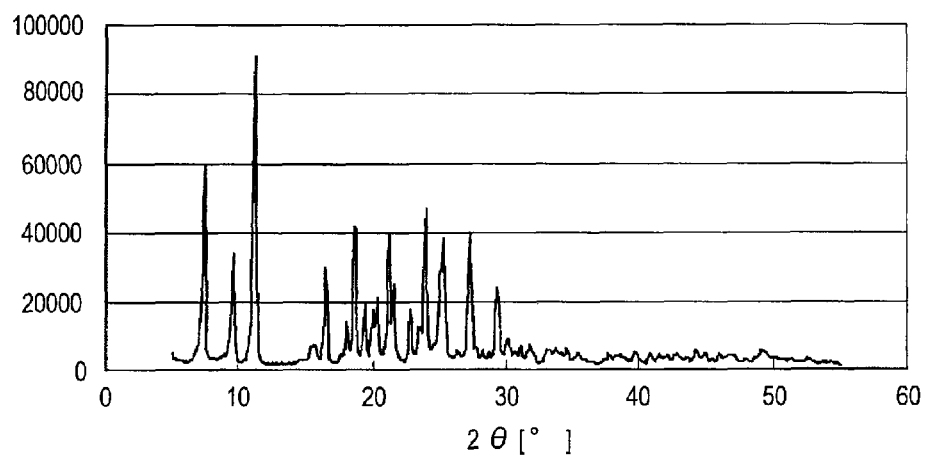
FIG. 13 is a Cu Kα X-ray diffraction pattern of an azo pigment obtained in Synthesis Example 13.
Figure 14:
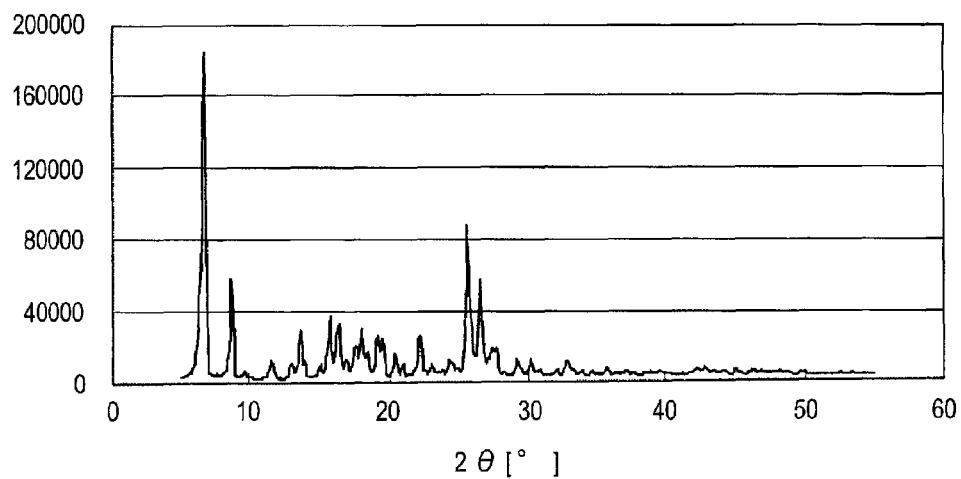
FIG. 14 is a Cu Kα X-ray diffraction pattern of an azo pigment obtained in Synthesis Example 14.
Figure 15:
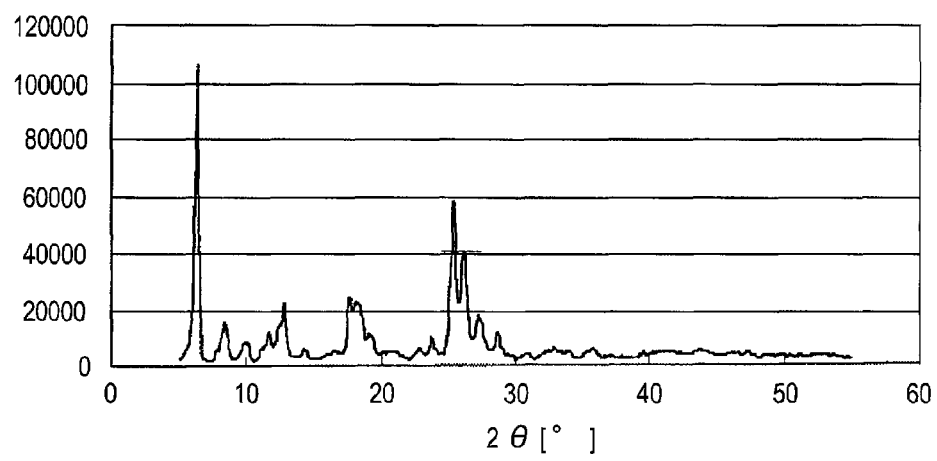
FIG. 15 is a Cu Kα X-ray diffraction pattern of an azo pigment obtained in Synthesis Example 15.
Figure 16:
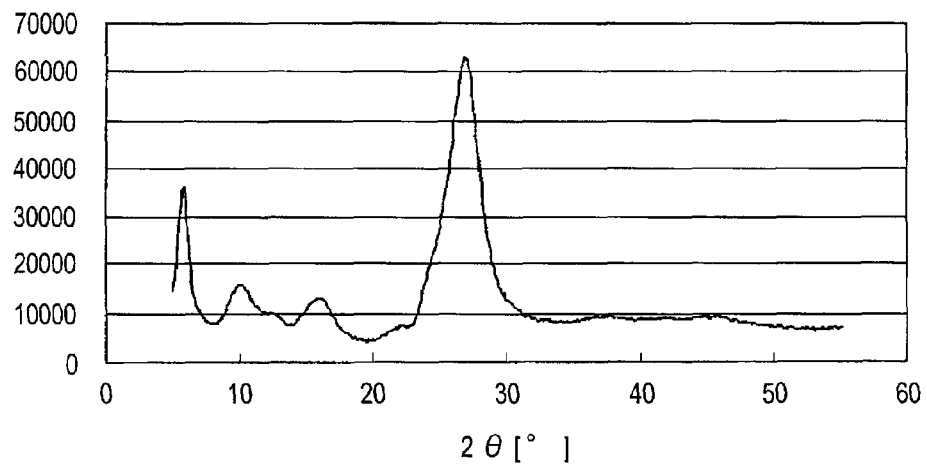
FIG. 16 is a Cu Kα X-ray diffraction pattern of an azo pigment obtained in Synthesis Example 16.
Figure 17:
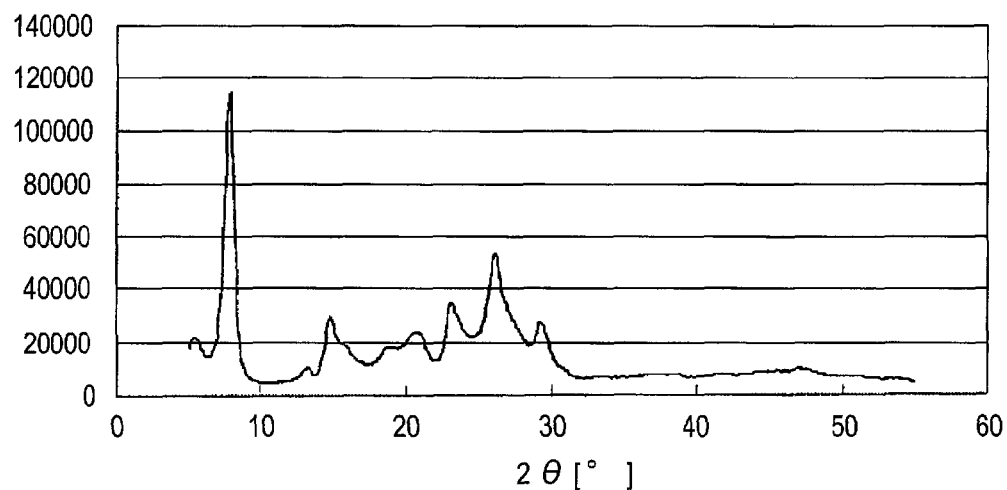
FIG. 17 is a Cu Kα X-ray diffraction pattern of an azo pigment obtained in Synthesis Example 17.
Figure 18:
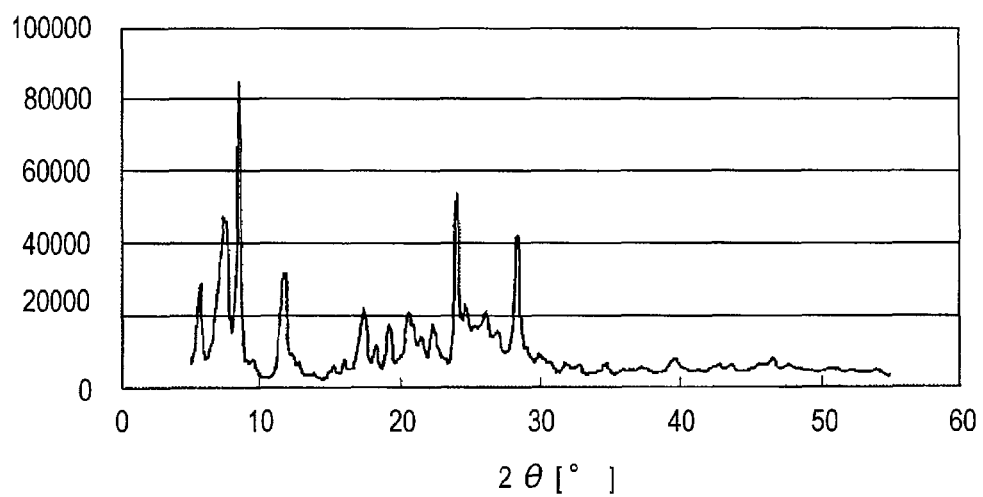
FIG. 18 is a Cu Kα X-ray diffraction pattern of an azo pigment obtained in Synthesis Example 18.
Figure 19:
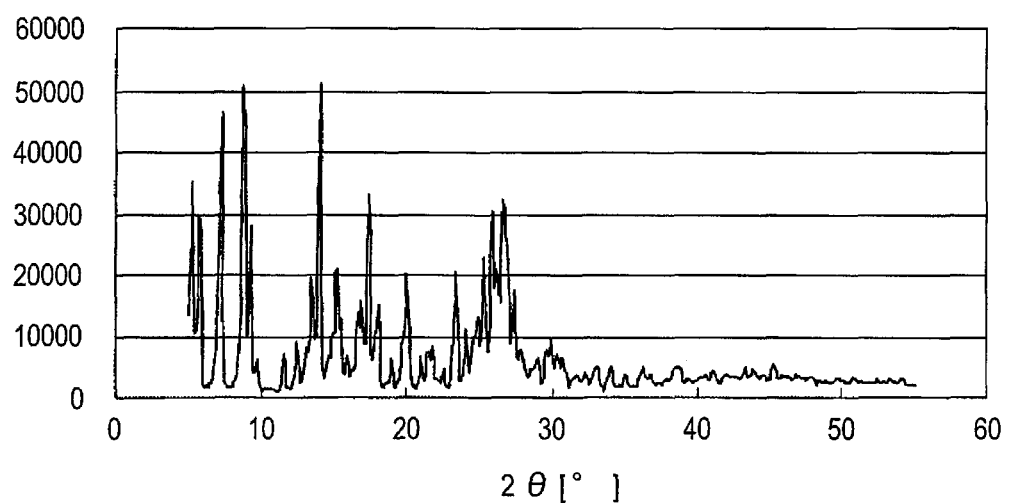
FIG. 19 is a Cu Kα X-ray diffraction pattern of an azo pigment obtained in Synthesis Example 19.
Figure 3:
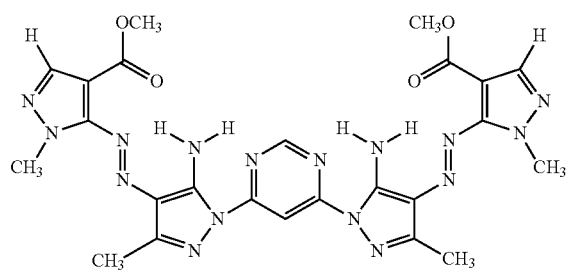
Figure 4:
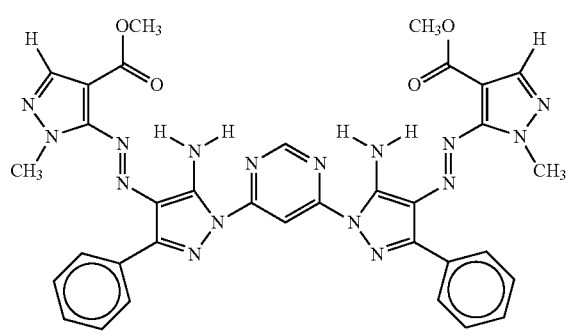
Figure 5:
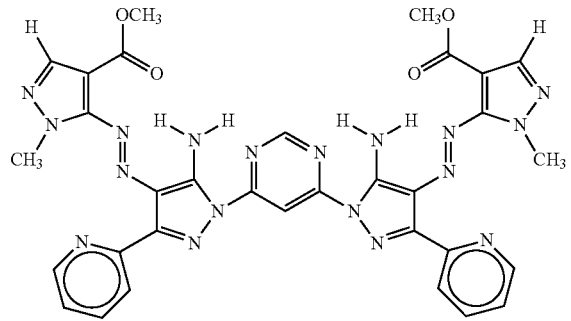
Figure 6:
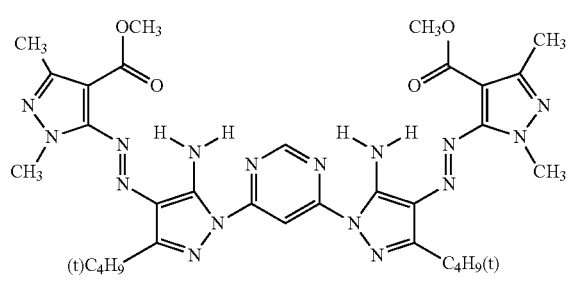
Figure 7:
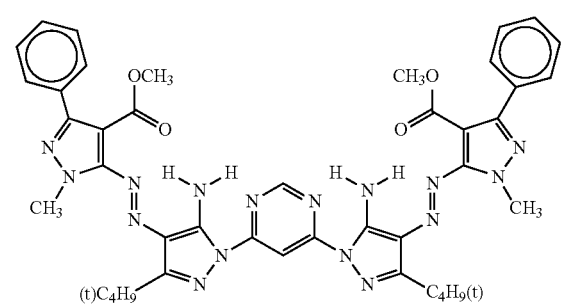
Figure 8:
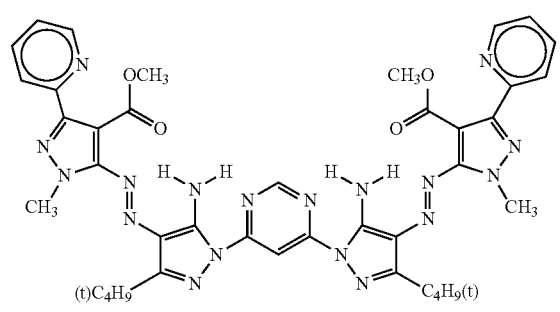
Figure 9:
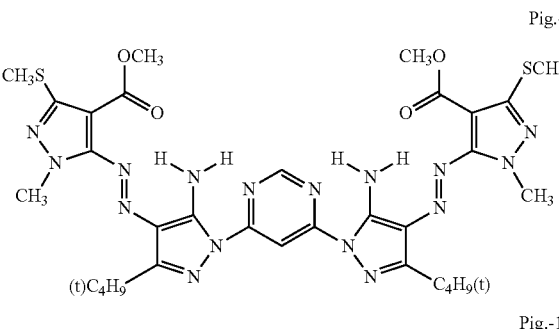
Figure 10:
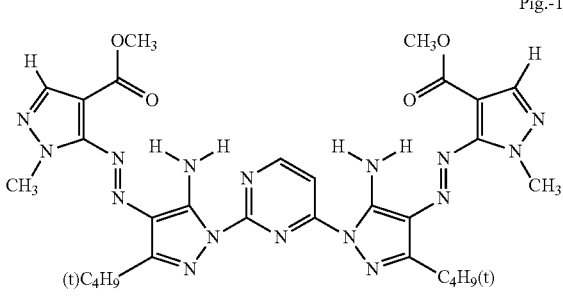
Figure 11:
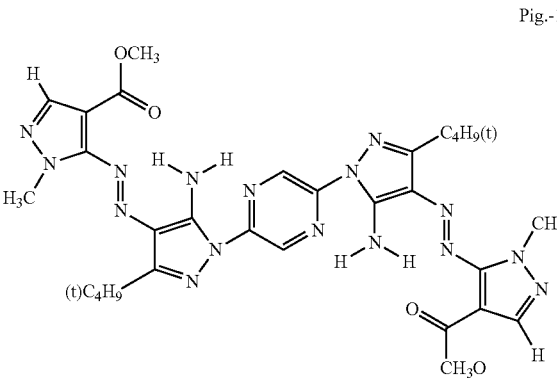
Figure 12:
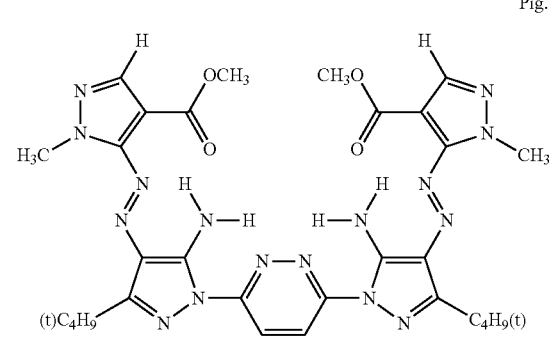
Figure 23:
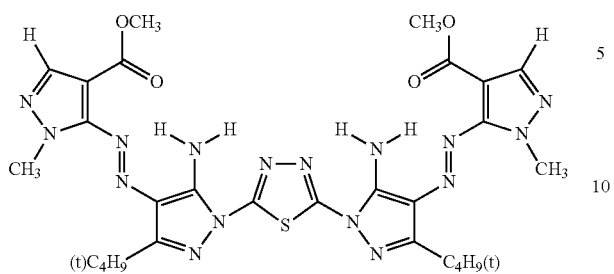
Figure 24:
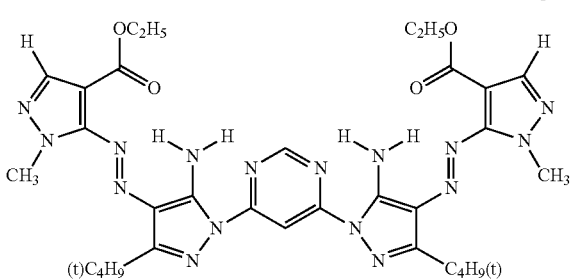
Figure 25:
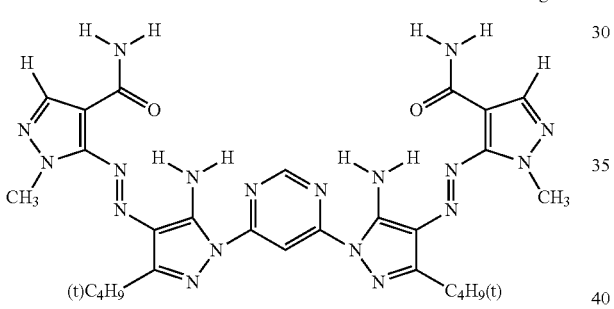
Figure 26:
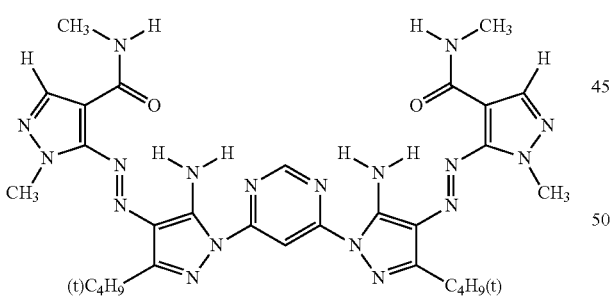
Figure 27:
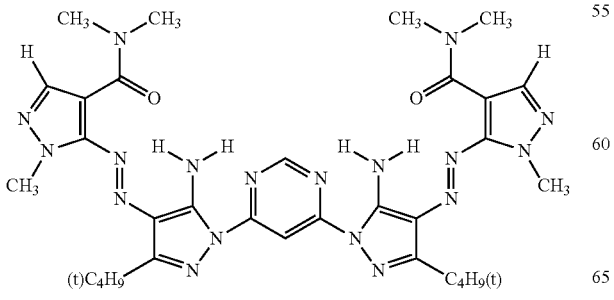
Figure 28:
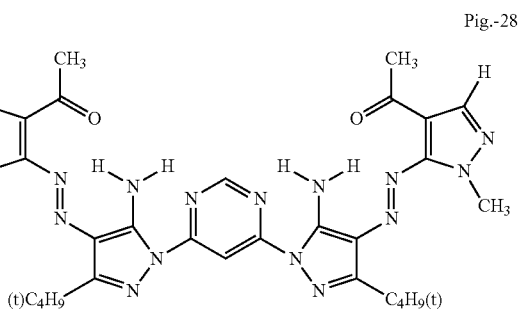
Figure 29:
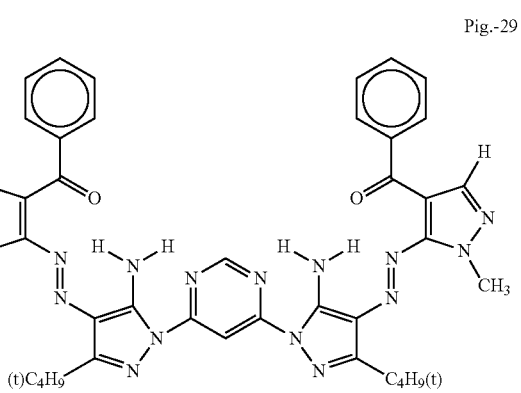
Figure 30:
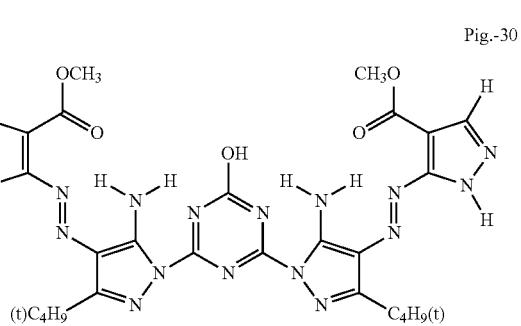
Figure 31:
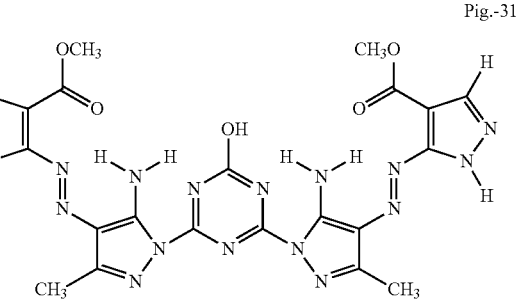
Figure 32:
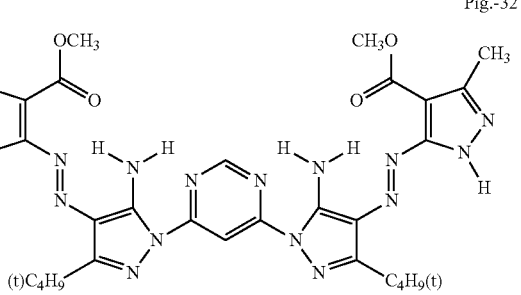

| Azo Pigment of Invention | X-ray Diffraction Pattern with characteristic Cu Kα line |
|---|---|
| Pig.-1 | FIG. 1 |
| Pig.-18 | FIG. 2 |
| Pig.-2 | FIG. 3 |
| Pig.-3 | FIG. 4 |
| Pig.-6 | FIG. 5 |
| Pig.-10 | FIG. 6 |
| Pig.-12 | FIG. 7 |
| Pig.-15 | FIG. 8 |
| Pig.-16 | FIG. 9 |
| Pig.-19 | FIG. 10 |
| Pig.-21 | FIG. 11 |
| Pig.-24 | FIG. 12 |
| Pig.-25 | FIG. 13 |
| Pig.-26 | FIG. 14 |
| Pig.-30 | FIG. 15 |
| Pig.-31 | FIG. 16 |
| Pig.-32 | FIG. 17 |
| Pig.-33 | FIG. 18 |
| Pig.-34 | FIG. 19 |

Synthesis Example 104

Synthesis of Vinyl Polymer (P-1)

Components of the following monomer formulation are mixed so that the total amount becomes 100 parts by weight and, further, 1 part by weight of 2,2'-azobis(2,4-dimethylvaleronitrile) is added thereto as a polymerization initiator, followed by replacement with nitrogen gas to obtain a mixed solution for synthesis.

| Phenoxyethyl methacrylate | 50 parts by weight |
| Methyl methacrylate | 39 parts by weight |
| Methacrylic acid | 11 parts by weight |
| 2-Mercaptoethanol | 0.1 part by weight |

Next, 100 parts by weight of methyl ethyl ketone is heated to 75° C. under stirring in a nitrogen atmosphere. The above-described mixed solution for synthesis is dropwise added thereto over 3 hours at 75° C. under stirring. The reaction is further continued for 5 hours at 75° C. for 5 hours. Thereafter, the reaction mixture is naturally cooled to 25° C., and then diluted with methyl ethyl ketone so that the solid content becomes 40% to obtain a vinyl polymer solution having a weight average molecular weight (Mw) of 41,000 determined by GPC and an acid value of 71.7 mgKOH/g determined according to the method described in JIS Standards (JIS K0070: 1992).

Example 1

Preparation of Aqueous Dispersion (1) of Vinyl Polymer Particles Containing 10% by Weight of the Pigment in the Dispersion)

Components of the following formulation are mixed and dispersed for 3 to 6 hours in a beads mill using 0.1-mmϕ zirconia beads. Subsequently, methyl ethyl ketone is distilled off from the thus-obtained dispersion at 55° C. under reduced pressure, followed by removing part of water to prepare an aqueous dispersion of vinyl polymer particles in which dispersion the content of the illustrative compound (Pig.-1) is 10.0% by weight.

The average particle diameter of the thus-obtained aqueous dispersion (1) of the pigment-containing vinyl polymer particles is measured according to a dynamic light scattering method using a Nanotrac particle size distribution measuring apparatus, UPA-EX 150 (manufactured by Nikkiso Co., Ltd.). The measurement is conducted by adding 10 ml of deionized water to 30 μl of the aqueous dispersion of the pigment-containing vinyl polymer particles to prepare a sample solution for measurement, and using this sample solution after adjusting its temperature to 25° C. Thus, the volume-average particle diameter Mv is found to be 90 nm, and the number-average particle diameter Mn is found to be 40 nm.

As for the obtained aqueous dispersion (1) of pigment-containing vinyl polymer particles, the viscosity is measured under the condition of 25° C. and 100 rpm in rotation number of cone using a viscometer of model R100 (manufactured by Told Sangyo Co., Ltd.), thus the viscosity being found to be 1.9 mPas.

As for the obtained aqueous dispersion (1) of pigment-containing vinyl polymer particles, the pH is measured at 25° C. using a pH meter of WM-50EG manufactured by DKK-TOA CORPORATION, thus the pH being found to be 8.8.

<Formulation of Aqueous Dispersion of Pigment-Containing Vinyl Polymer Particles>

| Illustrative compound (Pig.-1) | 10.0 parts by weight |
| Vinyl polymer (P-1) | 7.5 parts by weight |
| Methyl ethyl ketone | 14.6 parts by weight |
| 1 mol/L NaOH aqueous solution | 3.8 parts by weight |
| Deionized water | 71.2 parts by weight |

(Preparation of Self-Dispersing Polymer Fine Particles)

350.0 g of methyl ethyl ketone is placed in a 2-L three necked flask equipped with a stirrer, a thermometer, a reflux condenser tube, and a nitrogen gas introducing pipe, and the temperature is raised to 75° C. Thereafter, while maintaining the temperature inside the reaction vessel at 75° C., a mixed solution comprising 162.0 g of phenoxyethyl acrylate, 180.0 g of methyl methacrylate, 18.0 g of acrylic acid, 70 g of methyl ethyl ketone, and 1.44 g of V-601 (manufactured by Wako Pure Chemical Industries, Ltd.) is added dropwise thereto at a constant rate so that the dropwise addition is completed in 2 hours. After completion of the dropwise addition, a solution composed of 0.72 g of V-601 and 36.0 g of methyl ethyl ketone is added thereto, and stirred at 75° C. for 2 hours. Further, a solution composed of 0.72 g of V-601 and 36.0 g of isopropanol was added thereto, and stirred at 75° C. for 2 hours. Thereafter, the temperature is raised to 85° C., and the stirring is continued for further 2 hours. The weight-average molecular weight (Mw) of the obtained copolymer is 64,000 (determined by gel permeation chromatography (GPC) and polystyrene conversion; column used: TSKgel SuperHZM-H, TSKgel Super HZ4000, TSKgel Super HZ200 (manufactured by produced by Tosoh Corporation)), and the acid value thereof is 38.9 (mgKOH/g).

Next, 668.3 g of the polymerization solution is weighed, and 388.3 g of isopropanol and 145.7 ml of a 1 mol/L NaOH aqueous solution are added thereto and, the temperature inside the reaction vessel is heated to 80° C. Then, 720.1 g of distilled water is added dropwise thereto at the rate of 20 ml/min to make an aqueous dispersion. After that, the aqueous dispersion is maintained under atmospheric pressure at the temperature inside the reaction vessel of 80° C. for 2 hours, at 85° C. for 2 hours, and at 90° C. for 2 hours, and then the pressure of the reaction vessel is reduced, and 913.7 g of isopropanol, methyl ethyl ketone, and distilled water in terms of a total amount is removed by distillation, thereby obtaining an aqueous dispersion (emulsion) of a self-dispersing polymer fine particles (B-01) having a solid content of 28.0% by weight.

(Preparation of Aqueous Ink Composition (1) for Inkjet Recording

Next, aqueous ink composition (1) is prepared according to the following formulation using the thus-obtained aqueous dispersion (1) of pigment-containing vinyl polymer particles. PH of the aqueous ink composition (1) is measured at 25° C. using a pH meter of WM-50EG manufactured by DKK-TOA CORPORATION to find that the pH is 9.1.

<Formulation of Aqueous Ink Composition (1)>

| | |
|---|---|
| Aqueous dispersion (1) of pigment-containing vinyl polymer particles | 43 parts by weight |
| 1,2-Hexanediol | 2 parts by weight |
| Glycerin | 8 parts by weight |
| Triethylene glycol monobutyl ether | 2 parts by weight |
| 2-Pyrrolidone | 2 parts by weight |
| Propylene glycol | 1 part by weight |
| Trimethylolpropane | 3 parts by weight |
| SURFYNOL 465 (manufactured by Nissin Chemical Industry Co., Ltd.) | 3 parts by weight |
| Deionized water | 36 parts by weight |

Example 2

An aqueous dispersion (2) of pigment-containing vinyl polymer particles is obtained in the same procedures as in Example 1 except for using the illustrative compound (Pig.-2) in place of the illustrative compound (Pig.-1) of the invention used in Example 1.

As for physical properties measured on the thus-obtained aqueous dispersion (2) of pigment-containing vinyl polymer particles, volume-average particle diameter Mv is 87 nm, number-average particle diameter Mn is 37 nm, viscosity is 1.6 mPas, and pH is 9.0.

Subsequently, the same procedures as in Example 1 except for using the aqueous dispersion (2) of pigment-containing vinyl polymer particles in place of the aqueous dispersion (1) of pigment-containing vinyl polymer particles of the invention used in Example 1 are carried out to prepare an aqueous ink composition (2) of the invention.

pH of the aqueous ink composition (2) is measured at 25° C. using a pH meter of WM-50EG manufactured by DKK-TOA CORPORATION to find that the pH is 9.2.

Example 3

An aqueous dispersion (3) of pigment-containing vinyl polymer particles is obtained in the same procedures as in Example 1 except for using the illustrative compound (Pig.-3) in place of the illustrative compound (Pig.-1) of the invention used in Example 1.

As for physical properties measured on the thus-obtained aqueous dispersion (3) of pigment-containing vinyl polymer particles, volume-average particle diameter Mv is 86 nm, number-average particle diameter Mn is 39 nm, viscosity is 1.5 mPas, and pH is 9.1.

Subsequently, the same procedures as in Example 1 except for using the aqueous dispersion (3) of pigment-containing vinyl polymer particles in place of the aqueous dispersion (1) of pigment-containing vinyl polymer particles of the invention used in Example 1 are carried out to prepare an aqueous ink composition (3) of the invention.

pH of the aqueous ink composition (3) is measured at 25° C. using a pH meter of WM-50EG manufactured by DKK-TOA CORPORATION to find that the pH is 9.3.

Example 4

An aqueous dispersion (4) of pigment-containing vinyl polymer particles is obtained in the same procedures as in Example 1 except for using the illustrative compound (Pig.-18) in place of the illustrative compound (Pig.-1) of the invention used in Example 1.

As for physical properties measured on the thus-obtained aqueous dispersion (4) of pigment-containing vinyl polymer particles, volume-average particle diameter Mv is 90 nm, number-average particle diameter Mn is 46 nm, viscosity is 2.0 mPas, and pH is 9.2.

Subsequently, the same procedures as in Example 1 except for using the aqueous dispersion (4) of pigment-containing vinyl polymer particles in place of the aqueous dispersion (1) of pigment-containing vinyl polymer particles of the invention used in Example 1 are carried out to prepare an aqueous ink composition (4) of the invention.

pH of the aqueous ink composition (4) is measured at 25° C. using a pH meter of WM-50EG manufactured by DKK-TOA CORPORATION to find that the pH is 9.3.

Example 5

An aqueous dispersion (5) of pigment-containing vinyl polymer particles is obtained in the same procedures as in Example 1 except for using the illustrative compound (Pig.-25) in place of the illustrative compound (Pig.-1) of the invention used in Example 1.

As for physical properties measured on the thus-obtained aqueous dispersion (5) of pigment-containing vinyl polymer particles, volume-average particle diameter Mv is 83 nm, number-average particle diameter Mn is 34 nm, viscosity is 1.2 mPas, and pH is 8.6.

Subsequently, the same procedures as in Example 1 except for using the aqueous dispersion (5) of pigment-containing vinyl polymer particles in place of the aqueous dispersion (1) of pigment-containing vinyl polymer particles of the invention used in Example 1 are carried out to prepare an aqueous ink composition (5) of the invention.

pH of the aqueous ink composition (5) is measured at 25° C. using a pH meter of WM-50EG manufactured by DKK-TOA CORPORATION to find that the pH is 8.9.

Example 6

An aqueous dispersion (6) of pigment-containing vinyl polymer particles is obtained in the same procedures as in Example 1 except for changing the formulation of the aqueous dispersion of pigment-containing polymer particles from the formulation of the aqueous dispersion (1) of pigment-containing polymer particles in Example 1 to that shown below.

As for physical properties measured on the thus-obtained aqueous dispersion (6) of pigment-containing vinyl polymer particles, volume-average particle diameter Mv is 95 nm, number-average particle diameter Mn is 49 nm, viscosity is 2.3 mPas, and pH is 9.4.

<Formulation of Aqueous Dispersion (6) of Pigment-Containing Vinyl Polymer Particles>

| | |
|---|---|
| Illustrative compound (Pig.-1) | 10.0 parts by weight |
| Vinyl polymer (P-1) | 12.5 parts by weight |
| Methyl ethyl ketone | 9.7 parts by weight |
| 1 mol/L NaOH aqueous solution | 6.4 parts by weight |
| Deionized water | 68.6 parts by weight |

Subsequently, the same procedures as in Example 1 except for using the aqueous dispersion (6) of pigment-containing vinyl polymer particles in place of the aqueous dispersion (1) of pigment-containing vinyl polymer particles of the invention used in Example 1 are carried out to prepare an aqueous ink composition (6) of the invention.

pH of the aqueous ink composition (6) is measured at 25° C. using a pH meter of WM-50EG manufactured by DKK-TOA CORPORATION to find that the pH is 9.4.

Example 7

An aqueous dispersion (7) for inkjet recording is obtained in the same procedures as in Example 6 except for changing the formulation of the aqueous dispersion of pigment-containing polymer particles from the formulation of the aqueous dispersion (6) of Example 6 for inkjet recording to that shown below. pH of the aqueous ink composition (7) is measured at 25° C. using a pH meter of WM-50EG manufactured by DKK-TOA CORPORATION to find that the pH is 9.3.

<Formulation of Aqueous Ink Composition (7)>

| | |
|---|---|
| Aqueous dispersion of pigment-containing vinyl polymer particles (6) | 43 parts by weight |
| 1,2-Hexanediol | 2 parts by weight |
| Glycerin | 8 parts by weight |
| Triethylene glycol monobutyl ether | 2 parts by weight |
| 2-Pyrrolidone | 2 parts by weight |
| Propylene glycol | 1 part by weight |
| Trimethylolpropane | 3 parts by weight |
| SURFYNOL 465 (manufactured by Nissin Chemical Industry Co., Ltd.) | 3 parts by weight |
| Aqueous dispersion of self-dispersing polymer fine particles (B-01) | 7 parts by weight |
| Deionized water | 29 parts by weight |

Example 8

An aqueous dispersion (8) for inkjet recording is obtained in the same procedures as in Example 6 except for changing the formulation of the aqueous dispersion of pigment-containing polymer particles from the formulation of the aqueous dispersion (6) of Example 6 for inkjet recording to that shown below. pH of the aqueous ink composition (8) is measured at 25° C. using a pH meter of WM-50EG manufactured by DKK-TOA CORPORATION to find that the pH is 9.4.

<Formulation of Aqueous Ink Composition (8)>

| | |
|---|---|
| Aqueous dispersion of pigment-containing vinyl polymer particles (6) | 43 parts by weight |
| 1,2-Hexanediol | 2 parts by weight |
| Glycerin | 8 parts by weight |
| Triethylene glycol monobutyl ether | 2 parts by weight |
| 2-Pyrrolidone | 2 parts by weight |
| Propylene glycol | 1 part by weight |
| Trimethylolpropane | 3 parts by weight |
| SURFYNOL 465 (manufactured by Nissin Chemical Industry Co., Ltd.) | 3 parts by weight |
| Aqueous dispersion of self-dispersing polymer fine particles (B-01) | 11 parts by weight |
| Deionized water | 25 parts by weight |

Example 9

An aqueous dispersion (7) of pigment-containing vinyl polymer particles is obtained in the same procedures as in Example 6 except for using the illustrative compound (Pig.-18) in place of the illustrative compound (Pig.-1) of the invention used in Example 6.

As for physical properties measured on the thus-obtained aqueous dispersion (7) of pigment-containing vinyl polymer particles, volume-average particle diameter Mv is 99 nm, number-average particle diameter Mn is 53 nm, viscosity is 2.8 mPas, and pH is 9.2.

Subsequently, the same procedures as in Example 5 are conducted to prepare an aqueous ink composition (9) of the invention. PH of the aqueous ink composition (9) is measured at 25° C. using a pH meter of WM-50EG manufactured by DKK-TOA CORPORATION to find that the pH is 9.4.

Example 10

An aqueous dispersion (7) of pigment-containing vinyl polymer particles is obtained in the same manner as in Example 1 except for changing the beads mill dispersing method to other dispersing method.

Components of the formulation in Example 1 are mixed, and preliminarily dispersed for 5 minutes in CLEARMIX (manufactured by M TECHNIQUE; CLM?0.8S; 10,000 rpm), and subjected to dispersion treatment using a high-pressure homogenizer (Starburst; manufactured by Sugino Machine Limited) under the conditions of 100 MPa in pressure and 12 passes in pass number.

As for physical properties measured in the same manner as in Example 1 on the thus-obtained aqueous dispersion (7) of pigment-containing vinyl polymer particles, volume-average particle diameter Mv is 87 nm, number-average particle diameter Mn is 36 nm, viscosity is 1.7 mPas, and pH is 8.6.

Subsequently, the same procedures as in Example 1 are conducted to prepare an aqueous ink composition (10) of the invention except for using the aqueous dispersion (7) of pigment-containing vinyl polymer particles in place of the aqueous dispersion (1) of pigment-containing vinyl polymer particles of the invention used in Example 1.

pH of the aqueous ink composition (4) is measured at 25° C. using a pH meter of WM-50EG manufactured by DKK-TOA CORPORATION to find that the pH is 8.8.

Comparative Example

Experiments 1051 to 1054

An ink composition of Comparative Example is obtained in the same manner as in example 8 except for changing, in the formulation of the aqueous ink composition (8) for inkjet recording, the pigment in the aqueous dispersion of pigment-containing vinyl polymer particles and the vinyl polymer to the pigments described in Table 3 (C.I. Pigment Yellow 155, C.I. Pigment Yellow 128, C.I. Pigment Yellow 185, and C.I. Pigment Yellow 150) and the vinyl polymer synthesized in the same manner as in Synthesis Example 4, respectively.

(Stability of Aqueous Dispersion of Pigment-Containing Vinyl Polymer Particles)

Each of the thus-obtained aqueous dispersion of pigment-containing vinyl polymer particles is placed in a PET-made vessel, stoppered tightly, and stored for 7 days in a 60° C. thermostat chamber, followed by measuring viscosity and average particle diameter after storage. Also, viscosity and average particle diameter of the aqueous dispersion of pigment-containing vinyl polymer particles before storage are measured in the same manner. The viscosity is measured under the condition of 25° C. and 20 to 100 rpm in rotation number of cone using a viscometer of model R100 (manufactured by Told Sangyo Co., Ltd.). As for average particle diameter, the volume-average particle size My is measured according to a dynamic light scattering method using a Nanotrac particle size distribution measuring apparatus, UPA-EX 150 (manufactured by Nikkiso Co., Ltd.). Stability of the aqueous dispersions of the pigment-containing vinyl polymer particles is evaluated according to the following evaluation criteria based on the measured values. Results of the evaluation are shown in the following Table 2.

<Evaluation Criteria>

A: Both viscosity and average particle diameter are less than ±10% of the values before storage.

B: Either viscosity or average particle diameter is ±10% or more of the values before storage.

C: Both viscosity and average particle diameter are ±10% or more of the values before storage.

(Stability of Ink Composition)

Measurement on the obtained ink compositions is conducted in the same manner as with the above-described aqueous dispersion of pigment-containing vinyl polymer particles, and stability thereof is evaluated according to the following evaluation criteria based on the measured values. Results of the evaluation are shown in the following Table 2.

<Evaluation Criteria>

A: Both viscosity and average particle diameter are less than ±10% of the values before storage.

B: Either viscosity or average particle diameter is ±10% or more of the values before storage.

C: Both viscosity and average particle diameter are ±10% or more of the values before storage.

TABLE 2

| | | Formulation of High-Molecular Polyvinyl Polymer (% by weight) | | | |
|---|---|---|---|---|---|
| Experimental No. | Pigment | Hydrophobic Structural Unit | Methacrylic Acid | Methyl Methacrylate | Weight-average Molecular Weight |
| Example 1 | Illustrative compound (Pig. 1) | Phenoxyethyl methacrylate = 50 | 11 | 39 | 41000 |
| Example 2 | Illustrative compound (Pig. 2) | Phenoxyethyl methacrylate = 50 | 11 | 39 | 41000 |
| Example 3 | Illustrative compound (Pig. 3) | Phenoxyethyl methacrylate = 50 | 11 | 39 | 41000 |
| Example 4 | Illustrative compound (Pig. 18) | Phenoxyethyl methacrylate = 50 | 11 | 39 | 41000 |
| Example 5 | Illustrative compound (Pig. 25) | Phenoxyethyl methacrylate = 50 | 11 | 39 | 41000 |
| Example 6 | Illustrative compound (Pig. 1) | Phenoxyethyl methacrylate = 50 | 11 | 39 | 41000 |
| Example 7 | Illustrative compound (Pig. 1) | Phenoxyethyl methacrylate = 50 | 11 | 39 | 41000 |
| Example 8 | Illustrative compound (Pig. 1) | Phenoxyethyl methacrylate = 50 | 11 | 39 | 41000 |
| Example 9 | Illustrative compound (Pig. 18) | Phenoxyethyl methacrylate = 50 | 11 | 39 | 41000 |
| Example 10 | Illustrative compound (Pig. 1) | Phenoxyethyl methacrylate = 50 | 11 | 39 | 41000 |
| Experiment 1051 | C.I. Pigment Yellow 155 | Phenoxyethyl methacrylate = 55 | 10 | 35 | 40000 |
| Experiment 1052 | C.I. Pigment Yellow 128 | Phenoxyethyl methacrylate = 55 | 10 | 35 | 40000 |
| Experiment 1053 | C.I. Pigment Yellow 185 | Phenoxyethyl methacrylate = 55 | 10 | 35 | 40000 |
| Experiment 1054 | C.I. Pigment Yellow 150 | Phenoxyethyl methacrylate = 55 | 10 | 35 | 40000 |

TABLE 2-continued

| Experimental No. | Addition Amount of Dispersant Polymer Based on Pigment | Addition Amount of Self-dispersing Polymer Fine Particles in Ink | Addition Amount of Pigment in Ink | Stability of Aqueous Dispersion of Pigment-containing Vinyl Polymer Particles | Stability of Ink Composition | Note |
|---|---|---|---|---|---|---|
| Example 1 | 30% | — | 4.3% | A | A | Present invention |
| Example 2 | 30% | — | 4.3% | A | A | Present invention |
| Example 3 | 30% | — | 4.3% | A | A | Present invention |
| Example 4 | 30% | — | 4.3% | A | A | Present invention |
| Example 5 | 30% | — | 4.3% | A | A | Present invention |
| Example 6 | 50% | — | 4.3% | A | A | Present invention |
| Example 7 | 50% | 2.0% | 4.3% | A | A | Present invention |
| Example 8 | 50% | 3.1% | 4.3% | A | A | Present invention |
| Example 9 | 50% | — | 4.3% | A | A | Present invention |
| Example 10 | 30% | — | 4.3% | A | A | Present invention |
| Experiment 1051 | 50% | 3.1% | 4.3% | B | B | Comparative Example |
| Experiment 1052 | 50% | 3.1% | 4.3% | B | B | Comparative Example |
| Experiment 1053 | 50% | 3.1% | 4.3% | C | C | Comparative Example |
| Experiment 1054 | 50% | 3.1% | 4.3% | C | C | Comparative Example |

Example 11

Experiments 1001 to 1054

Corresponding ink compositions of the invention are obtained by conducting the same procedures as in Example 1 using the vinyl polymers of the invention synthesized in the same manner as in the above-described Synthesis Example 104 and employing the formulations described in Tables 3 and 4.

Regarding Experiments 1001 to 1050 using the aqueous inks of the invention for inkjet recording prepared by the above-described method and Experiments 1051 to 1054 using the above-described aqueous inks of Comparative Examples, formulations of these inks and evaluation results on them are shown in Tables 3 and 4.

(Evaluation of Ejection Accuracy)

The pigment ink compositions shown in Tables 3 and 4 are put in a PET-made vessel and, after airtight closing, left for aging in an environment of 65° C. for 3 weeks. Using DMP-2831 Printer manufactured by Fujifilm Dimatix Inc. as the inkjet recording apparatus, 10-cm lines are printed with an ink droplet amount of 2 pL at an ejection frequency of 20 kHz in nozzle array direction×delivery direction of 16×1200 dot/25.4 mm. As the recording medium, "Gasai" Photofinishing Pro produced by Fujifilm Corp. is used. The distance between lines at a position 5 cm apart from the hitting initiation part on the printed sample is measured by Dot Analyzer DA-6000 manufactured by Oji Scientific Instruments, and the standard deviation thereof is calculated and used for the evaluation of the accuracy in ejection direction.

A: The standard deviation is less than 3 μm.
B: The standard deviation is from 3 μm to less than 4 μm.
C: The standard deviation is from 4 μm to less than 5 μm.
D: The standard deviation is 5 μm or more.

(Printing Density)

A yellow mono-color image having a stepwise density is printed using the pigment ink composition shown in Tables 3 and 4 and using, as an inkjet recording apparatus, PX-V630 manufactured by Seiko Epson Corporation. As a recording medium, "Gasai" Photofinishing Pro produced by Fujifilm Corp. is used. The density is measured by means of a reflection densitometer (GRETAG MACBETH Spectrolino) to evaluate OD (Optical Density) in the gradation area and in the solid image area with Experiment 1019 being the standard. Results are shown in Tables 3 and 4.

A: In comparison with Experiment 1019, the density in the solid image area is at a higher level, and the density in the gradation area is at the same level.
B: In comparison with Experiment 1019, the density in the solid image area and the density in the gradation area are at the same level.
C: In comparison with Experiment 1019, the density in the solid image area is at a lower level, and the density in the gradation area is at the same level.
D: In comparison with Experiment 1019, the density in the solid image area and the density in the gradation area are at a lower level.

(Hue)

Hue is evaluated by visual observation of the thus-obtained print in OD1 area and by measuring L*a*b* by the above-described reflection densitometer to conduct evaluation in comparison with Experiment 1019. Results are shown in Tables 3 and 4.

A: In comparison with Experiment 1019, the print is more vivid, and the color difference (SE) is less than 3
B: In comparison with Experiment 1019, the print has the same vividness, and the color difference (ΔE) is less than 3.
C: In comparison with Experiment 1019, the color difference (ΔE) is from 3 to less than 5.
D: In comparison with Experiment 1019, the color difference (ΔE) is 5 or more.

(Heat Fastness)

The above-described print is exposed to a 70° environment for 2 weeks and, with the image area having an OD of 1 before exposure, the density change ratio of [(density after exposure/density before exposure)×100%] is calculated to evaluate heat fastness. Results are shown in Tables 3 and 4.

A: The density change is less than 5%.
B: The density change is from 5% to less than 10%.

C: The density change is from 10% to less than 20%.
D: The density change is more than 20%.
(Light Fastness)

The above-described print is irradiated for 5 weeks using a xenon weather meter (manufactured by Suga Test Instruments Co., Ltd.) under the conditions corresponding to outdoor direct exposure (9.9 kw; filter: #275) and, with the image area having an OD of 1 before exposure, the colorant residual ratio of [(density after irradiation/density before irradiation)×100%] is determined to evaluate light fastness. Results are shown in Tables 3 and 4.

A: The colorant residual ratio is 95% or more.
B: The colorant residual ratio is from 85% to less than 95%.
C: The colorant residual ratio is from 70% to less than 85%.
D: The colorant residual ratio is from 50% to less than 70%.
E: The colorant residual ratio is less than 50%.
(Ozone Gas Fastness)

The above-described print is exposed to ozone in an ozone generating apparatus (5 ppm) for 4 weeks and, with the image area having an OD of 1 before irradiation, the colorant residual ratio of [(density after irradiation/density before irradiation)×100%] is determined to evaluate ozone fastness. Results are shown in Tables 3 and 4.

A: The colorant residual ratio is 95% or more.
B: The colorant residual ratio is from 85% to less than 95%.
C: The colorant residual ratio is from 70% to less than 85%.
D: The colorant residual ratio is less than 70%.

TABLE 3

| Experimental No. | Pigment | Formulation of High-Molecular Polyvinyl Polymer (% by weight) | | | Weight-average Molecular Weight | Addition Amount of Dispersant Polymer Based on Pigment | Addition Amount of Self-dispersing Polymer Fine Particles in Ink |
|---|---|---|---|---|---|---|---|
| | | Hydrophobic Structural Unit | Methacrylic Acid | Methyl Methacrylate | | | |
| Example 1 | Illustrative compound (Pig. 1) | Phenoxyethyl methacrylate = 50 | 11 | 39 | 41000 | 30% | — |
| Example 2 | Illustrative compound (Pig. 2) | Phenoxyethyl methacrylate = 50 | 11 | 39 | 41000 | 30% | — |
| Example 3 | Illustrative compound (Pig. 3) | Phenoxyethyl methacrylate = 50 | 11 | 39 | 41000 | 30% | — |
| Example 4 | Illustrative compound (Pig. 18) | Phenoxyethyl methacrylate = 50 | 11 | 39 | 41000 | 30% | — |
| Example 5 | Illustrative compound (Pig. 25) | Phenoxyethyl methacrylate = 50 | 11 | 39 | 41000 | 30% | — |
| Example 6 | Illustrative compound (Pig. 1) | Phenoxyethyl methacrylate = 50 | 11 | 39 | 41000 | 50% | — |
| Example 7 | Illustrative compound (Pig. 1) | Phenoxyethyl methacrylate = 50 | 11 | 39 | 41000 | 50% | 2.0% |
| Example 8 | Illustrative compound (Pig. 1) | Phenoxyethyl methacrylate = 50 | 11 | 39 | 41000 | 50% | 3.1% |
| Example 9 | Illustrative compound (Pig. 18) | Phenoxyethyl methacrylate = 50 | 11 | 39 | 41000 | 50% | — |
| Example 10 | Illustrative compound (Pig. 1) | Phenoxyethyl methacrylate = 50 | 11 | 39 | 41000 | 30% | — |
| Experiment 1001 | Illustrative compound (Pig. 1) | Phenoxyethyl methacrylate = 25 | 10 | 65 | 46000 | 50% | 3.1% |
| Experiment 1002 | Illustrative compound (Pig. 1) | Phenoxyethyl methacrylate = 35 | 10 | 55 | /45000 | 50% | 3.1% |
| Experiment 1003 | Illustrative compound (Pig. 1) | Phenoxyethyl methacrylate = 55 | 10 | 35 | 40000 | 50% | 3.1% |
| Experiment 1004 | Illustrative compound (Pig. 1) | Phenoxyethyl methacrylate = 75 | 10 | 15 | 47000 | 50% | 3.1% |
| Experiment 1005 | Illustrative compound (Pig. 1) | Phenoxyethyl methacrylate = 55 | 8 | 37 | 46000 | 50% | 3.1% |
| Experiment 1006 | Illustrative compound (Pig. 1) | Phenoxyethyl methacrylate = 55 | 15 | 30 | 45000 | 50% | 3.1% |
| Experiment 1007 | Illustrative compound (Pig. 1) | Phenoxyethyl methacrylate = 55 | 17 | 28 | 49000 | 50% | 3.1% |
| Experiment 1008 | Illustrative compound (Pig. 1) | Phenoxyethyl methacrylate = 55 | 10 | 35 | 45000 | 20% | 3.1% |
| Experiment 1009 | Illustrative compound (Pig. 1) | Phenoxyethyl methacrylate = 55 | 10 | 35 | 42000 | 30% | 3.1% |
| Experiment 1010 | Illustrative compound (Pig. 1) | Phenoxyethyl methacrylate = 55 | 10 | 35 | 42000 | 60% | 3.1% |
| Experiment 1011 | Illustrative compound (Pig. 1) | Phenoxyethyl methacrylate = 55 | 10 | 35 | 44000 | 70% | 3.1% |
| Experiment 1012 | Illustrative compound (Pig. 1) | Phenoxyethyl methacrylate = 55 | 10 | 35 | 25000 | 50% | 3.1% |
| Experiment 1013 | Illustrative compound (Pig. 1) | Phenoxyethyl methacrylate = 55 | 10 | 35 | 30000 | 50% | 3.1% |
| Experiment 1014 | Illustrative compound (Pig. 1) | Phenoxyethyl methacrylate = 55 | 10 | 35 | 80000 | 50% | 3.1% |
| Experiment 1015 | Illustrative compound (Pig. 1) | Phenoxyethyl methacrylate = 55 | 10 | 35 | 85000 | 50% | 3.1% |
| Experiment 1016 | Illustrative compound (Pig. 18) | Phenoxyethyl methacrylate = 55 | 10 | 35 | 40000 | 50% | 3.1% |
| Experiment 1017 | Illustrative compound (Pig. 2) | Phenoxyethyl methacrylate = 55 | 10 | 35 | 40000 | 50% | 3.1% |
| Experiment 1018 | Illustrative compound (Pig. 3) | Phenoxyethyl methacrylate = 55 | 10 | 35 | 40000 | 50% | 3.1% |

TABLE 3-continued

| | | | | | | | |
|---|---|---|---|---|---|---|---|
| Experiment 1019 | C,I, Pigment Yellow 74 | Phenoxyethyl methacrylate = 55 | 10 | 55 | 45000 | 50% | 3.1% |
| Experiment 1020 | C,I, Pigment Yellow 74 | Phenoxyethyl methacrylate = 55 | 10 | 35 | 40000 | 50% | 3.1% |

| Experimental No. | Addition Amount of Pigment in Ink | Ejection Accuracy | Print Density | Hue | Heat Fastness | Light Fastness | Ozone Fastness | Note |
|---|---|---|---|---|---|---|---|---|
| Example 1 | 4.3% | A | A | B | A | A | A | Present invention |
| Example 2 | 4.3 | A | B | B | B | B | A | Present invention |
| Example 3 | 4.3 | A | B | B | B | B | A | Present invention |
| Example 4 | 4.3 | A | A | A | B | B | A | Present invention |
| Example 5 | 4.3% | A | A | A | A | B | A | Present invention |
| Example 6 | 4.3% | A | A | B | A | A | A | Present invention |
| Example 7 | 4.3% | A | B | B | A | A | A | Present invention |
| Example 8 | 4.3% | A | B | B | A | A | A | Present invention |
| Example 9 | 4.3% | A | A | B | A | A | A | Present invention |
| Example 10 | 4.3% | A | A | B | A | A | A | Present invention |
| Experiment 1001 | 4.3% | B | C | B | A | A | A | Present invention |
| Experiment 1002 | 4.3% | A | C | B | A | A | A | Present invention |
| Experiment 1003 | 4.3% | A | C | B | A | A | A | Present invention |
| Experiment 1004 | 4.3% | B | C | B | A | A | A | Present invention |
| Experiment 1005 | 4.3% | A | C | B | A | A | A | Present invention |
| Experiment 1006 | 4.3% | A | C | B | A | A | A | Present invention |
| Experiment 1007 | 4.3% | B | C | B | A | A | A | Present invention |
| Experiment 1008 | 4.3% | B | C | B | A | B | A | Present invention |
| Experiment 1009 | 4.3% | A | C | B | A | A | A | Present invention |
| Experiment 1010 | 4.3% | A | C | B | A | A | A | Present invention |
| Experiment 1011 | 4.3% | B | C | B | A | A | A | Present invention |
| Experiment 1012 | 4.3% | B | C | B | A | A | A | Present invention |
| Experiment 1013 | 4.3% | A | C | B | A | A | A | Present invention |
| Experiment 1014 | 4.3% | A | C | B | A | A | A | Present invention |
| Experiment 1015 | 4.3% | B | C | B | A | A | A | Present invention |
| Experiment 1016 | 4.3% | A | B | A | A | B | A | Present invention |
| Experiment 1017 | 4.3% | A | B | A | A | B | A | Present invention |
| Experiment 1018 | 4.3% | A | B | A | A | B | A | Present invention |
| Experiment 1019 | 4.3% | C | C | B | D | E | B | Comparative Example |
| Experiment 1020 | 4.3% | D | C | B | D | E | B | Comparative Example |

TABLE 4

| Experimental No. | Pigment | Formulation of High-Molecular Polyvinyl Polymer (% by weight) | | | | Addition Amount of Dispersant | Addition Amount of Self-dispersing |
|---|---|---|---|---|---|---|---|
| | | Hydrophobic Structural Unit | Methacrylic Acid | Methyl Methacrylate | Weight-average Molecular Weight | Polymer Based on Pigment | Polymer Fine Particles in Ink |
| Experiment 1021 | Illustrative compound (Pig. 18) | Phenoxyethyl methacrylate = 55 | 10 | 35 | 40000 | 50% | 3.1% |
| Experiment 1022 | Illustrative compound (Pig. 18) | Phenoxyethyl methacrylate = 55 | 10 | 35 | 40000 | 50% | 3.1% |
| Experiment 1023 | Illustrative compound (Pig. 18) | Phenoxyethyl methacrylate = 55 | 10 | 35 | 40000 | 50% | 3.1% |
| Experiment 1024 | Illustrative compound (Pig. 18) | Phenoxyethyl methacrylate = 55 | 10 | 35 | 40000 | 50% | 3.1% |
| Experiment 1025 | Illustrative compound (Pig. 18) | Phenoxyethyl methacrylate = 55 | 10 | 35 | 40000 | 20% | 3.1% |
| Experiment 1026 | Illustrative compound (Pig. 18) | Phenoxyethyl methacrylate = 55 | 10 | 35 | 40000 | 30% | 3.1% |
| Experiment 1027 | Illustrative compound (Pig. 18) | Phenoxyethyl methacrylate = 55 | 10 | 35 | 40000 | 70% | 3.1% |
| Experiment 1028 | Illustrative compound (Pig. 18) | Phenoxyethyl methacrylate = 55 | 10 | 35 | 40000 | 90% | 3.1% |
| Experiment 1029 | Illustrative compound (Pig. 18) | Phenoxyethyl methacrylate = 55 | 10 | 35 | 40000 | 100% | 3.1% |
| Experiment 1030 | Illustrative compound (Pig. 18) | Phenoxyethyl methacrylate = 55 | 10 | 35 | 40000 | 50% | 8.0% |
| Experiment 1031 | Illustrative compound (Pig. 18) | Phenoxyethyl methacrylate = 55 | 10 | 35 | 40000 | 50% | 6.0% |
| Experiment 1032 | Illustrative compound (Pig. 18) | Phenoxyethyl methacrylate = 55 | 10 | 35 | /40000 | 50% | 2.0% |
| Experiment 1033 | Illustrative compound (Pig. 18) | Phenoxyethyl methacrylate = 55 | 10 | 35 | 40000 | 50% | 1.0% |
| Experiment 1034 | Illustrative compound (Pig. 18) | Phenoxyethyl methacrylate = 55 | 10 | 35 | 40000 | 50% | None |

TABLE 4-continued

| Experiment | | | | | | | |
|---|---|---|---|---|---|---|---|
| Experiment 1035 | Illustrative compound (Pig. 6) | Phenoxyethyl methacrylate = 55 | 10 | 35 | 40000 | 50% | 3.1% |
| Experiment 1036 | Illustrative compound (Pig. 10) | Phenoxyethyl methacrylate = 55 | 10 | 35 | 40000 | 50% | 3.1% |
| Experiment 1037 | Illustrative compound (Pig. 12) | Phenoxyethyl methacrylate = 55 | 10 | 35 | 40000 | 50% | 3.1% |
| Experiment 1038 | Illustrative compound (Pig. 19) | Phenoxyethyl methacrylate = 55 | 10 | 35 | 40000 | 50% | 3.1% |
| Experiment 1039 | Illustrative compound (Pig. 24) | Phenoxyethyl methacrylate = 55 | 10 | 35 | 40000 | 50% | 3.1% |
| Experiment 1040 | Illustrative compound (Pig. 25) | Phenoxyethyl methacrylate = 55 | 10 | 35 | 40000 | 50% | 3.1% |
| Experiment 1041 | Illustrative compound (Pig. 33) | Phenoxyethyl methacrylate = 55 | 10 | 35 | 40000 | 50% | 3.1% |
| Experiment 1042 | Illustrative compound (Pig. 41) | Phenoxyethyl methacrylate = 55 | 10 | 35 | 40000 | 50% | 3.1% |
| Experiment 1043 | Illustrative compound (Pig. 43) | Phenoxyethyl methacrylate = 55 | 10 | 35 | 40000 | 50% | 3.1% |
| Experiment 1044 | Illustrative compound (Pig. 45) | Phenoxyethyl methacrylate = 55 | 10 | 35 | 40000 | 50% | 3.1% |
| Experiment 1045 | Illustrative compound (Pig. 46) | Phenoxyethyl methacrylate = 55 | 10 | 35 | 40000 | 50% | 3.1% |
| Experiment 1046 | Illustrative compound (Pig. 1) | Benzyl methacrylate = 55 | 10 | 35 | 39000 | 50% | 3.1% |
| Experiment 1047 | Illustrative compound (Pig. 1) | Phenoxyethylcarboxyvinyl ether = 55 | 10 | 35 | 43000 | 50% | 3.1% |
| Experiment 1048 | Illustrative compound (Pig. 1) | Phenoxyethylmethacrylamide = 55 | 10 | 35 | 42000 | 50% | 3.1% |
| Experiment 1049 | Illustrative compound (Pig. 1) | Phenymethacrylamide = 55 | 10 | 55 | 43000 | 50% | 3.1% |
| Experiment 1050 | Illustrative compound (Pig. 1) | Phenoxyethyl methacrylate = 55 | 10 | 35 | 40000 | 50% | 3.1% |
| Experiment 1051 | C,I, Pigment Yellow 155 | Phenoxyethyl methacrylate = 55 | 10 | 35 | 40000 | 50% | 3.1% |
| Experiment 1052 | C,I, Pigment Yellow 128 | Phenoxyethyl methacrylate = 55 | 10 | 35 | 40000 | 50% | 3.1% |
| Experiment 1053 | C,I, Pigment Yellow 185 | Phenoxyethyl methacrylate = 55 | 10 | 35 | 40000 | 50% | 3.1% |
| Experiment 1054 | C,I, Pigment Yellow 150 | Phenoxyethyl methacrylate = 55 | 10 | 35 | 40000 | 50% | 3.1% |

| Experimental No. | Addition Amount of Pigment in Ink | Ejection Accuracy | Print Density | Hue | Heat Fastness | Light Fastness | Ozone Fastness | Note |
|---|---|---|---|---|---|---|---|---|
| Experiment 1021 | 2.3% | A | C | A | A | C | A | Present invention |
| Experiment 1022 | 5.3% | A | A | A | A | A | A | Present invention |
| Experiment 1023 | 6.3% | A | A | A | A | A | A | Present invention |
| Experiment 1024 | 7.3% | B | A | A | A | A | A | Present invention |
| Experiment 1025 | 4.3% | B | B | A | A | B | A | Present invention |
| Experiment 1026 | 4.3% | A | B | A | A | B | A | Present invention |
| Experiment 1027 | 4.3% | A | B | A | A | A | A | Present invention |
| Experiment 1028 | 4.3% | A | B | A | A | A | A | Present invention |
| Experiment 1029 | 4.3% | B | C | B | A | A | A | Present invention |
| Experiment 1030 | 4.3% | B | C | B | A | A | A | Present invention |
| Experiment 1031 | 4.3% | A | B | A | A | B | A | Present invention |
| Experiment 1032 | 4.3% | A | B | A | A | B | A | Present invention |
| Experiment 1033 | 4.3% | A | B | A | A | B | A | Present invention |
| Experiment 1034 | 4.3% | A | B | A | A | B | A | Present invention |
| Experiment 1035 | 4.3% | A | B | A | A | A | A | Present invention |
| Experiment 1036 | 4.3% | A | B | A | A | A | A | Present invention |
| Experiment 1037 | 4.3% | A | B | A | A | A | A | Present invention |
| Experiment 1038 | 4.3% | A | B | A | A | A | A | Present invention |
| Experiment 1039 | 4.3% | A | B | A | A | A | A | Present invention |
| Experiment 1040 | 4.3% | A | B | A | A | A | A | Present invention |
| Experiment 1041 | 4.3% | A | B | A | A | A | A | Present invention |
| Experiment 1042 | 4.3% | A | B | A | A | A | A | Present invention |
| Experiment 1043 | 4.3% | A | B | A | A | A | A | Present invention |
| Experiment 1044 | 4.3% | A | B | A | A | A | A | Present invention |
| Experiment 1045 | 4.3% | A | B | A | A | A | A | Present invention |
| Experiment 1046 | 4.3% | A | B | B | A | A | A | Present invention |
| Experiment 1047 | 4.3% | B | B | B | A | A | A | Present invention |
| Experiment 1048 | 4.3% | B | B | B | A | A | A | Present invention |
| Experiment 1049 | 4.3% | B | B | B | A | A | A | Present invention |
| Experiment 1050 | 4.3% | A | B | B | A | A | A | Present invention |
| Experiment 1051 | 4.3% | D | C | B | D | E | B | Comparative Example |
| Experiment 1052 | 4.3% | D | C | B | D | E | B | Comparative Example |
| Experiment 1053 | 4.3% | D | C | B | D | E | B | Comparative Example |

| Experiment 1054 | 4.3% | D | C | B | D | E | B | Comparative Example |

It is seen from Examples 1 to 10 that, by using the illustrative compound of the invention, (Pig.-1), (Pig.-2), (Pig.-3), (Pig.-18), or (Pig.-25), as a pigment and using phenoxyethyl methacrylate as the hydrophobic structural unit of vinyl polymer, good results are obtained in the evaluation of ink ejection accuracy even after storage under high temperature condition and, in particular, it is seen that, by using the illustrative compound of the invention, (Pig.-1), (Pig.-18), or (Pig.-25) as a pigment, better results are obtained with respect to print density and hue.

It is seen from Experiments 1001 to 1004 that, by using the illustrative compound of the invention, (Pig.-1), as a pigment and using phenoxyethyl methacrylate as the hydrophobic structural unit of vinyl polymer, particularly good results are obtained in the evaluation of ink ejection accuracy and light fastness even after storage under high temperature condition.

Also, it is seen from Experiments 1003 and 1005 to 1007 that, by using the illustrative compound of the invention, (Pig.-1), as a pigment and in the case where the ratio of the hydrophobic structural unit of vinyl polymer is from 8% by weight to 15% by weight, particularly good results are obtained in the evaluation of ink ejection accuracy.

Also, it is seen from Experiments 1003 and 1008 to 1011 that, by using the illustrative compound of the invention, (Pig.-1), as a pigment and in the case where the addition amount of the vinyl polymer based on the pigment is from 30% to 60%, particularly good results are obtained in the evaluation of ink ejection accuracy and light fastness.

Also, it is seen from Experiments 1003 and 1012 to 1015 that, by using the illustrative compound of the invention, (Pig.-1), as a pigment and in the case where the weight-average molecular weight of vinyl polymer is from 30,000 to 80,000, particularly good results are obtained in the evaluation of ink ejection accuracy.

Also, it is seen from Experiments 1019 to 1020 that, when using C.I. Pigment Yellow 74 as a pigment, ink ejection accuracy, heat fastness, and light fastness are deteriorated.

Also, it is seen from Experiments 1016 and 1021 to 1024 that, by using the illustrative compound of the invention, (Pig.-18), as a pigment and in the case where the addition amount of the pigment in the ink is from 4.3% to 6.3%, particularly good ejection accuracy, print density, and light fastness are obtained.

Also, it is seen from Experiments 1016 and 1025 to 1029 that, by using the illustrative compound of the invention, (Pig.-18), as a pigment and in the case where the addition amount of the vinyl polymer based on the pigment is from 30% to 90%, particularly good ejection accuracy, print density, and hue are obtained.

Also, it is seen from Experiments 1016 and 1030 to 1034 that, by using the illustrative compound of the invention, (Pig.-18), as a pigment and in the case where the addition amount of the self-dispersing polymer particles in the ink is from none to 6%, particularly good ejection accuracy, print density, and hue are obtained.

Also, it is seen from Experiments 1035 to 1045 that, by using the illustrative compound of the invention, Pig.-6, 10, 12, 19, 24, 25, 33, 41, 45, or 46, as a pigment and using phenoxyethyl methacrylate as the hydrophobic structural unit of vinyl polymer, particularly good results are obtained in the evaluation of ejection accuracy with respective inks.

Also, it is seen from Experiments 1046 to 1050 that, in the case of using, as the hydrophobic structural unit of vinyl polymer, an aromatic group-having structural unit other than phenoxyethyl methacrylate, particularly good results are obtained with respect to light fastness.

Also, it is seen from Experiments 1051 to 1054 that, when using C.I. Pigment Yellow 155, 128, 185, or 150 as a pigment, ink ejection accuracy, print density, and hue are particularly deteriorated.

Industrial Applicability

According to the present invention, there can be provided, by combining a specific azo pigment, a specific vinyl polymer, and an aqueous medium, (1) an aqueous pigment dispersion having excellent storage stability, which contains an azo pigment, a vinyl polymer, and an aqueous medium and (2) an aqueous ink for inkjet recording which contains an azo pigment showing excellent ink ejection properties and realizing good hue and high print density (high tinctorial strength), and high image fastness of printed products (light fastness, ozone gas fastness, heat fastness, and moisture fastness), a vinyl polymer, and an aqueous medium.

The aqueous pigment dispersion of the invention can be used for an ink for printing such as inkjet printing, a color toner for electrophotography, a display such as LCD or PDP, a color filter to be used in photographing equipment such as CCD, a paint, and a colored plastic.

Although the invention has been described in detail and by reference to specific embodiments, it is apparent to those skilled in the art that it is possible to add various alterations and modifications insofar as the alterations and modifications do not deviate from the spirit and the scope of the invention.

This application is based on a Japanese patent application filed on Sep. 4, 2009 (Japanese Patent Application No. 2009-205353) and a Japanese patent application filed on Sep. 2, 2010 (Japanese Patent Application No. 2010-197188), and the contents thereof are incorporated herein by reference.

The invention claimed is:

1. An aqueous pigment dispersion comprising A and B, wherein A represents an azo pigment represented by the following general formula (1) and having at least one characteristic peak at Bragg angles, 2θ, of 5° to 15° and 20° to 30° in X-ray diffraction with characteristic Cu Kα line, a tautomer thereof, or a salt or hydrate thereof formula (1):

(1):

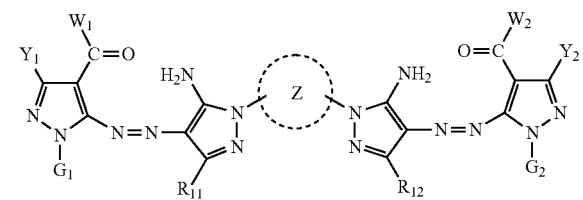

wherein, Z represents a 5- to 6-membered heterocyclic ring, $Y_1$, $Y_2$, $R_{11}$, and $R_{12}$ each independently represents a hydrogen atom or a substituent, $G_1$ and $G_2$ each independently represents a hydrogen atom, an alkyl group, an aralkyl group, an alkenyl group, an alkynyl group, an aryl group, or a heterocyclic group, and $W_1$ and $W_2$ each independently represents an alkoxy group, an amino group, an alkyl group, or an aryl group:

B is a vinyl polymer containing a hydrophobic structural unit (a) represented by the following general formula (AI) and a hydrophilic structural unit (c):

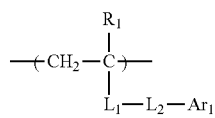

wherein, $R_1$ represents a hydrogen atom, a methyl group, or a halogen atom, $L_1$ represents —COO—, —OCO—, —CONR$_2$—, —O—, or a substituted or unsubstituted phenylene group, $R_2$ represents a hydrogen atom or an alkyl group, $L_2$ represents a single bond or a divalent linking group, and $Ar_1$ represents a monovalent group derived from an aromatic hydrocarbon ring.

2. The aqueous pigment dispersion according to claim 1, wherein $W_1$ and $W_2$ in the azo pigment represented by the general formula (1), a tautomer thereof, or a salt or hydrate thereof each independently represents an alkoxy group containing a total carbon atoms of 5 or less, an amino group, or an alkylamino group containing a total carbon atoms of 5 or less.

3. The aqueous pigment dispersion according to claim 1, wherein $G_2$ and $G_2$ in the azo pigment represented by the general formula (1), a tautomer thereof, or a salt or hydrate thereof each independently represents an alkyl group containing a total carbon atoms of 3 or less.

4. The aqueous pigment dispersion for inkjet recording according to claim 1, wherein Z in the azo pigment represented by the general formula (1), a tautomer thereof, or a salt or hydrate thereof represents a 6-membered nitrogen-containing heterocyclic ring.

5. The aqueous pigment dispersion according to claim 1, wherein the azo pigment represented by the general formula (1) is represented by the following general formula (10):

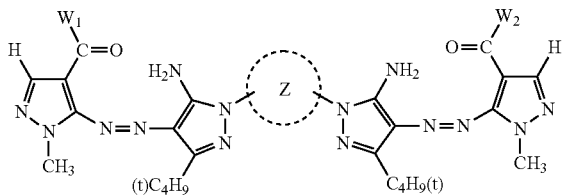

wherein, Z represents a 5- to 6-membered nitrogen-containing heterocyclic ring, and $W_1$ and $W_2$ each independently represents an alkoxy group, an amino group, an alkyl group, or an aryl group.

6. The aqueous pigment dispersion according to claim 5, wherein the azo pigment represented by the general formula (10) is represented by the following general formula (11):

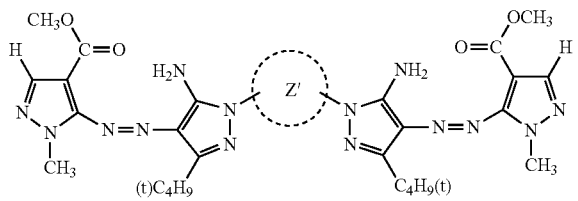

wherein, Z' represents a 6-membered nitrogen-containing heterocyclic ring.

7. The aqueous pigment dispersion according to claim 1, wherein the azo pigment represented by the general formula (1), a tautomer thereof, or a salt or hydrate thereof contains at least one azo pigment represented by the following general formula (1a) and having characteristic X-ray peaks at Bragg angles, 2θ+0.2°, in X-ray diffraction with characteristic Cu Kα line of 7.2° and 25.9° or a tautomer thereof, formula (1a):

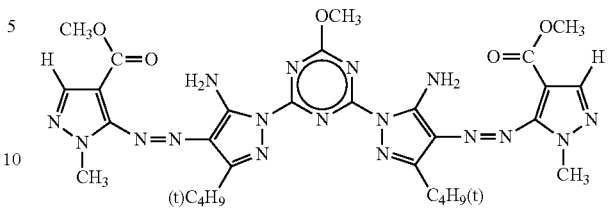

8. The aqueous pigment dispersion according to claim 1, wherein the azo pigment represented by the general formula (1), a tautomer thereof, or a salt or hydrate thereof contains at least one azo pigment represented by the following general formula (2a) and having characteristic X-ray peaks at Bragg angles, 2θ+0.2°, in X-ray diffraction with characteristic Cu Kα line of 7.6°, 25.6°, and 27.7° or a tautomer thereof, formula (2a):

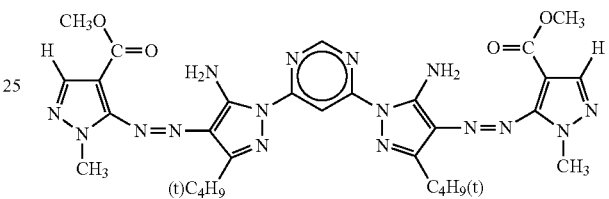

9. The aqueous pigment dispersion according to claim 1, wherein the azo pigment represented by the general formula (1), a tautomer thereof, or a salt or hydrate thereof contains at least one azo pigment represented by the following general formula (3a) and having characteristic X-ray peaks at Bragg angles, 2θ+0.2°, in X-ray diffraction with characteristic Cu Kα line of 7.5°, 11.2°, 18.6°, 21.2°, and 23.9° or a tautomer thereof, formula (3a):

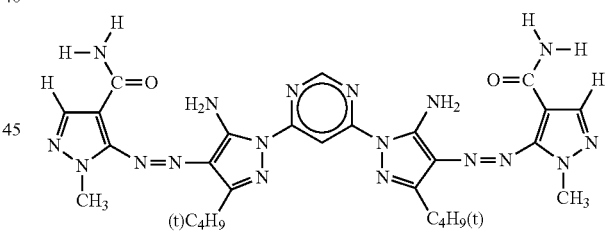

10. The aqueous pigment dispersion according to claim 1, wherein the vinyl polymer represented by B further contains a hydrophobic structural unit (b) derived from an alkyl ester of acrylic acid or methacrylic acid.

11. The aqueous pigment dispersion according to claim 1, wherein the hydrophobic structural unit (a) contains at least one structural unit selected from the group consisting of a structural unit derived from phenoxyethyl (meth)acrylate and a structural unit derived from benzyl (meth)acrylate in an amount of 20% by weight or more based on the entire weight of the vinyl polymer, and the hydrophilic structural unit (c) contains at least one structural unit selected from the group consisting of a structural unit derived from acrylic acid and a structural unit derived from methacrylic acid in an amount of 30% by weight or less based on the entire weight of the vinyl polymer.

12. The aqueous pigment dispersion according to claim 1, wherein the hydrophobic structural unit (a) contains a structural unit derived from phenoxyethyl (meth)acrylate in an amount of 20% by weight or more based on the entire weight of the vinyl polymer.

13. The aqueous pigment dispersion according to claim 1, wherein the vinyl polymer represented by B is a polymer represented by the following general formula (AII):

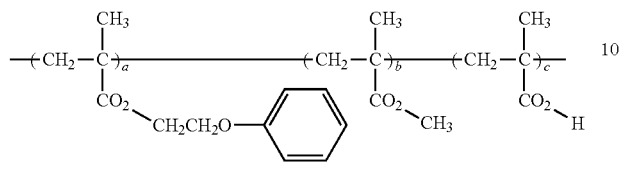

wherein, a represents a weight percentage of from 10% by weight to less than 75% by weight, based on the weight of the entire vinyl polymer, b represents a weight percentage of from 5% by weight to less than 50% by weight, based on the weight of the entire vinyl polymer, c represents a weight percentage of from 4% by weight to less than 50% by weight, based on the weight of the entire vinyl polymer, and a+b+c is 100.

14. The aqueous pigment dispersion according to claim 1, which further contains an aqueous medium.

15. An aqueous ink for inkjet recording, comprising an aqueous pigment dispersion according to claim 1.

* * * * *